US 6,701,236 B2
Mar. 2, 2004

(54) INTELLIGENT MECHATRONIC CONTROL SUSPENSION SYSTEM BASED ON SOFT COMPUTING

(75) Inventors: Sergei V. Ulyanov, Crema (IT); Sergei Panfilov, Crema (IT); Ichiro Kurawaki, Shizuoka (JP); Takahide Hagiwira, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 244 days.

(21) Appl. No.: 10/033,370

(22) Filed: Oct. 19, 2001

(65) Prior Publication Data

US 2003/0110148 A1 Jun. 12, 2003

(51) Int. Cl.⁷ .......................... B60G 23/00; G05B 13/80
(52) U.S. Cl. .......................... 701/40; 280/5.504; 703/1; 703/2; 703/6
(58) Field of Search .......................... 701/40, 99, 100, 701/37; 280/5.504, 5.507, 5.512, 5.515, 5.519; 703/1, 2, 23, 6

(56) References Cited

U.S. PATENT DOCUMENTS

| | | | |
|---|---|---|---|
| 5,111,531 A | 5/1992 | Grayson et al. | |
| 5,142,877 A | 9/1992 | Shimizu | |
| 5,159,660 A | 10/1992 | Lu et al. | |
| 5,204,718 A | 4/1993 | Morita | |
| 5,214,576 A | 5/1993 | Tani et al. | |
| 5,268,835 A | 12/1993 | Miyagaki et al. | |
| 5,285,377 A | 2/1994 | Sugasaka et al. | |
| 5,305,230 A | 4/1994 | Matsumoto et al. | |
| 5,324,069 A | 6/1994 | Ogawa | |
| 5,367,612 A | 11/1994 | Bozich et al. | |
| 5,372,015 A | 12/1994 | Suzuki et al. | |
| 5,434,951 A | 7/1995 | Kuwata | |
| 5,471,381 A | 11/1995 | Khan | |
| 5,740,324 A | 4/1998 | Mathur et al. | |
| 5,815,198 A | 9/1998 | Vachtsevanos et al. | |
| 5,877,954 A | 3/1999 | Klimasauskas et al. | |
| 5,943,660 A | 8/1999 | Yesildirek et al. | |
| 5,971,579 A | 10/1999 | Kim | |
| 6,212,466 B1 * | 4/2001 | Ulyanov et al. | 701/99 |
| 6,496,761 B1 * | 12/2002 | Ulyanov et al. | 701/37 |

FOREIGN PATENT DOCUMENTS

| | | | |
|---|---|---|---|
| JP | 10-268904 | | 10/1998 |
| JP | 2000-207002 | * | 7/2000 |

OTHER PUBLICATIONS

Bose, Bimal K., "Expert System, Fuzzy Logic, and Neural Network Applications in Power Electronics and Motion Control," Proceedings of the IEEE, vol. 82, No. 8, Aug. 1994, pp. 1303–1323.

Feng, Q., et al., "Design and simulation of control systems of an inverted pendulum," Robotica, vol. 6, 1998, pp. 235–241.

(List continued on next page.)

*Primary Examiner*—William A. Cuchlinski, Jr.
*Assistant Examiner*—Olga Hernandez
(74) *Attorney, Agent, or Firm*—Knobbe, Martens, Olson & Bear LLP

(57) ABSTRACT

A control system for optimizing a shock absorber having a non-linear kinetic characteristic is described. The control system uses a fitness (performance) function that is based on the physical laws of minimum entropy and biologically inspired constraints relating to mechanical constraints and/ or rider comfort, driveability, etc. In one embodiment, a genetic analyzer is used in an off-line mode to develop a teaching signal. An information filter is used to filter the teaching signal to produce a compressed teaching signal. The compressed teaching signal can be approximated online by a fuzzy controller that operates using knowledge from a knowledge base. In one embodiment, the control system includes a learning system, such as a neural network that is trained by the compressed training signal. The learning system is used to create a knowledge base for use by an online fuzzy controller. The online fuzzy controller is used to program a linear controller.

20 Claims, 27 Drawing Sheets

OTHER PUBLICATIONS

Gradetsky, V.G., et al., "Mobile Systems with Vertical Displacement Robots," Intern J. of Computer and Systems Sciences, vol. 31, No. 1, Jan.–Feb., 1993, pp. 126–242.

Johansson, Rolf, et al., "Galvanic Vestibular Stimulation for Analysis of Postural Adaption and Stability," IEEE Transactions on Biomedical Engineering, vol. 42, No. 3, Mar., 1995, pp. 282–292.

Ju, Ming–Shaung, et al., "Fuzzy Control of Electrohydraulic Above–Knee Prostheses," JSME International Journal, vol. 38, No. 1, 1995, pp. 78–85.

Lee, Yong No, et al., "A Look–up Table–based Self–organizing Fuzzy Plus Linear Controller," Mechatronics, vol. 4, No. 1, 1994, pp. 71–90.

Liu, T.S., et al., "A Model for a Rider–Motorcycle System Using Fuzzy Control," IEEE Transactions on Systems, Man, and Cybernetics, vol. 23, No. 1, Jan.–Feb., 1993, pp. 267–276.

Mendal, Jerry, "Fuzzy Logic Systems for Engineering: A Tutorial," Proceedings of the IEEE, Vol 83, No. 3, Mar., 1995, pp. 345–377.

Nakajima, Ryo, et al., "A Development of a New Mechanism of an Autonomous Unicycle," Proceedings of the IEEE/RSJ International Conference on Intelligent Robots and Systems, Grenoble, France, vol. 2, 1997, pp. 906–912.

Perroud, M., et al., "Thermodynamics of dissipative systems," Helvetica Physica Acta, vol. 60, 1987, pp. 1038–1051.

Sheng, Zaiquan, et al., "Realization of a Human Riding a Unicycle by a Robot," IEEE International Conference on Robotics and Automation, Japan, 1995, vol. 2, pp. 1319–1326.

Sheng, Zaiquan, et al., "Postural Stability of a Human Riding a Unicycle and Its Emulation by a Robot," IEEE Transactions on Robotics and Automation, vol. 13, No. 5, Oct., 1997, pp. 709–720.

Sheng, Zaiquan, et al., "Study on the Stability and Motion Control of a Unicycle—Part I: Dynamics of a Human Riding a Unicycle and Its Modeling by Link Mechanisms," JSME International Journal, vol. 38C, No. 2, 1995, pp. 249–259.

Sheng, Zaiquan, et al., "Study on Stability and Motion Control of a Unicycle: $3^{rd}$ Report, Characteristics of Unicycle Robot," JSME International Journal, vol. 39C, No. 3, 1996, pp. 560–568.

Tsai, Chin–Yin, et al., "Design of Lyapunov Function Based Logic Controller," IEEE, 1996, pp. 396–401.

Ulyanov, S.V., "Fuzzy Models of Intelligent Control Systems: Theoretical and Applied Aspects," Soviet Journal of Computer and Systems Sciences (Engineering Cybernetics), vol. 30, No. 4, 1992, pp. 1–22.

Ulyanov, S.V., et al., "Self–Organization Fuzzy Chaos Intelligent Controller for a Robotic Unicycle: A New Benchmark in AI Control," Proceedings of the $5^{th}$ Intelligent System Symposium: Fuzzy, AI and Neural Network Applications Technologies (FAN Symp) Tokyo, Sep., 1995, pp. 41–46.

Ulyanov, S.V., et al., "Fuzzy Intelligent Emotion and Instinct Control of a Robotic Unicycle," $4^{th}$ Intern, Workshop on Advanced Motion Control, Mie, Japan, 1996, vol. 1, pp. 127–132.

Ulyanov, S.V., et al., "Stochastic analysis of time–variant nonlinear dynamic systems—Parts 1 & 2," Probablistic Engineering Mechanics, vol. 13, No. 3, 1998, pp. 183–226.

Ulyanov, Sergei V., et al., "Expert Fuzzy–Neuro Controller Design for Wall Climbing Robot for Decontamination of Nuclear–Power Station," Journal of Robotics and Mechatronics, vol. 7, No. 1, 1995, pp. 75–86.

Ulyanov, S.V., et al., "Computational Intelligence for Robust Control Algorithms of Complex Dynamic Systems with Minimum Entropy Production—Part I: Simulation of Entropy–Like Dynamic Behavior and Lyapunov Stability," Journal of Advanced Computational Intelligence, vol. 3, No. 2, 1999, pp. 82–98.

Ulyanov, S.V., et al., "Computational Intelligence with New Physical Controllability Measure for Robust Control Algorithm of Extension–Cableless Robotic Unicycle," Journal of Advanced Computational Intelligence, vol. 3, No. 2, 1999, pp. 136–147.

Ulyanov, S. V., et al., "Intelligent robust control of a robotic unicycle based on a new physical measure for mechanical controllability," Advanced Robotics, vol. 12, No. 4, 1998, pp. 455–481.

Ulyanov, S.V., et al., "Modeling of Micro–Nano–Robots and Physical Limit of Micro Control," Journal of the Robotics Society of Japan, vol. 14, No. 8, 1996, pp. 1102–1105.

van Rooij, A.J.F., et al., "Neural Network Training Using Genetic Algorithms," World Scientific, 1997.

Vasilieva, O.I., et al., "Dual Control of the Artificial Ventilation Process with use of a Fuzzy Controller in the Feedback Circuit," Biomedical Engineering, vol. 23, No. 1, 1989, pp. 7–16.

Wu, J.C., et al., "Fuzzy Control of Rider–Motorcycle System Using Genetic Algorithm and Auto–Tuning," Mechatronics, Vol 5, No. 4, 1995, pp. 441–455.

Wu, J.C., et al., "Fuzzy Control Stabilization with Applications to Motorcycle Control," IEEE Transactions on Systems, Man, and Cybernetics, vol. 26, No. 6, Dec. 1996, pp. 836–847.

Zakharov, V.N., et al., "Fuzzy Models of Intelligent Industrial Controllers and Control Systems. Part I: Organizational, Engineering, Cost, and Applied Aspects," Journal of Computer and Systems Sciences International, vol. 32, No. 1, 1994, pp. 123–144.

Zakharov, V.N., et al., "Fuzzy Models of Intelligent Industrial Controllers Systems. Part II: Evolution and Principles of Design," Journal of Computer and Systems Sciences International, vol. 33, No. 2, 1995, pp. 94–136.

Chen, Jen–Yang, "An Integration Design Approach in PID Controller," IEEE, 1999, p. 901–907.

Dote, Y., Real Time Nonlinear Learning Control for robotic Manipulator Using Novel Fuzzy Neural Network, IEEE International Conference on System, Man, and Cybernetics, Oct. 1998.

Tanaka, et al., "A Mobile Robot Service Use: Behavior Simulation. System and Intelligent Control," IEEE Proceedings of the International Conference on Intelligent Robots and Systems, Sep. 1997.

* cited by examiner

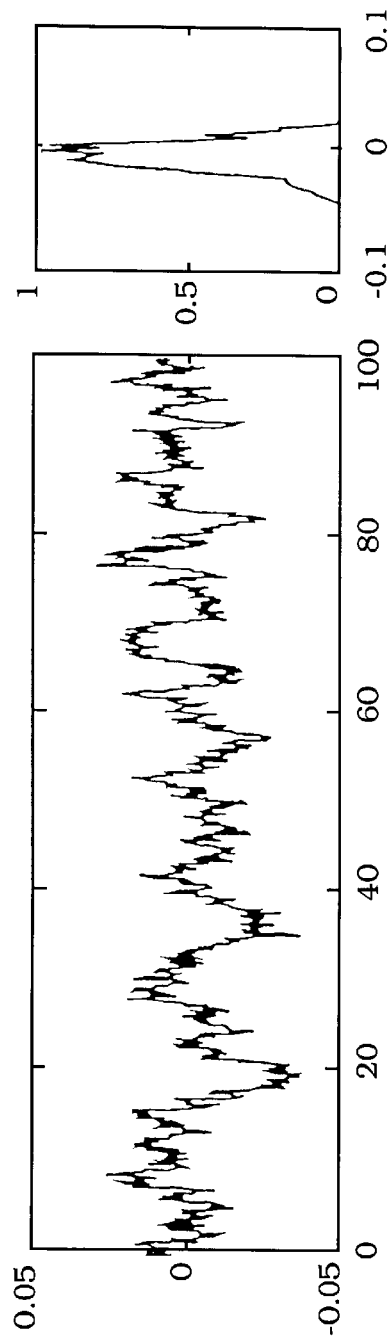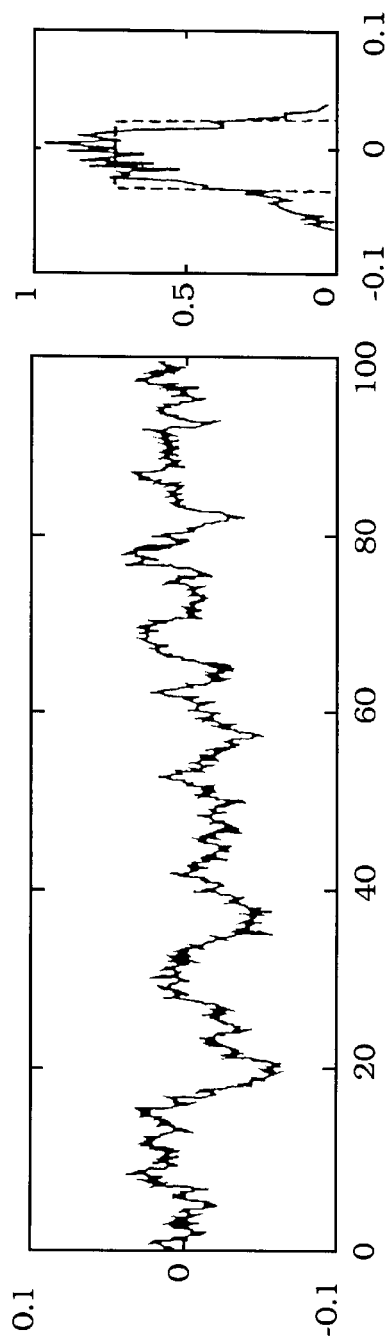
Figure 6A
Figure 6B oil flow in each rotary valve position

INTELLIGENT MECHATRONIC CONTROL SUSPENSION SYSTEM BASED ON SOFT COMPUTING

BACKGROUND

1. Field of the Invention

The disclosed invention is relates generally to control systems, and more particularly to electronically controlled suspension systems.

2. Description of the Related Art

Feedback control systems are widely used to maintain the output of a dynamic system at a desired value in spite of external disturbances that would displace it from the desired value. For example, a household space-heating furnace, controlled by a thermostat, is an example of a feedback control system. The thermostat continuously measures the air temperature inside the house, and when the temperature falls below a desired minimum temperature the thermostat turns the furnace on. When the interior temperature reaches the desired minimum temperature, the thermostat turns the furnace off. The thermostat-furnace system maintains the household temperature at a substantially constant value in spite of external disturbances such as a drop in the outside temperature. Similar types of feedback controls are used in many applications.

A central component in a feedback control system is a controlled object, a machine, or a process that can be defined as a "plant", having an output variable or performance characteristic to be controlled. In the above example, the "plant" is the house, the output variable is the interior air temperature in the house and the disturbance is the flow of heat (dispersion) through the walls of the house. The plant is controlled by a control system. In the above example, the control system is the thermostat in combination with the furnace. The thermostat-furnace system uses simple on-off feedback control system to maintain the temperature of the house. In many control environments, such as motor shaft position or motor speed control systems, simple on-off feedback control is insufficient. More advanced control systems rely on combinations of proportional feedback control, integral feedback control, and derivative feedback control. A feedback control based on a sum of proportional feedback, plus integral feedback, plus derivative feedback, is often referred as PID control.

A PID control system is a linear control system that is based on a dynamic model of the plant. In classical control systems, a linear dynamic model is obtained in the form of dynamic equations, usually ordinary differential equations. The plant is assumed to be relatively linear, time invariant, and stable. However, many real-world plants are time-varying, highly non-linear, and unstable. For example, the dynamic model may contain parameters (e.g., masses, inductance, aerodynamics coefficients, etc.), which are either only approximately known or depend on a changing environment. If the parameter variation is small and the dynamic model is stable, then the PID controller may be satisfactory. However, if the parameter variation is large or if the dynamic model is unstable, then it is common to add adaptive or intelligent (AI) control functions to the PID control system.

AI control systems use an optimizer, typically a non-linear optimizer, to program the operation of the PID controller and thereby improve the overall operation of the control system.

Classical advanced control theory is based on the assumption that near of equilibrium points all controlled "plants" can be approximated as linear systems. Unfortunately, this assumption is rarely true in the real world. Most plants are highly nonlinear, and often do not have simple control algorithms. In order to meet these needs for a nonlinear control, systems have been developed that use soft computing concepts such as genetic algorithms, fuzzy neural networks, fuzzy controllers and the like. By these techniques, the control system evolves (changes) over time to adapt itself to changes that may occur in the controlled "plant" and/or in the operating environment.

Currently, self-organizing control systems based on fuzzy controllers suffer from two drawbacks. First, when a genetic analyzer is used to develop a teaching signal for a fuzzy neural network, the teaching signal typically contains unnecessary stochastic noise, making it difficult to later develop an approximation to the teaching signal. Second, the fitness functions used for the genetic analyzers in self-organizing suspension control systems typically optimize the control system according to some desired control paradigm without reference to human factors such as rider comfort.

SUMMARY

The present invention solves these and other problems by providing a control system for optimizing a shock absorber system having a non-linear kinetic characteristic. The control system uses a fitness (performance) function that is based on the physical laws of minimum entropy and biologically inspired constraints relating to rider comfort, driveability, etc. In one embodiment, a genetic analyzer is used in an off-line mode to develop a teaching signal. An information filter is used to filter the teaching signal to produce a compressed teaching signal. The compressed teaching signal can be approximated online by a fuzzy controller that operates using knowledge from a knowledge base. The control system can be used to control complex plants described by nonlinear, unstable, dissipative models. The control system is configured to use smart simulation techniques for controlling the shock absorber (plant).

In one embodiment, the control system comprises a learning system, such as a neural network that is trained by a genetic analyzer. The genetic analyzer uses a fitness function that maximizes sensor information while minimizing entropy production based on biologically-inspired constraints.

In one embodiment, a suspension control system uses a difference between the time differential (derivative) of entropy (called the production entropy rate) from the learning control unit and the time differential of the entropy inside the controlled process (or a model of the controlled process) as a measure of control performance. In one embodiment, the entropy calculation is based on a thermodynamic model of an equation of motion for a controlled process plant that is treated as an open dynamic system.

The control system is trained by a genetic analyzer that generates a teaching signal. The optimized control system provides an optimum control signal based on data obtained from one or more sensors. For example, in a suspension system, a plurality of angle and position sensors can be used. In an off-line learning mode (e.g., in the laboratory, factory, service center, etc.), fuzzy rules are evolved using a kinetic model (or simulation) of the vehicle and its suspension system. Data from the kinetic model is provided to an entropy calculator that calculates input and output entropy production of the model. The input and output entropy productions are provided to a fitness function calculator that calculates a fitness function as a difference in entropy production rates for the genetic analyzer constrained by one or more constraints obtained from rider preferences. The genetic analyzer uses the fitness function to develop a training signal for the off-line control system. The training signal is filtered to produce a compressed training signal. Control parameters from the off-line control system are then provided to an online control system in the vehicle that, using information from a knowledge base, develops an approximation to the compressed training signal.

In one embodiment, the invention includes a method for controlling a nonlinear object (a plant) by obtaining an entropy production difference between a time differentiation ($dS_u/dt$) of the entropy of the plant and a time differentiation ($dS_c/dt$) of the entropy provided to the plant from a controller. A genetic algorithm that uses the entropy production difference as a fitness (performance) function evolves a control rule in an off-line controller. The nonlinear stability characteristics of the plant are evaluated using a Lyapunov function. The genetic analyzer minimizes entropy and maximizes sensor information content. Filtered control rules from the off-line controller are provided to an online controller to control suspension system. In one embodiment, the online controller controls the damping factor of one or more shock absorbers (dampers) in the vehicle suspension system.

In some embodiments, the control method also includes evolving a control rule relative to a variable of the controller by means of a genetic algorithm. The genetic algorithm uses a fitness function based on a difference between a time differentiation of the entropy of the plant ($dS_u/dt$) and a time differentiation ($dS_c/dt$) of the entropy provided to the plant. The variable can be corrected by using the evolved control rule.

In one embodiment, the invention comprises a self-organizing control system adapted to control a nonlinear plant. The AI control system includes a simulator configured to use a thermodynamic model of a nonlinear equation of motion for the plant. The thermodynamic model is based on a Lyapunov function (V), and the simulator uses the function V to analyze control for a state stability of the plant. The control system calculates an entropy production difference between a time differentiation of the entropy of said plant ($dS_u/dt$) and a time differentiation ($dS_c/dt$) of the entropy provided to the plant by a low-level controller that controls the plant. The entropy production difference is used by a genetic algorithm to obtain an adaptation function wherein the entropy production difference is minimized in a constrained fashion. The genetic algorithm provides a teaching signal. The teaching signal is filtered to remove stochastic noise to produce a filtered teaching signal. The filtered teaching signal is provided to a fuzzy logic classifier that determines one or more fuzzy rules by using a learning process. The fuzzy logic controller is also configured to form one or more control rules that set a control variable of the controller in the vehicle.

In yet another embodiment, the invention comprises a new physical measure of control quality based on minimum production entropy and using this measure for a fitness function of genetic algorithm in optimal control system design. This method provides a local entropy feedback loop in the control system. The entropy feedback loop provides for optimal control structure design by relating stability of the plant (using a Lyapunov function) and controllability of the plant (based on production entropy of the control system). The control system is applicable to a wide variety of control systems, including, for example, control systems for mechanical systems, bio-mechanical systems, robotics, electro-mechanical systems, etc.

BRIEF DESCRIPTION OF THE FIGURES

The above and other aspects, features, and advantages of the present invention will be more apparent from the following description thereof presented in connection with the following drawings.

FIG. 6A is a plot showing results of stochastic simulations based on a one-dimensional Gaussian probability density function.

FIG. 6B is a plot showing results of stochastic simulations based on a one-dimensional uniform probability density function.

Figure 1:
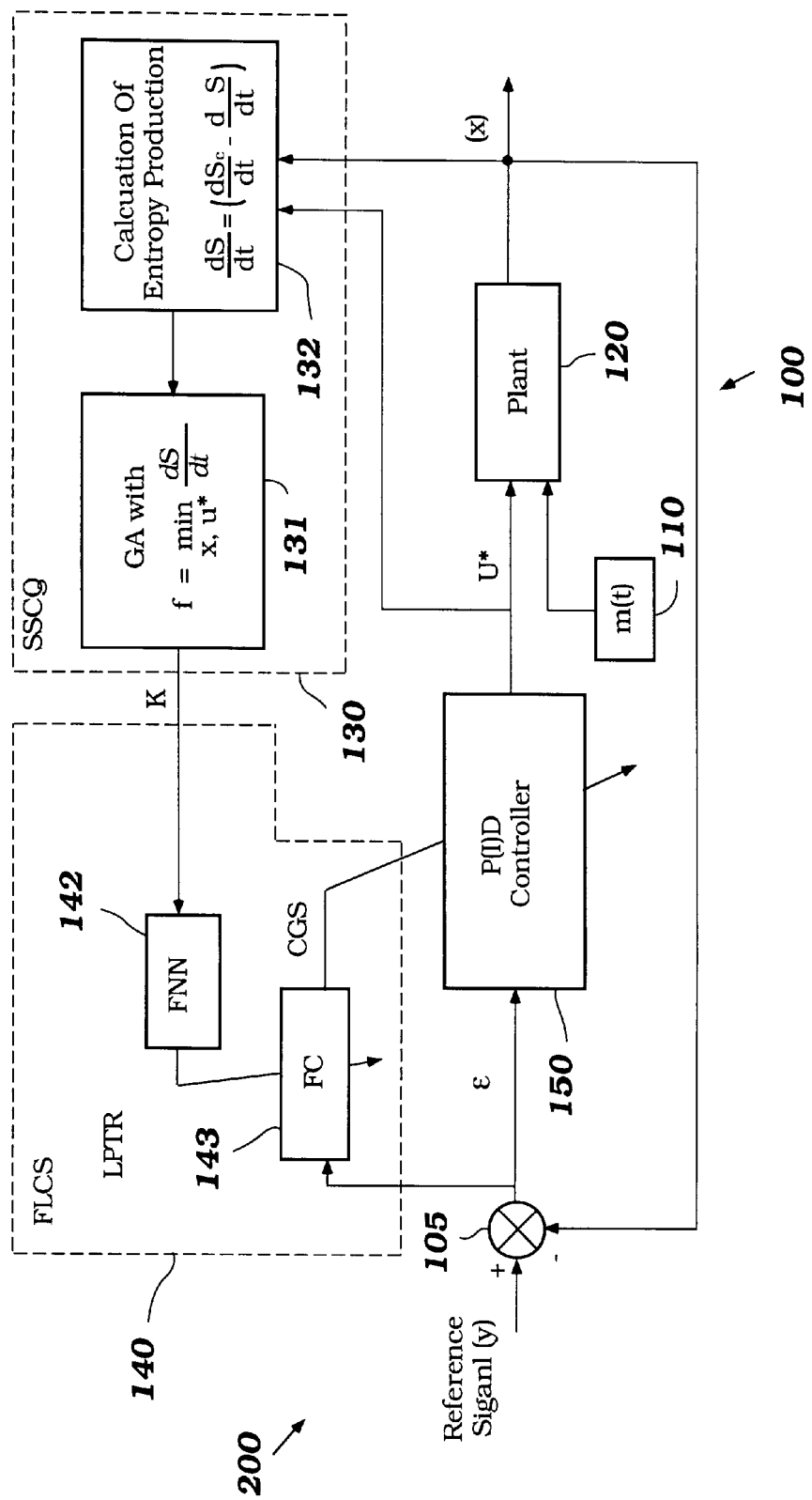
FIG. 1 illustrates a general structure of a self-organizing intelligent control system based on soft computing.

In the drawings, the first digit of any three-digit element reference number generally indicates the number of the figure in which the referenced element first appears. The first two digits of any four-digit element reference number generally indicate the figure in which the referenced element first appears.

DESCRIPTION

FIG. 1 is a block diagram of a control system 100 for controlling a plant based on soft computing. In the controller 100, a reference signal y is provided to a first input of an adder 105. An output of the adder 105 is an error signal $\epsilon$, which is provided to an input of a Fuzzy Controller (FC) 143 and to an input of a Proportional-Integral-Differential (PID) controller 150. An output of the PID controller 150 is a control signal u*, which is provided to a control input of a plant 120 and to a first input of an entropy-calculation module 132. A disturbance m(t) 110 is also provided to an input of the plant 120. An output of the plant 120 is a response x, which is provided to a second input the entropy-calculation module 132 and to a second input of the adder 105. The second input of the adder 105 is negated such that the output of the adder 105 (the error signal $\epsilon$) is the value of the first input minus the value of the second input.

An output of the entropy-calculation module 132 is provided as a fitness function to a Genetic Analyzer (GA) 131. An output solution from the GA 131 is provided to an input of a FNN 142. An output of the FNN 142 is provided as a knowledge base to the FC 143. An output of the FC 143 is provided as a gain schedule to the PID controller 150.

The GA 131 and the entropy calculation module 132 are part of a Simulation System of Control Quality (SSCQ) 130. The FNN 142 and the FC 143 are part of a Fuzzy Logic Classifier System (FLCS) 140.

Using a set of inputs, and the fitness function 132, the genetic algorithm 131 works in a manner similar to a biological evolutionary process to arrive at a solution which is, hopefully, optimal. The genetic algorithm 131 generates sets of "chromosomes" (that is, possible solutions) and then sorts the chromosomes by evaluating each solution using the fitness function 132. The fitness function 132 determines where each solution ranks on a fitness scale. Chromosomes (solutions) which are more fit are those chromosomes which correspond to solutions that rate high on the fitness scale. Chromosomes which are less fit are those chromosomes which correspond to solutions that rate low on the fitness scale.

Chromosomes that are more fit are kept (survive) and chromosomes that are less fit are discarded (die). New chromosomes are created to replace the discarded chromosomes. The new chromosomes are created by crossing pieces of existing chromosomes and by introducing mutations.

The PID controller 150 has a linear transfer function and thus is based upon a linearized equation of motion for the controlled "plant" 120. Prior art genetic algorithms used to program PID controllers typically use simple fitness and thus do not solve the problem of poor controllability typically seen in linearization models. As is the case with most optimizers, the success or failure of the optimization often ultimately depends on the selection of the performance (fitness) function.

Evaluating the motion characteristics of a nonlinear plant is often difficult, in part due to the lack of a general analysis method. Conventionally, when controlling a plant with non-linear motion characteristics, it is common to find certain equilibrium points of the plant and the motion characteristics of the plant are linearized in a vicinity near an equilibrium point. Control is then based on evaluating the pseudo (linearized) motion characteristics near the equilibrium point. This technique is scarcely, if at all, effective for plants described by models that are unstable or dissipative.

Computation of optimal control based on soft computing includes the GA 131 as the first step of global search for an optimal solution on a fixed space of positive solutions. The GA searches for a set of control weights for the plant. Firstly the weight vector $K=\{k_1, \ldots, k_n\}$ is used by a conventional proportional-integral-differential (PID) controller 150 in the generation of a signal $u^*=\delta(K)$ which is applied to the plant. The entropy $S(\delta(K))$ associated to the behavior of the plant 120 on this signal is used as a fitness function by the GA 131 to produce a solution that gives minimum entropy production. The GA 131 is repeated several times at regular time intervals in order to produce a set of weight vectors K. The vectors K generated by the GA 131 are then provided to the FNN 142 and the output of the FNN 142 to the fuzzy controller 143. The output of the fuzzy controller 143 is a collection of gain schedules for the PID controller 150 that controls the plant. For the soft computing system 100 based on a genetic analyzer, there is very often no real control law in the classical control sense, but rather, control is based on a physical control law such as minimum entropy production.

Figure 2:
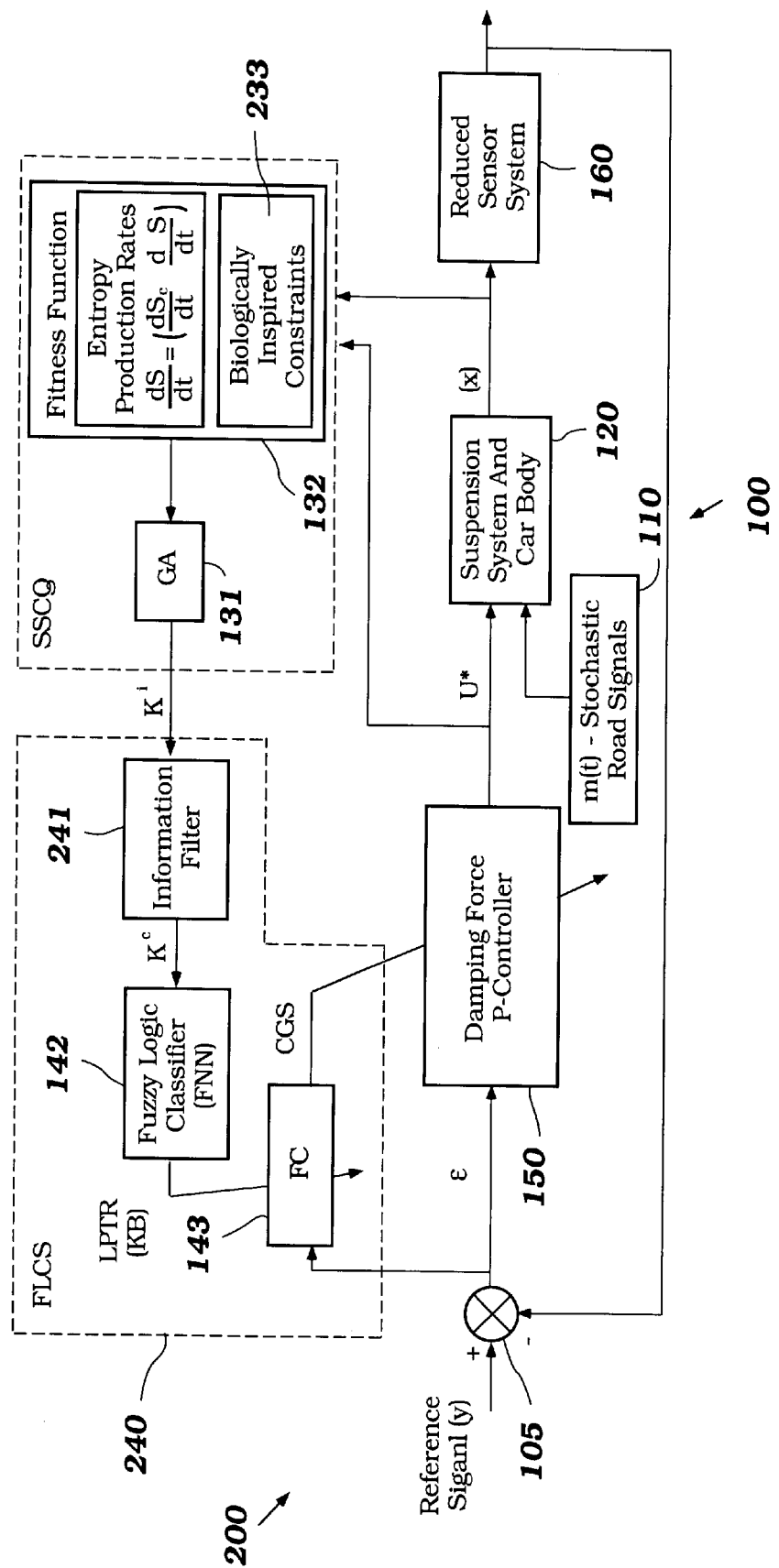
FIG. 2 illustrates the structure of a self-organizing intelligent suspension control system with physical and biological measures of control quality based on soft computing

In order to realize an intelligent mechatronic suspension control system, the structure depicted on FIG. 1 is modified, as shown on FIG. 2 to produce a system 200 for controlling a plant, such as suspension system. The system 200 is similar to the system 100 with the addition of an information filter 241 and biologically-inspired constraints 233 in the fitness function 132. The information filter 241 is placed between the GA 131 and the FNN 142 such that a solution vector output $K_i$ from the GA 131 is provided to an input of the information filter 241. An output of the information filter 241 is a filtered solution vector $K_c$ that is provided to the input of the FNN 142. In FIG. 2, the disturbance 110 is a road signal m(t). (e.g., measured data or data generated via stochastic simulation). In FIG. 2, the plant 120 is a suspension system and car body. The fitness function 132, in addition to entropy production rate, includes biologically-inspired constraints based on mechanical and/or human factors. In one embodiment, the filter 241 includes an information compressor that reduces unnecessary noise in the input signal of the FNN 142. In FIG. 2, the PID controller 150 is shown as a proportional damping force controller.

Figure 3:
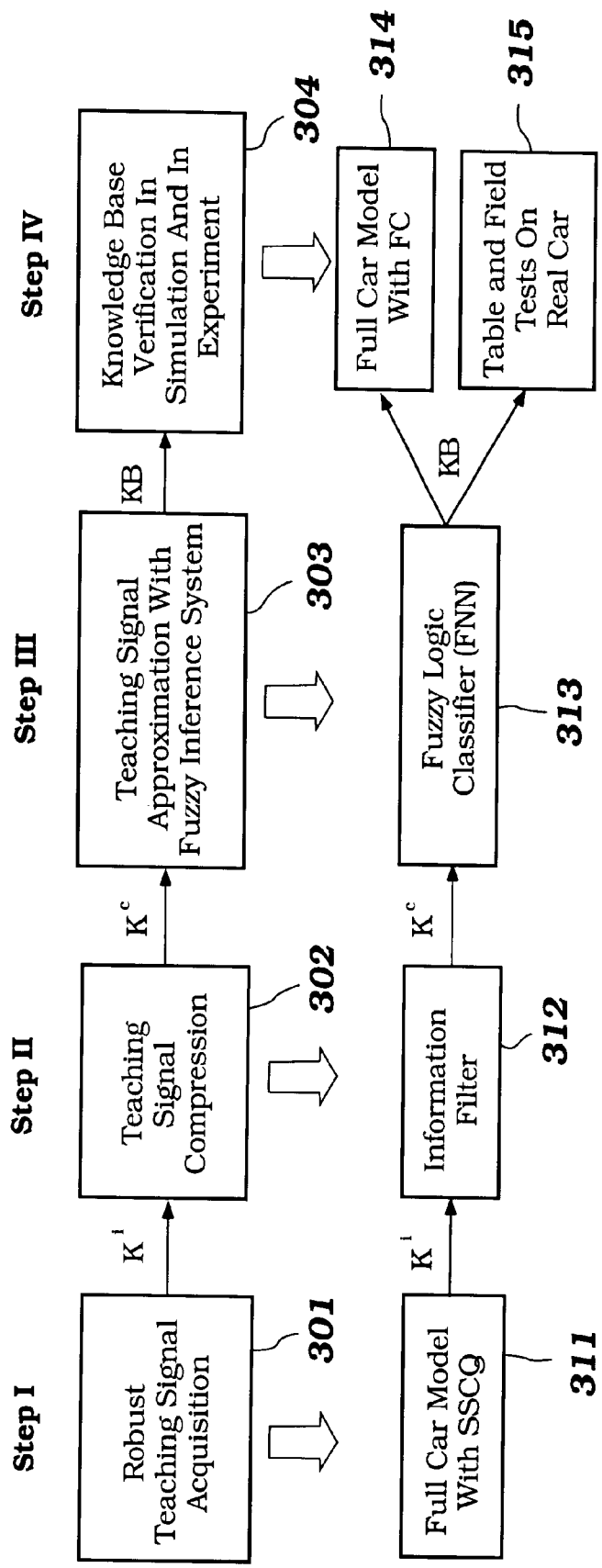
FIG. 3 illustrates the process of constructing the Knowledge Base (KB) for the Fuzzy Controller (FC).

As shown in FIG. 3, realization of the structure depicted in FIG. 2 is divided into four development stages. The development stages include a teaching signal acquisition stage 301, a teaching signal compression stage 302, a teaching signal approximation stage 303, and a knowledge base verification stage 304.

The teaching signal acquisition stage 301 includes the acquisition of a robust teaching signal without the loss of information. In one embodiment, the stage 301 is realized using stochastic simulation of a full car with a Simulation System of Control Quality (SSCQ) under stochastic excitation of a road signal. The stage 301 is based on models of the road, of the car body, and of models of the suspension system. Since the desired suspension system control typically aims for the comfort of a human, it is also useful to develop a representation of human needs, and transfer these representations into the fitness function 132 as constraints 233.

The output of the stage 301 is a robust teaching signal $K_i$, which contains information regarding the car behavior and corresponding behavior of the control system.

Behavior of the control system is obtained from the output of the GA 131, and behavior of the car is a response of the model for this control signal. Since the teaching signal $K_i$ is generated by a genetic algorithm, the teaching signal $K_i$ typically has some unnecessary stochastic noise in it. The stochastic noise can make it difficult to realize (or develop a good approximation for) the teaching signal $K_i$. Accordingly, in a second stage 302, the information filter 241 is applied to the teaching signal $K_i$ to generate a compressed teaching signal $K_c$. The information filter 241 is based on a theorem of Shannon's information theory (the theorem of compression of data). The information filter 241 reduces the content of the teaching signal by removing that portion of the teaching signal $K_i$ that corresponds to unnecessary information. The output of the second stage 302 is a compressed teaching signal $K_c$.

The third stage 303 includes approximation of the compressed teaching signal $K_c$ by building a fuzzy inference system using a fuzzy logic classifier (FLC) based on a Fuzzy Neural Network (FNN). Information of car behavior can be used for training an input part of the FNN, and corresponding information of controller behavior can be used for output-part training of the FNN.

The output of the third stage 303 is a knowledge base (KB) for the FC 143 obtained in such a way that it has the knowledge of car behavior and knowledge of the corresponding controller behavior with the control quality introduced as a fitness function in the first stage 301 of development. The KB is a data file containing control laws of the parameters of the fuzzy controller, such as type of membership functions, number of inputs, outputs, rule base, etc.

In the fourth stage 304, the KB can be verified in simulations and in experiments with a real car, and it is possible to check its performance by measuring parameters that have been optimized.

Figure 4:
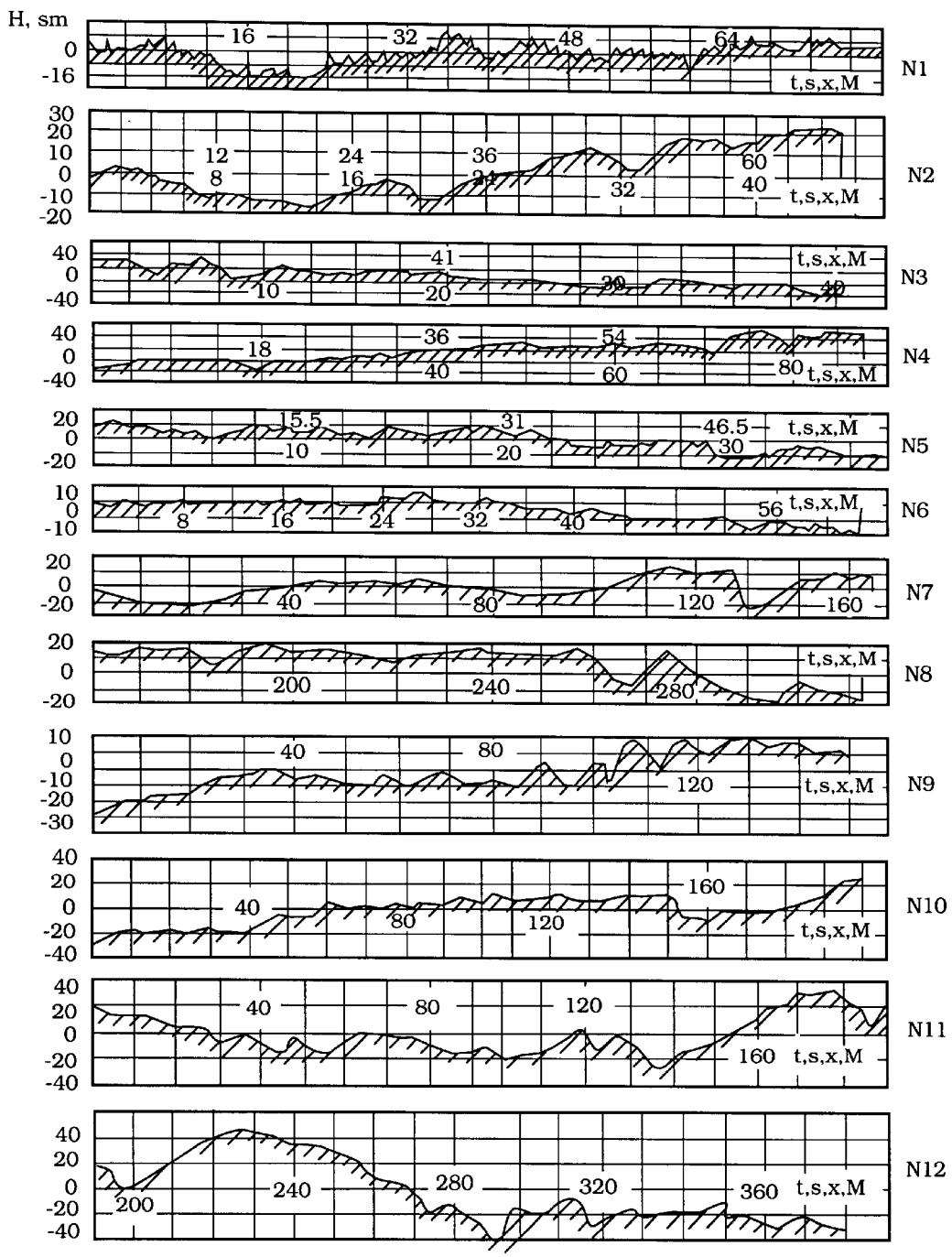
FIG. 4 shows twelve typical road profiles.
Figure 5:
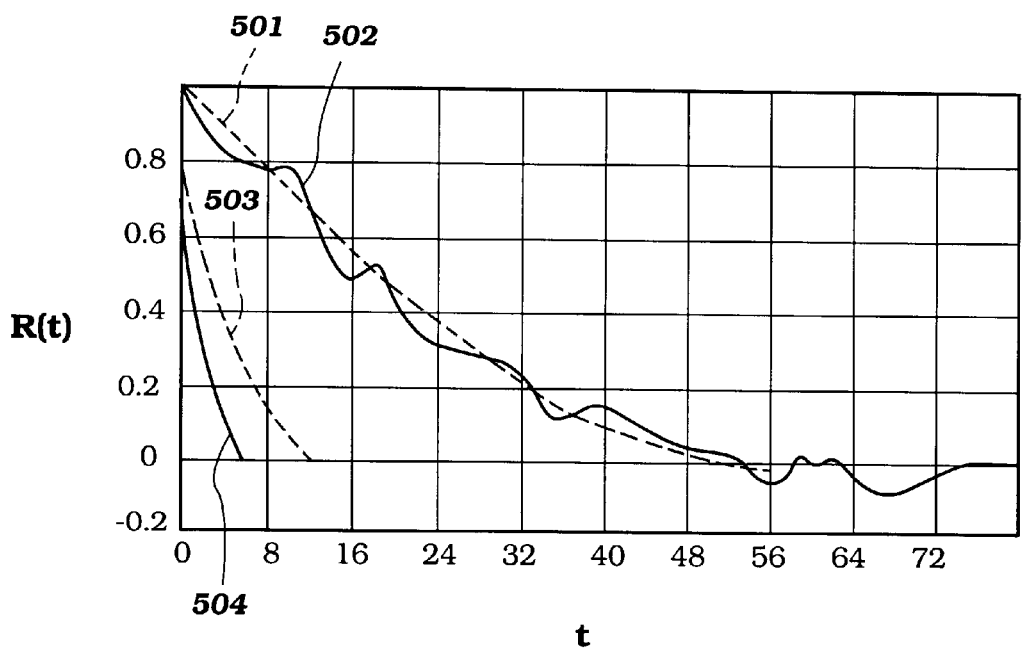
FIG. 5 shows a normalized auto-correlation function for different velocities of motion along the road number 9 from FIG. 4.

To summarize, the development of the KB for an intelligent control suspension system includes:
I. Obtaining a stochastic model of the road or roads.
II. Obtaining a realistic model of a car and its suspension system.
III. Development of a Simulation System of Control Quality with the car model for genetic algorithm fitness function calculation, and introduction of human needs in the fitness function.
IV. Development of the information compressor (information filter).
V. Approximation of the teaching signal with a fuzzy logic classifier system (FLCS) and obtaining the KB for the FC
VI. Verification of the KB in experiment and/or in simulations of the full car model with fuzzy control
  I. Obtaining Stochastic Models of the Roads It is convenient to consider different types of roads as stochastic processes with different auto-correlation functions and probability density functions. FIG. 4 shows twelve typical road profiles. Each profile shows distance along the road (on the x-axis), and altitude of the road (on the y-axis) with respect to a reference altitude. FIG. 5 shows a normalized auto-correlation function for different velocities of motion along the road number 9 (from FIG. 4). In FIG. 5, a curve 501 and a curve 502 show the normalized auto-correlation function for a velocity $\vartheta=1$ meter/sec, a curve 503 shows the normalized auto-correlation function for $\vartheta=5$ meter/sec, and a curve 504 shows the normalized auto-correlation function for $\vartheta=10$ meter/sec.

The results of statistical analysis of actual roads, as shown in FIG. 4, show that it is useful to consider the road signals as stochastic processes using the following three typical auto-correlation functions.

$$R(\tau)=B(0)\exp\{-\alpha_1\vartheta|\tau|\}; \qquad (1.1)$$

$$R(\tau)=B(0)\exp\{-\alpha_1\vartheta|\tau|\}\cos\beta_1\vartheta\tau; \qquad (1.2)$$

$$R(\tau) = B(0)\exp\{-\alpha_1\vartheta|\tau|\}\left[\cos\beta_1\vartheta\tau + \frac{\alpha_1}{\beta_1}\sin(\beta_1\vartheta|\tau|)\right], \qquad (1.3)$$

where $\alpha_1$ and $\beta_1$ are the values of coefficients for single velocity of motion. The ranges of values of these coefficients are obtained from experimental data as:
$\alpha_1=0.014$ to $0.111$; $\beta_1=0.025$ to $0.140$.
For convenience, the roads are divided into three classes:
A. $\sqrt{B(0)} \leq 10$ sm—small obstacles;
B. $\sqrt{B(0)}=10$ sm to 20 sm—medium obstacles;
C. $\sqrt{B(0)}>20$ sm—large obstacles.

The presented auto-correlation functions and its parameters are used for stochastic simulations of different types of roads using forming filters. The methodology of forming filter structure can be described according to the first type of auto-correlation functions (1.1) with different probability density functions.

Consider a stationary stochastic process X(t) defined on the interval $[x_l,x_r]$, which can be either bounded or unbounded. Without loss of generality, assume that X(t) has a zero mean. Then $x_l<0$ and $x_r>0$. With the knowledge of the probability density p(x) and the spectral density $\Phi_{XX}(\omega)$ of X(t), one can establish a procedure to model the process X(t).

Let the spectral density be of the following low-pass type:

$$\Phi_{XX}(\omega) = \frac{\alpha\sigma^2}{\pi(\omega^2 + \alpha^2)}, \; \alpha > 0, \qquad (2.1)$$

where $\sigma^2$ is the mean-square value of X(t). If X(t) is also a diffusive Markov process, then it is governed by the following stochastic differential equation in the Ito sense (see Appendix I):

$$dX=-\alpha X dt+D(X)dB(t), \qquad (2.2)$$

where $\alpha$ is the same parameter in (2.1), B(t) is a unit Wiener process, and the coefficients $-\alpha X$ and $D(X)$ are known as drift and the diffusion coefficients, respectively. To demonstrate that this is the case, multiply (2.2) by $X(t-\tau)$ and take the ensemble average to yield $$\frac{dR(\tau)}{d\tau} = -\alpha R(\tau), \qquad (2.3)$$

where $R(\tau)$ is the correlation function of X(t), namely, $R(\tau)=E[X(t-\tau)X(t)]$. Equation (2.3) has a solution $$R(\tau)=A\exp(-\alpha|\tau|) \qquad (2.4)$$

in which A is arbitrary. By choosing $A=\sigma^2$, equations (2.1) and (2.4) become a Fourier transform pair. Thus equation (2.2) generates a process X(t) with a spectral density (2.1). Note that the diffusion coefficient D(X) has no influence on the spectral density.

Now it is useful to determine D(X) so that X(t) possesses a given stationary probability density p(x). The Fokker-Planck equation, governing the probability density p(x) of X(t) in the stationary state, is obtained from equation (2.2) as follows:

$$\frac{d}{dx}G = -\frac{d}{dx}\left\{\alpha x p(x) + \frac{1}{2}\frac{d}{dx}[D^2(x)p(x)]\right\} = 0, \quad (2.5)$$

where G is known as the probability flow. Since X(t) is defined on $[x_l, x_r]$, G must vanish at the two boundaries $x=x_l$ and $x=x_r$. In the present one-dimensional case, G must vanish everywhere; consequently, equation (2.5) reduces to $$\alpha x p(x) + \frac{1}{2}\frac{d}{dx}[D^2(x)p(x)] = 0. \quad (2.6)$$

Integration of equation (2.6) results in $$D^2(x)p(x) = -2\alpha \int_{x_l}^{x_r} u p(u) du + C, \quad (2.7)$$

where C is an integration constant. To determine the integration constant C, two cases are considered. For the first case, if $x_l=-\infty$, or $x_r=\infty$, or both, then p(x) must vanish at the infinite boundary; thus C=0 from equation (2.7). For the second case, if both $x_l$ and $x_r$ are finite, then the drift coefficient $-\alpha x_l$ at the left boundary is positive, and the drift coefficient $-\alpha x_r$ at the right boundary is negative, indicating that the average probability flows at the two boundaries are directed inward. However, the existence of a stationary probability density implies that all sample functions must remain within $[x_l, x_r]$, which requires additionally that the drift coefficient vanish at the two boundaries, namely, $D^2(x_l)=D^2(x_r)=0$. This is satisfied only if C=0. In either case, $$D^2(x) = -\frac{2\alpha}{p(x)}\int_{x_l}^{x_r} u p(u) du. \quad (2.8)$$

Function $D^2(x)$, computed from equation (2.8), is nonnegative, as it should be, since $p(x) \geq 0$ and the mean value of X(t) is zero. Thus the stochastic process X(t) generated from (2.2) with D(x) given by (2.8) possesses a given stationary probability density p(x) and the spectral density (2.1).

The Ito type stochastic differential equation (2.2) may be converted to that of the Stratonovich type (see Appendix I) as follows:

$$\dot{X} = -\alpha X - \frac{1}{4}\frac{dD^2(X)}{dX} + \frac{D(X)}{\sqrt{2\pi}}\xi(t), \quad (2.9)$$

where $\xi(t)$ is a Gaussian white noise with a unit spectral density. Equation (2.9) is better suited for simulating sample functions. Some illustrative examples are given below.

EXAMPLE 1

Assume that X(t) is uniformly distributed, namely, $$p(x) = \frac{1}{2\Delta}, -\Delta \leq x \leq \Delta. \quad (2.10)$$

Substituting (2.10) into (2.8)

$$D^2(x) = \alpha(\Delta^2 - x^2). \quad (2.11)$$

In this case, the desired Ito equation is given by $$dX = -\alpha X dt + \sqrt{\alpha(\Delta^2 - X^2)} dB(t). \quad (2.12)$$

It is of interest to note that a family of stochastic processes can be obtained from the following generalized version of (2.12):

$$dX = -\alpha X dt + \sqrt{\alpha\beta(\Delta^2 - X^2)} dB(t). \quad (2.13)$$

Their appearances are strikingly diverse, yet they share the same spectral density (2.1).

EXAMPLE 2

Let X(t) be governed by a Rayleigh distribution $$p(x) = \gamma y^2 x \exp(-\gamma x), \gamma > 0, 0 \leq x < \infty. \quad (2.14)$$

Its centralized version $Y(t)=X(t)-2/\gamma$ has a probability density $$p(y) = \gamma(\gamma y + 2) \exp(-\gamma y + 2), -2/\gamma \leq y < \infty. \quad (2.15)$$

From equation (2.8), $$D^2(y) = \frac{2\alpha}{\gamma}\left(y + \frac{2}{\gamma}\right). \quad (2.16)$$

The Ito equation for Y(t) is $$dY = -\alpha Y dt + \left[\frac{2\alpha}{\gamma}\left(Y + \frac{2}{\gamma}\right)\right]^{1/2} dB(t) \quad (2.17)$$

and the correspondence equation for X(t) in the Stratonovich form is $$\dot{X} = -\alpha X + \frac{3\alpha}{2\gamma} + \left(\frac{\alpha}{\pi\gamma}X\right)^{1/2}\xi(t). \quad (2.18)$$

Note that the spectral density of X(t) contains a delta function $(4/\gamma^2)\delta(\omega)$ due to the nonzero mean $2/\gamma$.

EXAMPLE 3

Consider a family of probability densities, which obeys an equation of the form $$\frac{d}{dx}p(x) = J(x)p(x). \quad (2.19)$$

Equation (2.19) can be integrated to yield $$p(x) = C_1 \exp(\int J(x) dx) \quad (2.20)$$

where $C_1$ is a normalization constant. In this case $$D^2(x) = -2\alpha \exp[-J(x)] \int x \exp[J(x)] dx. \quad (2.21)$$

Several special cases may be noted. Let $$J(x) = -\gamma x^2 - \delta x^4, -\infty < x < \infty \quad (2.22)$$

where $\gamma$ can be arbitrary if $\delta > 0$. Substitution of equation (2.22) into equation (2.8) leads to $$D^2(x) = \frac{\alpha}{2}\sqrt{\pi/\delta}\exp\left[\delta\left(x^2 + \frac{\gamma}{2\delta}\right)^2\right]erfc\left[\sqrt{\delta}\left(x^2 + \frac{\gamma}{2\delta}\right)\right], \quad (2.23)$$

where $erfc(y)$ is the complementary error function defined as $$erfc(y) = \frac{2}{\sqrt{\pi}}\int_y^\infty e^{-t^2} dt. \quad (2.24)$$

The case of $\gamma < 0$ and $\delta > 0$ corresponds to a bimodal distribution, and the case of $\gamma > 0$ and $\delta = 0$ corresponds to a Gaussian distribution.

The Pearson family of probability distributions corresponds to $$J(x) = \frac{a_1 x + a_0}{b_2 x^2 + b_1 x + b_0} \quad (2.25)$$

In the special case of $a_0 + b_1 = 0$, $$D^2(x) = -\frac{2\alpha}{a_1 + b_2}(b_2 x^2 + b_1 x + b_0). \quad (2.26)$$

From the results of statistical analysis of forming filters with auto-correlation function (1.1) one can describe typical structure of forming filters as in Table 2.1:

where $B_i$, $i=1,2$ are two independent unit Wiener processes.

For a system to be stable and to possess a stationary probability density, is required that $a_{11} < 0$, $a_{22} < 0$ and $a_{11}a_{22} - a_{12}a_{21} > 0$. Multiplying (3.1) by $x_1(t-\tau)$ and taking the ensemble average, gives $$\frac{d}{d\tau}R_{11}(\tau) = a_{11}R_{11}(\tau) + a_{12}R_{12}(\tau) \quad (3.2)$$

$$\frac{d}{d\tau}R_{12}(\tau) = a_{21}R_{11}(\tau) + a_{22}R_{12}(\tau)$$

where $R_{11}(\tau) = M[x_1(t-\tau)x_1(t)]$, $R_{12}(\tau) = M[x_1(t-\tau)x_2(t)]$ with initial conditions $R_{11}(0) = m_{11} = M[x_1^2]$, $R_{12}(0) = m_{12} = M[x_1 x_2]$.

Differential equations (3.2) in the time domain can be transformed (using the Fourier transform) into algebraic equations in the frequency domain as follows $$i\omega \bar{R}_{11} - \frac{m_{11}}{\pi} = a_{11}\bar{R}_{11} + a_{12}\bar{R}_{12} \quad (3.3)$$

$$i\omega \bar{R}_{12} - \frac{m_{12}}{\pi} = a_{21}\bar{R}_{11} + a_{22}\bar{R}_{12},$$

where $\bar{R}_{ij}(\omega)$ define the following integral Fourier transformation:

$$\bar{R}_{ij}(\omega) = \Theta[\bar{R}_{ij}(\tau)] = \frac{1}{\pi}\int_0^\infty R_{ij}(\tau)e^{-i\omega\tau} d\tau.$$

Then the spectral density $S_{11}(\omega)$ of $x_1(t)$ can be obtained as $$S_{11}(\omega) = \frac{1}{2\pi}\int_{-\infty}^\infty R_{11}(\tau)e^{-i\omega\tau} d\tau = Re[\bar{R}_{11}(\omega)], \quad (3.4)$$

where Re denotes the real part.

TABLE 2.1

The Structures of Forming Filters for Typical Probability Density Functions p(x)

| Auto-correlation function | Probability density function | Forming filter structure |
|---|---|---|
| $R_y(\tau) = \sigma^2 e^{-\alpha|\tau|}$ | Gaussian | $\dot{y} + \alpha y = \sigma^2 \xi(t)$ |
| $R_y(\tau) = \sigma^2 e^{-\alpha|\tau|}$ | Uniform | $\dot{y} + \frac{\alpha}{2}y = \frac{\sigma^2}{2\pi}\sqrt{\alpha(\Delta^2 - y^2)}\,\xi(t)$ |
| $R_y(\tau) = \sigma^2 e^{-\alpha|\tau|}$ | Rayleigh | $\dot{y} + \alpha y \pm \frac{2\alpha}{\gamma} = \frac{\sigma^2}{\sqrt{2\pi}}\sqrt{\frac{2\alpha}{\gamma}\left(y + \frac{2}{\gamma}\right)}\,\xi(t)$ |
| $R_y(\tau) = \sigma^2 e^{-\alpha|\tau|}$ | Pearson | $\dot{y} + \alpha y + \frac{\alpha}{a_1 + 2b_2}(b_2 x + b_1) = \frac{\sigma^2}{\sqrt{2\pi}}\sqrt{\frac{2\alpha}{a_1 + 2b_2}(b_2 y^2 + b_1 y + b_0)}\,\xi$ |

The structure of a forming filter with an auto-correlation function given by equations (1.2) and (1.3) is derived as follows. A two-dimensional (2D) system is used to generate a narrow-band stochastic process with the spectrum peak located at a nonzero frequency. The following pair of Ito equations describes a large class of 2D systems:

$$dx_1 = (a_{11}x_1 + a_{12}x_2)dt + D_1(x_1, x_2)dB_1(t),$$
$$dx_2 = (a_{21}x_1 + a_{22}x_2)dt + D_2(x_1, x_2)dB_2(t), \quad (3.1)$$

Since $R_{ij}(\tau) \to 0$ as $\tau \to \infty$, it can be shown that $$\Theta\left(\frac{dR_{ij}(\tau)}{d\tau}\right) = i\omega \bar{R}_{ij}(\omega) - \frac{1}{\pi}R_{ij}(0)$$

and equation (3.3) is obtained using this relation.

Solving equation (3.3) for $\bar{R}_{ij}(\omega)$ and taking its real part, gives $$S_{11}(\omega) = \frac{-(a_{11}m_{11} + a_{12}m_{12})\omega^2 + A_2(a_{12}m_{12} - a_{22}m_{11})}{\pi[\omega^4 + (A_1^2 - 2A_2)\omega^2 + A_2^2]}, \quad (3.5)$$

where $A_1 = a_{11} + a_{22}$, and $A_2 = a_{11}a_{22} - a_{12}a_{21}$.

Expression (3.5) is the general expression for a narrow-band spectral density. The constants $a_{ij}$, $i,j=1,2$, can be adjusted to obtain a best fit for a target spectrum. The task is to determine non-negative functions $D_1^2(x_1 x_2)$ and $D_2^2(x_1 x_2)$ for a given $p(x_1,x_2)$.

Forming filters for simulation of non-Gaussian stochastic processes can be derived as follows. The Fokker-Planck-Kolmogorov (FPK) equation for the joint density $p(x_1,x_2)$ of $x_1(t)$ and $x_2(t)$ in the stationary state is given as $$\frac{\partial}{x_1}\left((a_{11}x_1 + a_{12}x_2)p - \frac{1}{2}\frac{\partial}{x_1}[D_1^2(x_1, x_2)p]\right) + \frac{\partial}{x_2}\left((a_{21}x_1 + a_{22}x_2)p - \frac{1}{2}\frac{\partial}{x_2}[D_2^2(x_1, x_2)p]\right) = 0$$

If such $D_1^2(x_1,x_2)$ and $D_2^2(x_1,x_2)$ functions can be found, then the equations of forming filters for the simulation in the Stratonovich form are given by $$\dot{x}_1 = a_{11}x_1 + a_{12}x_2 - \frac{1}{4}\frac{\partial}{x_1}D_1^2(x_1, x_2) + \frac{D_1(x_1, x_2)}{\sqrt{2\pi}}\xi_1(t), \quad (3.6)$$

$$\dot{x}_2 = a_{21}x_1 + a_{22}x_2 - \frac{1}{4}\frac{\partial}{x_2}D_2^2(x_1, x_2) + \frac{D_2(x_1, x_2)}{\sqrt{2\pi}}\xi_2(t),$$

where $\xi_i(t)$, $i=1,2$, are two independent unit Gaussian white noises.

Filters (3.1) and (3.6) are non-linear filters for simulation of non-Gaussian random processes. Two typical examples are provided.

EXAMPLE 1

Consider two independent uniformly distributed stochastic process $x_1$ and $x_2$, namely, $$p(x_1, x_2) = \frac{1}{4\Delta_1\Delta_2},$$

$-\Delta_1 \leq x_1 \leq \Delta_1$, $-\Delta_2 \leq x_2 \leq \Delta_2$.

In this case, from the FPK equation, one obtains $$a_{11} - \frac{1}{2}\frac{\partial^2}{x_1^2}D_1^2 + a_{21} - \frac{1}{2}\frac{\partial^2}{x_2^2}D_2^2 = 0,$$

which is satisfied if $D_1^2 = -a_{11}(\Delta_1 - x_1^2)$, $D_1^2 = -a_{22}(\Delta_2 - x_2^2)$.

The two non-linear equations in (3.6) are now $$\dot{x}_1 = \frac{1}{2}a_{11}x_1 + a_{12}x_2 + \sqrt{-\frac{a_{11}}{2\pi}(\Delta_1 - x_1^2)}\,\xi_1(t) \quad (3.7)$$

$$\dot{x}_2 = \frac{1}{2}a_{22}x_1 + a_{21}x_2 + \sqrt{-\frac{a_{22}}{2\pi}(\Delta_2 - x_2^2)}\,\xi_2(t),$$

which generate a uniformly distributed stochastic process $x_1(t)$ with a spectral density given by (3.5).

EXAMPLE 2

Consider a joint stationary probability density of $x_1(t)$ and $x_2(t)$ in the form $p(x_1,x_2) = \rho(\lambda) = C_1(\lambda+b)^{-\delta}, b>0, \delta>1$, and $$\lambda = \frac{1}{2}x_1^2 - \frac{a_{12}}{2a_{21}}x_2^2.$$

A large class of probability densities can be fitted in this form. In this case $$D_1(x_1, x_2) = -\frac{2a_{11}}{\delta - 1}(\lambda + b), \quad D_2(x_1, x_2) = \frac{2a_{11}a_{12}}{a_{21}(\delta - 1)}(\lambda + b)$$

and $$p(x_1) = C_1\int_{-\infty}^{\infty}\left(\frac{1}{2}x_1^2 - \frac{a_{12}}{2a_{21}}u^2 + b\right)^{\delta}du.$$

The forming filter equations (3.6) for this case can be described as following $$\dot{x}_1 = a_{11}x_1 + a_{12}x_2 - \frac{2a_{11}^2}{(\delta-1)^2}\left[\frac{1}{2}x_1^2 - \frac{a_{12}}{2a_{21}}x_2^2 + b\right]x_1 - \quad (3.8)$$

$$\frac{2a_{11}}{\sqrt{2\pi}(\delta-1)}\cdot\left[\frac{1}{2}x_1^2 - \frac{a_{12}}{2a_{21}}x_2^2 + b\right]\xi_1(t)$$

$$\dot{x}_2 = a_{21}x_1 + a_{22}x_2 + \frac{2a_{22}^2a_{12}^3}{(\delta-1)^2}\left[\frac{1}{2}x_1^2 - \frac{a_{12}}{2a_{21}}x_2^2 + b\right]x_2 + \frac{2a_{22}a_{12}}{\sqrt{2\pi}(\delta-1)}\cdot$$

$$\left[\frac{1}{2}x_1^2 - \frac{a_{12}}{2a_{21}}x_2^2 + b\right]\xi_2(t)$$

If $\sigma_{ik}(x,t)$ are bounded functions (see Appendix I) and the functions $F_i(x,t)$ satisfy the Lipshitz condition $\|F(x'-x)\| \leq K\|x'-x\|$, $K=const>0$, then for every smoothly-varying realization of process $y(t)$ the stochastic equations can be solved by the method of successive substitution which is convergent and defines smoothly-varying trajectories $x(t)$. Thus, Markovian process $x(t)$ has smoothly trajectories with the probability 1. This result can be used as a background in numerical stochastic simulation.

The stochastic differential equation for the variable $x_i$ is given by $$\frac{dx_i}{dt} = F_i(x) + G_i(x)\xi_i(t), \quad (4.1)$$

$i = 1, 2, \ldots, N, x = (x_1, x_2, \ldots, x_N).$

These equations can be integrated using two different algorithms: Milshtein; and Heun methods. In the Milshtein method, the solution of stochastic differential equation (4.1) is computed by the means of the following recursive relations:

$$x_i(t+\delta t) = \left[F_i(x(t)) + \frac{\sigma^2}{2}G_i(x(t))\frac{dG_i(x(t))}{dx_i}\right]\delta t + \quad (4.2)$$

$$G_i(x(t))\sqrt{\sigma^2\delta t}\,\eta_i(t),$$

where $\eta_i(t)$ are independent Gaussian random variables and the variance is equal to 1.

The second term in equation (4.2) is included because equation (4.2) is interpreted in the Stratonovich sense. The order of numerical error in the Milshtein method is $\delta t$. Therefore, small $\delta t$ (i.e., $\delta t=1\times 10^{-4}$ for $\sigma^2=1$) is be used, while its computational effort per time step is relatively small. For large $\sigma$, where fluctuations are rapid and large, a longer integration period and small $\delta t$ is used. The Milshtein method quickly becomes impractical.

The Heun method is based on the second-order Runge-Kutta method, and integrates the stochastic equation by using the following recursive equation:

$$x_i(t+\delta t) = x_i(t) + \frac{\delta t}{2}[F_i(x(t)) + F_i(y(t))] + \quad (4.3)$$

$$\frac{\sqrt{\sigma^2\delta t}}{2}\eta_i(t)[G_i(x(t)) + G_i(y(t))],$$

where $$y_i(t) = x_i(t) + F(x_i(t))\,\delta t + G(x_i(t))\sqrt{\sigma^2\delta t}\,\rho_i(t)$$

The Heun method accepts larger $\delta t$ than the Milshtein method without a significant increase in computational effort per step. The Heun method is usually used for $\sigma^2 > 2$.

The time step $\delta t$ can be chosen by using a stability condition, and so that averaged magnitudes do not depend on $\delta t$ within statistical errors. For example, $\delta t = 5 \times 10^{-4}$ for $\sigma^2 = 1$ and $\delta t = 1 \times 10^{-5}$ for $\sigma^2 = 15$. The Gaussian random numbers for the simulation were generated by using the Box-Muller-Wiener algorithms or a fast numerical inversion method.

Table 5.1 summarizes the stochastic simulation of typical road signals.

TABLE 5.1

Figure 6C:
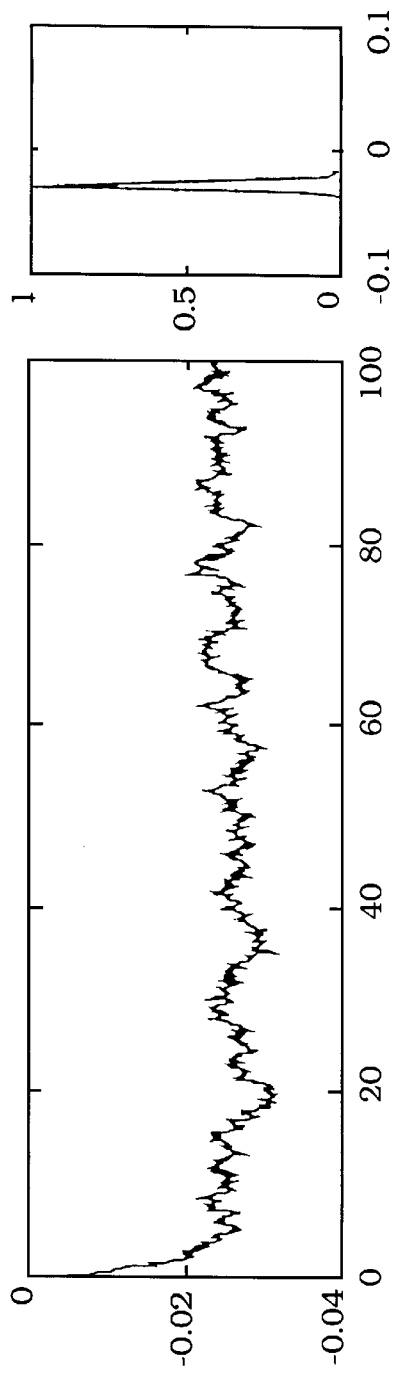
FIG. 6C is a plot showing results of stochastic simulations based on a one-dimensional Rayleigh probability density function.
Figure 6D:
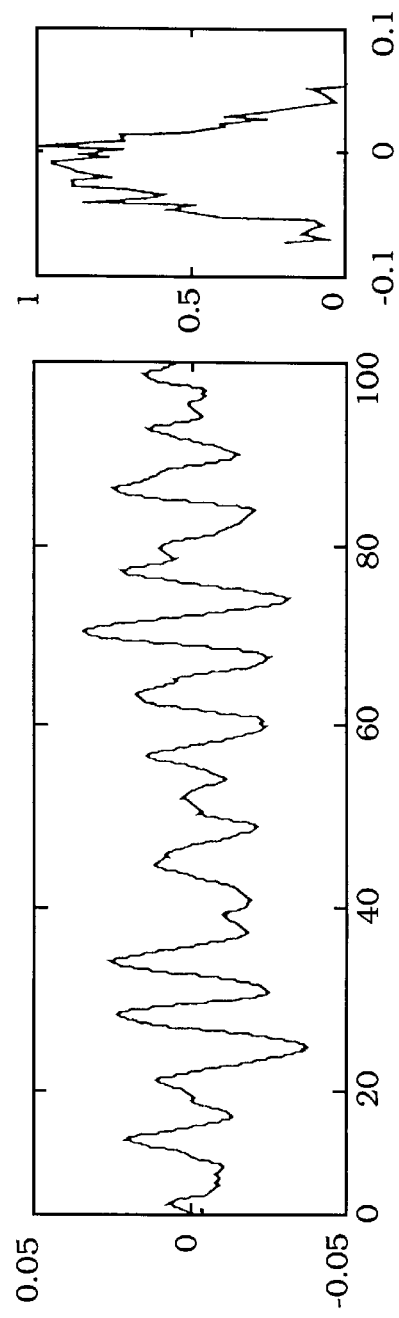
FIG. 6D is a plot showing results of stochastic simulations based on a two-dimensional Gaussian probability density function.
Figure 6E:
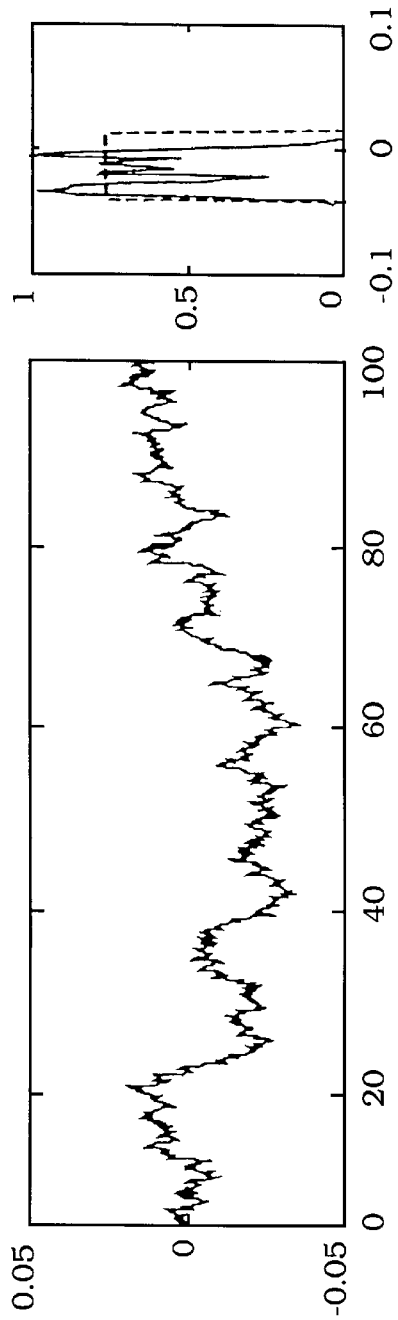
FIG. 6E is a plot showing results of stochastic simulations based on a two-dimensional uniform probability density function.
Figure 6F:
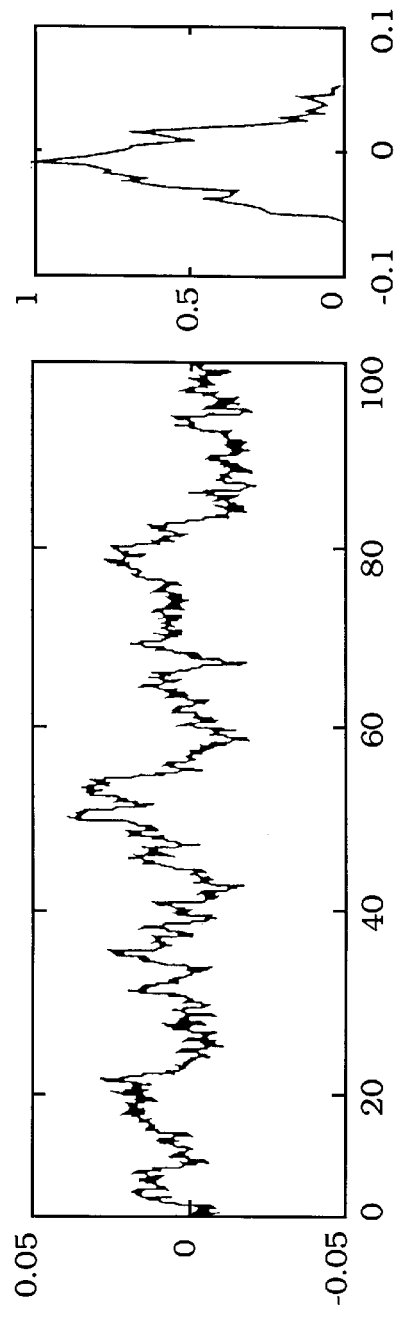
FIG. 6F is a plot showing results of stochastic simulations based on a two-dimensional hyperbolic probability density function.

| Types of Correlation Function | Type of Probability Density Function | Forming Filter Equations | Results of Stochastic Simulations |
|---|---|---|---|
| $R(\tau) = \sigma^2 e^{-\alpha|\tau|}$ | 1D Gaussian $p(y) = \frac{1}{\sigma\sqrt{2\pi}}e^{-\frac{1}{2}\left(\frac{y-\mu}{\sigma}\right)^2}$ | $\dot{y} + \alpha y = \sigma^2 \xi(t)$ | FIG. 6A |
| | 1D Uniform $p(y) = \begin{cases} 0, & y \notin [y_0 - \Delta y_0 + \Delta] \\ \frac{1}{2\Delta}, & y \in [y_0 - \Delta y_0 + \Delta] \end{cases}$ | $\dot{y} + \frac{\alpha}{2}y = \frac{\sigma^2}{2\pi}\sqrt{\alpha(\Delta^2 - y^2)}\,\xi(t)$ | FIG. 6B |
| | 1D Rayleigh $p(y) = \left(\frac{y}{\mu^2}\right)e^{-\left(\frac{y^2}{2\mu^2}\right)}$ | $\dot{y} + \frac{\alpha}{2}y + \frac{2\alpha}{\mu} = \frac{\sigma^2}{\sqrt{2\pi}}\sqrt{\frac{2\alpha}{\mu}\left(y + \frac{2}{\mu}\right)}\,\xi(t)$ | FIG. 6C |
| $R(\tau) = \sigma^2 e^{-\alpha|\tau|}$ $\left[\cos\omega\tau + \frac{\alpha}{\omega}\sin\omega|\tau|\right]$ | 2D Gaussian $p(y_1, y_2) = \frac{1}{2\pi\sigma_1\sigma_2}e^{-\frac{1}{2}\left(\left(\frac{y_1-\mu_1}{\sigma_1}\right)^2 + \left(\frac{y_2-\mu_2}{\sigma_2}\right)^2\right)}$ | $\ddot{y} + 2\alpha\dot{y} + (\alpha^2 + \omega^2)y = \sqrt{2\alpha\sigma^2(\alpha^2 + \omega^2)}\,\xi(t)$ | FIG. 6D |
| | 2D Uniform $p(y_1, y_2) = \frac{1}{4\Delta_1\Delta_2}$ $-\Delta_1 < y_1 < \Delta_1$ $-\Delta_2 < y_2 < \Delta_2$ | $\dot{y}_1 = \frac{1}{2}a_{11}y_1 + a_{12}y_2 + \sqrt{\left(-\frac{a_{11}}{2\pi}(\Delta_1 - y_1^2)\right)}\,\xi_1(t)$ $\dot{y}_2 = \frac{1}{2}a_{22}y_2 + a_{21}y_1 + \sqrt{\left(-\frac{a_{22}}{2\pi}(\Delta_2 - y_2^2)\right)}\,\xi_1(t)$ | FIG. 6E |
| | 2D Hyperbolic $p(y_1, y_2) =$ $\rho(\lambda) = C_1(\lambda + b)^{-\delta}$ $b > 0; \delta > 1$ $\lambda = \frac{1}{2}y_1^2 - \frac{a_{12}}{2a_{21}}y_2^2$ | $\dot{y}_1 = a_{11}y_1 + a_{12}y_2 + \frac{2a_{11}^2}{(\delta-1)^2}\left[\frac{1}{2}y_1^2\frac{a_{12}}{2a_{21}}y_2^2 + b\right]y_1$ $\frac{2a_{11}}{\sqrt{2\pi}(\delta-1)}\left[\frac{1}{2}y_1^2\frac{a_{12}}{2a_{21}}y_2^2 + b\right]\xi_1(t)$ $\dot{y}_2 = a_{21}y_1 + a_{22}y_2 + \frac{2a_{22}^2 a_{12}^3}{a_{21}^3(\delta-1)^2}\left[\frac{1}{2}y_1^2\frac{a_{12}}{2a_{21}}y_2^2 + b\right]y_2 +$ $\frac{2a_{22}a_{12}}{\sqrt{2\pi}\,a_{21}(\delta-1)}\left[\frac{1}{2}y_1^2\frac{a_{12}}{2a_{21}}y_2^2 + b\right]\xi_2(t$ | FIG. 6F |

Figure 7:
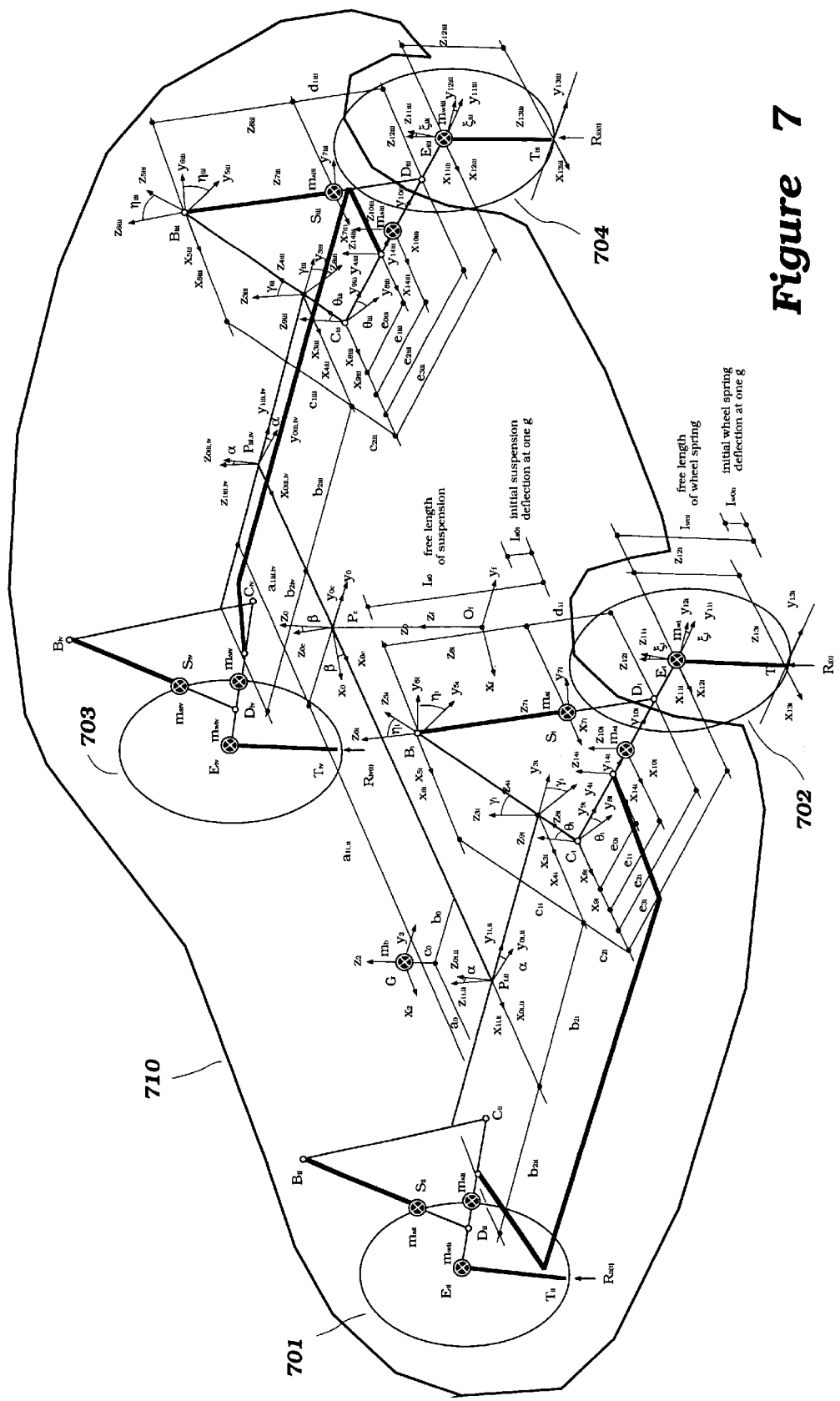
FIG. 7 illustrates a full car model.

FIG. 7 shows a vehicle body 710 with coordinates for describing position of the body 710 with respect to wheels 701–704 and suspension system. A global reference coordinate $x_r, y_r, z_r\{r\}$ is assumed to be at the geometric center $P_r$ of the vehicle body 710. The following are the transformation matrices to describe the local coordinates for the suspension and its components:

- {2} is a local coordinate in which an origin is the center of gravity of the vehicle body 710;
- {7} is a local coordinate in which an origin is the center of gravity of the suspension;
- {10n} is a local coordinate in which an origin is the center of gravity of the n'th arm;
- {12n} is a local coordinate in which an origin is the center of gravity of the n'th wheel;
- {13n} is a local coordinate in which an origin is a contact point of the n'th wheel relative to the road surface; and
- {14} is a local coordinate in which an origin is a connection point of the stabilizer.

Note that in the development that follows, the wheels 702, 701, 704, and 703 are indexed using "i", "ii", "iii", and "iv", respectively.

As indicated, "n" is a coefficient indicating wheel positions such as i, ii, iii, and iv for left front, right front, left rear and right rear respectively. The local coordinate systems $x_0, y_0$, and $z_0\{0\}$ are expressed by using the following conversion matrix that moves the coordinate $\{r\}$ along a vector $(0,0,z_0)$ $$^r_0 T = \begin{bmatrix} 1 & 0 & 0 & 0 \\ 0 & 1 & 0 & 0 \\ 0 & 0 & 1 & z_0 \\ 0 & 0 & 0 & 1 \end{bmatrix}$$

Rotating the vector $\{r\}$ along $y_r$ with an angle $\beta$ makes a local coordinate system $x_{0c}, y_{0c}, z_{0c}\{0r\}$ with a transformation matrix $^0_{0c}T$.

$$^0_{0c}T = \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \quad (5.1)$$

Transferring $\{0r\}$ through the vector $(a_{1n}, 0, 0)$ makes a local coordinate system $x_{0f}, y_{0f}, z_{0f}\{0f\}$ with a transformation matrix $^{0r}_{0f}T$.

$$^{0c}_{0n}T = \begin{bmatrix} 1 & 0 & 0 & a_{1n} \\ 0 & 1 & 0 & 0 \\ 0 & 0 & 1 & 0 \\ 0 & 0 & 0 & 1 \end{bmatrix} \quad (5.2)$$

The above procedure is repeated to create other local coordinate systems with the following transformation matrices.

$$^{0n}_{1n}T = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \quad (5.3)$$

$$^{1i}_{2}T = \begin{bmatrix} 1 & 0 & 0 & a_0 \\ 0 & 1 & 0 & b_0 \\ 0 & 0 & 1 & c_0 \\ 0 & 0 & 0 & 1 \end{bmatrix} \quad (5.4)$$

Coordinates for the wheels (index n: i for the left front, ii for the right front, etc.) are generated as follows. Transferring $\{1n\}$ through the vector $(0, b_{2n}, 0)$ makes local coordinate system $x_{3n}, y_{3n}, z_{3n}\{3n\}$ with transformation matrix $^{1f}_{3n}T$.

$$^{1n}_{3n}T = \begin{bmatrix} 1 & 0 & 0 & 0 \\ 0 & 1 & 0 & b_{2n} \\ 0 & 0 & 1 & 0 \\ 0 & 0 & 0 & 1 \end{bmatrix} \quad (5.5)$$

$$^{3n}_{4n}T = \begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix} \quad (5.6)$$

$$^{4n}_{5n}T = \begin{bmatrix} 1 & 0 & 0 & 0 \\ 0 & 1 & 0 & 0 \\ 0 & 0 & 1 & c_{1n} \\ 0 & 0 & 0 & 1 \end{bmatrix} \quad (5.7)$$

$$^{5n}_{6n}T = \begin{bmatrix} 1 & 0 & 0 & 0 \\ 0 & \cos\eta_n & -\sin\eta_n & 0 \\ 0 & \sin\eta_n & \cos\eta_n & 0 \\ 0 & 0 & 0 & 1 \end{bmatrix} \quad (5.8)$$

$$^{6n}_{7n}T = \begin{bmatrix} 1 & 0 & 0 & 0 \\ 0 & 1 & 0 & 0 \\ 0 & 0 & 1 & z_{6n} \\ 0 & 0 & 0 & 1 \end{bmatrix} \quad (5.9)$$

$$^{4n}_{8n}T = \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix} \quad (5.10)$$

$$^{8n}_{9n}T = \begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix} \quad (5.11)$$

$$^{9n}_{10n}T = \begin{bmatrix} 1 & 0 & 0 & 0 \\ 0 & 1 & 0 & e_{1n} \\ 0 & 0 & 1 & 0 \\ 0 & 0 & 0 & 1 \end{bmatrix} \quad (5.12)$$

$$\,^{9n}_{11n}T = \begin{bmatrix} 1 & 0 & 0 & 0 \\ 0 & 1 & 0 & e_{3n} \\ 0 & 0 & 1 & 0 \\ 0 & 0 & 0 & 1 \end{bmatrix} \quad (5.13)$$

$$\,^{11n}_{12n}T = \begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix} \quad (5.14)$$

$$\,^{12n}_{13n}T = \begin{bmatrix} 1 & 0 & 0 & 0 \\ 0 & 1 & 0 & 0 \\ 0 & 0 & 1 & z_{12n} \\ 0 & 0 & 0 & 1 \end{bmatrix} \quad (5.15)$$

$$\,^{9n}_{14n}T = \begin{bmatrix} 1 & 0 & 0 & 0 \\ 0 & 1 & 0 & e_{0n} \\ 0 & 0 & 1 & 0 \\ 0 & 0 & 0 & 1 \end{bmatrix} \quad (5.16)$$

Some of the matrices are sub-assembled to make the calculation simpler.

$$\,^{r}_{1n}T = \,^{r}_{0}T\,^{0c}_{0n}T\,^{0n}_{1n}T = \begin{bmatrix} 1 & 0 & 0 & 0 \\ 0 & 1 & 0 & 0 \\ 0 & 0 & 1 & z_0 \\ 0 & 0 & 0 & 1 \end{bmatrix}\begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix}\begin{bmatrix} 1 & 0 & 0 & a_{1n} \\ 0 & 1 & 0 & 0 \\ 0 & 0 & 1 & 0 \\ 0 & 0 & 0 & 1 \end{bmatrix}\begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \quad (5.17)$$

$$= \begin{bmatrix} \cos\beta & 0 & \sin\beta & a_{1n}\cos\beta \\ 0 & 1 & 0 & 0 \\ -\sin\beta & 0 & \cos\beta & z_0 - a_1\sin\beta \\ 0 & 0 & 0 & 1 \end{bmatrix}\begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$= \begin{bmatrix} \cos\beta & \sin\beta\sin\alpha & \sin\beta\cos\alpha & a_{1n}\cos\beta \\ 0 & \cos\alpha & -\sin\alpha & 0 \\ -\sin\beta & \cos\beta\sin\alpha & \cos\beta\cos\alpha & z_0 - a_{1n}\sin\beta \\ 0 & 0 & 0 & 1 \end{bmatrix}$$

$$\,^{r}_{4n}T = \,^{r}_{1n}T\,^{1n}_{3n}T\,^{3n}_{4n}T = \begin{bmatrix} \cos\beta & \sin\beta\sin\alpha & \sin\beta\cos\alpha & a_{1n}\cos\beta \\ 0 & \cos\alpha & -\sin\alpha & 0 \\ -\sin\beta & \cos\beta\sin\alpha & \cos\beta\cos\alpha & z_0 - a_{1n}\sin\beta \\ 0 & 0 & 0 & 1 \end{bmatrix}\begin{bmatrix} 1 & 0 & 0 & 0 \\ 0 & 1 & 0 & b_{2n} \\ 0 & 0 & 1 & 0 \\ 0 & 0 & 0 & 1 \end{bmatrix}\cdot\begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix} \quad (5.18)$$

$$= \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & z_0 - b_{2n}\cos\beta\sin\alpha - a_{1n}\sin\beta \\ 0 & 0 & 0 & 1 \end{bmatrix}$$

$$\,^{4n}_{7n}T = \,^{4n}_{5n}T\,^{5n}_{6n}T\,^{6n}_{7n}T = \begin{bmatrix} 1 & 0 & 0 & 0 \\ 0 & 1 & 0 & 0 \\ 0 & 0 & 1 & c_{1n} \\ 0 & 0 & 0 & 1 \end{bmatrix}\begin{bmatrix} 1 & 0 & 0 & 0 \\ 0 & \cos\eta_n & -\sin\eta_n & 0 \\ 0 & \sin\eta_n & \cos\eta_n & 0 \\ 0 & 0 & 0 & 1 \end{bmatrix}\begin{bmatrix} 1 & 0 & 0 & 0 \\ 0 & 1 & 0 & 0 \\ 0 & 0 & 1 & z_{6n} \\ 0 & 0 & 0 & 1 \end{bmatrix} \quad (5.19)$$

$$= \begin{bmatrix} 1 & 0 & 0 & 0 \\ 0 & \cos\eta_n & -\sin\eta_n & 0 \\ 0 & \sin\eta_n & \cos\eta_n & c_{1n} \\ 0 & 0 & 0 & 1 \end{bmatrix}\begin{bmatrix} 1 & 0 & 0 & 0 \\ 0 & 1 & 0 & 0 \\ 0 & 0 & 1 & z_{6n} \\ 0 & 0 & 0 & 1 \end{bmatrix}$$

$$= \begin{bmatrix} 1 & 0 & 0 & 0 \\ 0 & \cos\eta_n & -\sin\eta_n & -z_{6n}\sin\eta_n \\ 0 & \sin\eta_n & \cos\eta_n & c_{1n} + z_{6n}\cos\eta_n \\ 0 & 0 & 0 & 1 \end{bmatrix}$$

$$\,^{4n}_{10n}T = \,^{4n}_{8n}T\,^{8n}_{9n}T\,^{9n}_{10n}T = \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix}\begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix}\begin{bmatrix} 1 & 0 & 0 & 0 \\ 0 & 1 & 0 & e_{1n} \\ 0 & 0 & 1 & 0 \\ 0 & 0 & 0 & 1 \end{bmatrix} \quad (5.20)$$

$$= \begin{bmatrix} 1 & 0 & 0 & 0 \\ 0 & \cos\theta_n & -\sin\theta_n & 0 \\ 0 & \sin\theta_n & \cos\theta_n & c_{2n} \\ 0 & 0 & 0 & 1 \end{bmatrix}\begin{bmatrix} 1 & 0 & 0 & 0 \\ 0 & 1 & 0 & e_{1n} \\ 0 & 0 & 1 & 0 \\ 0 & 0 & 0 & 1 \end{bmatrix}$$

$$= \begin{bmatrix} 1 & 0 & 0 & 0 \\ 0 & \cos\theta_n & -\sin\theta_n & e_{1n}\cos\theta_n \\ 0 & \sin\theta_n & \cos\theta_n & c_{2n} + e_{1n}\sin\theta_n \\ 0 & 0 & 0 & 1 \end{bmatrix}$$

-continued $$
\begin{aligned}
{}^{4n}_{10n}T &= {}^{4n}_{8n}T\,{}^{8n}_{9n}T\,{}^{9n}_{11n}T\,{}^{11n}_{12n}T = \begin{bmatrix} 1 & 0 & 0 & 0 \\ 0 & 1 & 0 & 0 \\ 0 & 0 & 1 & c_{2n} \\ 0 & 0 & 0 & 1 \end{bmatrix}\begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix}\begin{bmatrix} 1 & 0 & 0 & 0 \\ 0 & 1 & 0 & e_{3n} \\ 0 & 0 & 1 & 0 \\ 0 & 0 & 0 & 1 \end{bmatrix}\begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix} \\
&= \begin{bmatrix} 1 & 0 & 0 & 0 \\ 0 & \cos\theta_n & -\sin\theta_n & 0 \\ 0 & \sin\theta_n & \cos\theta_n & c_{2n} \\ 0 & 0 & 0 & 1 \end{bmatrix}\begin{bmatrix} 1 & 0 & 0 & 0 \\ 0 & 1 & 0 & e_{3n} \\ 0 & 0 & 1 & 0 \\ 0 & 0 & 0 & 1 \end{bmatrix}\begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix} \\
&= \begin{bmatrix} 1 & 0 & 0 & 0 \\ 0 & \cos\theta_n & -\sin\theta_n & e_{3n}\cos\theta_n \\ 0 & \sin\theta_n & \cos\theta_n & c_{2n}+e_{3n}\sin\theta_n \\ 0 & 0 & 0 & 1 \end{bmatrix}\begin{bmatrix} 1 & 0 & 0 & 0 \\ 0 & \cos\zeta_n & -\sin\zeta_n & 0 \\ 0 & \sin\zeta_n & \cos\zeta_n & 0 \\ 0 & 0 & 0 & 1 \end{bmatrix} \\
&= \begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n}+e_{3n}\sin\theta_n \\ 0 & 0 & 0 & 1 \end{bmatrix}
\end{aligned}
\tag{5.21}
$$

Parts of the model are described both in local coordinate systems and in relations to the coordinate {r} or {1n} referenced to the vehicle body 710.

In the local coordinate systems:

$$P^2_{body} = P^{7n}_{susp.n} = P^{10n}_{arm.n} = P^{12n}_{wheel.n} = P^{13n}_{touchpoint.n} = P^{14n}_{stab.n} = \begin{bmatrix} 0 \\ 0 \\ 0 \\ 1 \end{bmatrix} \tag{5.22}$$

In the global reference coordinate system {r}:

$$
\begin{aligned}
P^r_{body} &= {}^r_{1i}T\,{}^{1i}_{2}T\,P^2_{body} = \begin{bmatrix} \cos\beta & \sin\beta\sin\alpha & \sin\beta\cos\alpha & a_{1i}\cos\beta \\ 0 & \cos\alpha & -\sin\alpha & 0 \\ -\sin\beta & \cos\beta\sin\alpha & \cos\beta\cos\alpha & z_0 - a_{1i}\sin\beta \\ 0 & 0 & 0 & 1 \end{bmatrix}\begin{bmatrix} 1 & 0 & 0 & a_0 \\ 0 & 1 & 0 & b_0 \\ 0 & 0 & 1 & c_0 \\ 0 & 0 & 0 & 1 \end{bmatrix}\begin{bmatrix} 0 \\ 0 \\ 0 \\ 1 \end{bmatrix} \\
&= \begin{bmatrix} a_0\cos\beta + b_0\sin\beta\sin\alpha + c_0\sin\beta\cos\alpha + a_{1i}\cos\beta \\ b_0\cos\alpha - c_0\sin\alpha \\ -a_0\sin\beta + b_0\cos\beta\sin\alpha + c_0\cos\beta\cos\alpha - a_{1i}\sin\beta \\ 1 \end{bmatrix}
\end{aligned}
\tag{5.23}
$$

$$
\begin{aligned}
P^r_{susp.n} &= {}^r_{4n}T\,{}^{4n}_{7n}T\,P^{7n}_{susp.n} = \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & z_0 + b_{2n}\cos\beta\sin\alpha - a_{1n}\sin\beta \\ 0 & 0 & 0 & 1 \end{bmatrix} \cdot \\
&\quad \begin{bmatrix} 1 & 0 & 0 & 0 \\ 0 & \cos\eta_n & -\sin\eta_n & -z_{6n}\sin\eta_n \\ 0 & \sin\eta_n & \cos\eta_n & c_{1n} + z_{6n}\cos\eta_n \\ 0 & 0 & 0 & 1 \end{bmatrix}\begin{bmatrix} 0 \\ 0 \\ 0 \\ 1 \end{bmatrix} \\
&= \begin{bmatrix} \{z_{6n}\cos(\alpha+\gamma_n+\eta_n) + c_{1n}\cos(\alpha+\gamma_n) + b_{2n}\sin\alpha\}\sin\beta + a_{1n}\cos\beta \\ -z_{6n}\sin(\alpha+\gamma_n+\eta_n) - c_{1n}\sin(\alpha+\gamma_n) + b_{2n}\cos\alpha \\ \{z_{6n}\cos(\alpha+\gamma_n+\eta_n) + c_{1n}\cos(\alpha+\gamma_n) + b_{2n}\sin\alpha\}\cos\beta - a_{1n}\sin\beta \\ 1 \end{bmatrix}
\end{aligned}
\tag{5.24}
$$

-continued $$P^r_{arm.n} = {}^r_{4n}T^{4n}_{10n}TP^{10n}_{arm.n} = \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & z_0 + b_{2n}\cos\beta\sin\alpha - a_{1n}\sin\beta \\ 0 & 0 & 0 & 1 \end{bmatrix}$$

$$\begin{bmatrix} 1 & 0 & 0 & 0 \\ 0 & \cos\theta_n & -\sin\theta_n & e_{3n}\cos\theta_n \\ 0 & \sin\theta_n & \cos\theta_n & c_{2n} + e_{1n}\sin\theta_n \\ 0 & 0 & 0 & 1 \end{bmatrix}\begin{bmatrix} 0 \\ 0 \\ 0 \\ 1 \end{bmatrix}$$

$$= \begin{bmatrix} \{e_{1n}\sin(\alpha+\gamma_n+\theta_n) + c_{2n}\cos(\alpha+\gamma_n) + b_{2n}\sin\alpha\}\sin\beta + a_{1n}\cos\beta \\ e_{1n}\cos(\alpha+\gamma_n+\theta_n) - c_{2n}\sin(\alpha+\gamma_n) + b_{2n}\cos\alpha \\ \{e_{1n}\sin(\alpha+\gamma_n+\theta_n) + c_{2n}\cos(\alpha+\gamma_n) + b_{2n}\sin\alpha\}\cos\beta - a_{1n}\sin\beta \\ 1 \end{bmatrix}$$

(5.25)

$$P^r_{wheel.n} = {}^r_{4n}T^{4n}_{12n}TP^{12n}_{wheel.n} = \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & b_{2n}\cos\beta\sin\alpha - a_{1n}\sin\beta \\ 0 & 0 & 0 & 1 \end{bmatrix}$$

$$\begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n} + e_{3n}\sin\theta_n \\ 0 & 0 & 0 & 1 \end{bmatrix}\begin{bmatrix} 0 \\ 0 \\ 0 \\ 1 \end{bmatrix}$$

$$= \begin{bmatrix} \{e_{3n}\sin(\alpha+\gamma_n+\theta_n) + c_{2n}\cos(\alpha+\gamma_n) + b_{2n}\sin\alpha\}\sin\beta + a_{1n}\cos\beta \\ e_{3n}\cos(\alpha+\gamma_n+\theta_n) - c_{2n}\sin(\alpha+\gamma_n) + b_{2n}\cos\alpha \\ z_0 + \{e_{3n}\sin(\alpha+\gamma_n+\theta_n) + c_{2n}\cos(\alpha+\gamma_n) + b_{2n}\sin\alpha\}\cos\beta - a_{1n}\sin\beta \\ 1 \end{bmatrix}$$

(5.26)

$$P^r_{touchpoint.n} = {}^r_{4n}T^{4n}_{12n}T^{12n}_{13n}TP^{13n}_{touchpoint.n} = \begin{bmatrix} \cos\beta & \sin\beta\sin(\alpha+\gamma_n) & \sin\beta\cos(\alpha+\gamma_n) & b_{2n}\sin\beta\sin\alpha + a_{1n}\cos\beta \\ 0 & \cos(\alpha+\gamma_n) & -\sin(\alpha+\gamma_n) & b_{2n}\cos\alpha \\ -\sin\beta & \cos\beta\sin(\alpha+\gamma_n) & \cos\beta\cos(\alpha+\gamma_n) & z_0 + b_{2n}\cos\beta\sin\alpha - a_{1n}\sin\beta \\ 0 & 0 & 0 & 1 \end{bmatrix}$$

$$\begin{bmatrix} 1 & 0 & 0 & 0 \\ 0 & \cos(\theta_n+\zeta_n) & -\sin(\theta_n+\zeta_n) & e_{3n}\cos\theta_n \\ 0 & \sin(\theta_n+\zeta_n) & \cos(\theta_n+\zeta_n) & c_{2n} + e_{3n}\sin\theta_n \\ 0 & 0 & 0 & 1 \end{bmatrix}\begin{bmatrix} 1 & 0 & 0 & 0 \\ 0 & 1 & 0 & 0 \\ 0 & 0 & 1 & z_{12n} \\ 0 & 0 & 0 & 1 \end{bmatrix}\begin{bmatrix} 0 \\ 0 \\ 0 \\ 1 \end{bmatrix}$$

$$= \begin{bmatrix} \{z_{12n}\cos\alpha + e_{3n}\sin(\alpha+\gamma_n+\theta_n) + c_{2n}\cos(\alpha+\gamma_n) + b_{2n}\sin\alpha\}\sin\beta + a_{1n}\cos\beta \\ -z_{12n}\sin\alpha + e_{3n}\cos(\alpha+\gamma_n+\theta_n) - c_{2n}\sin(\alpha+\gamma_n) + b_{2n}\cos\alpha \\ z_0 + \{z_{12n}\cos\alpha + e_{3n}\sin(\alpha+\gamma_n+\theta_n) + c_{2n}\cos(\alpha+\gamma_n) + b_{2n}\sin\alpha\}\cos\beta - a_{1n}\sin\beta \\ 1 \end{bmatrix}$$

(5.27)

where $\zeta_n$ is substituted by, $$\zeta_n = -\gamma_n - \theta_n$$

because of the link mechanism to support a wheel at this geometric relation.

The stabilizer linkage point is in the local coordinate system $\{1n\}$. The stabilizer works as a spring in which force is proportional to the difference of displacement between both arms in a local coordinate system $\{1n\}$ fixed to the body 710.

$$P^{1n}_{stab.n} = {}^{1n}_{3n}T^{3n}_{4n}T^{4n}_{8n}T^{8n}_{9n}T^{9n}_{14n}TP^{14n}_{stab.n}$$

(5.28)

$$= \begin{bmatrix} 1 & 0 & 0 & 0 \\ 0 & 1 & 0 & b_{2n} \\ 0 & 0 & 1 & 0 \\ 0 & 0 & 0 & 1 \end{bmatrix}\begin{bmatrix} 1 & 0 & 0 & 0 \\ 0 & \cos\gamma_n & -\sin\gamma_n & 0 \\ 0 & \sin\gamma_n & \cos\gamma_n & 0 \\ 0 & 0 & 0 & 1 \end{bmatrix}\begin{bmatrix} 1 & 0 & 0 & 0 \\ 0 & 1 & 0 & 0 \\ 0 & 0 & 1 & c_{2n} \\ 0 & 0 & 0 & 1 \end{bmatrix}$$

$$\begin{bmatrix} 1 & 0 & 0 & 0 \\ 0 & \cos\theta_n & -\sin\theta_n & 0 \\ 0 & \sin\theta_n & \cos\theta_n & 0 \\ 0 & 0 & 0 & 1 \end{bmatrix}\begin{bmatrix} 1 & 0 & 0 & 0 \\ 0 & 1 & 0 & e_{0n} \\ 0 & 0 & 1 & 0 \\ 0 & 0 & 0 & 1 \end{bmatrix}\begin{bmatrix} 0 \\ 0 \\ 0 \\ 1 \end{bmatrix}$$

$$= \begin{bmatrix} 0 \\ e_{0n}\cos(\gamma_n + \theta_n) - c_{2n}\sin\gamma_n + b_{2n} \\ e_{0n}\sin(\gamma_n + \theta_n) + c_{2n}\cos\gamma_n \\ 0 \end{bmatrix}$$

Kinetic energy, potential energy and dissipative functions for the <Body>, <Suspension>, <Arm>, <Wheel> and <Stabilizer> are developed as follows. Kinetic energy and potential energy except by springs are calculated based on the displacement referred to the inertial global coordinate $\{r\}$. Potential energy by springs and dissipative functions are calculated based on the movement in each local coordinate.

<Body>

$$T_b^{tr} = \frac{1}{2}m_b(\dot{x}_b^2 + \dot{y}_b^2 + \dot{z}_b^2) \tag{5.29}$$

where $$\begin{aligned} x_b &= (a_0 + a_{1n})\cos\beta + (b_0\sin\alpha + c_0\cos\alpha)\sin\beta \\ y_b &= b_0\cos\alpha - c_0\sin\alpha \\ z_b &= z_0 - (a_0 + a_{1n})\sin\beta + (b_0\sin\alpha + c_0\cos\alpha)\cos\beta \end{aligned} \tag{5.30}$$

and $$q_{j,k} = \beta, \alpha, z_0 \tag{5.31}$$

$$\frac{\partial x_b}{\partial \beta} = -(a_0 + a_{1n})\sin\beta + (b_0\sin\alpha + c_0\cos\alpha)\cos\beta$$

$$\frac{\partial x_b}{\partial \alpha} = (b_0\cos\alpha - c_0\sin\alpha)\sin\beta$$

$$\frac{\partial y_b}{\partial \beta} = \frac{\partial x_b}{\partial z_0} = \frac{\partial y_b}{\partial z_0} = 0$$

$$\frac{\partial y_b}{\partial \alpha} = -b_0\sin\alpha - c_0\cos\alpha$$

$$\frac{\partial z_b}{\partial \beta} = -(a_0 + a_{1n})\cos\beta - (b_0\sin\alpha + c_0\cos\alpha)\sin\beta$$

$$\frac{\partial z_b}{\partial \alpha} = (b_0\cos\alpha - c_0\sin\alpha)\cos\beta$$

$$\frac{\partial z_b}{\partial z_0} = 1$$

and thus $$\begin{aligned} T_b^{tr} &= \frac{1}{2}m_b(\dot{x}_b^2 + \dot{y}_b^2 + \dot{z}_b^2) \\ &= \frac{1}{2}m_b \sum_{j,k} \left( \frac{\partial x_b}{\partial q_j}\frac{\partial x_b}{\partial q_k}\dot{q}_j\dot{q}_k + \frac{\partial y_b}{\partial q_j}\frac{\partial y_b}{\partial q_k}\dot{q}_j\dot{q}_k + \frac{\partial z_b}{\partial q_j}\frac{\partial z_b}{\partial q_k}\dot{q}_j\dot{q}_k \right) \\ &= \frac{1}{2}m_b \langle \dot{\beta}^2\{-(a_0 + a_1)\sin\beta + (b_0\sin\alpha + c_0\cos\alpha)\cos\beta\}^2 + \\ &\quad \dot{\alpha}^2\{(b_0\cos\alpha - c_0\sin\alpha)\sin\beta\}^2 + \dot{\alpha}^2(-b_0\sin\alpha - c_0\cos\alpha)^2 + \\ &\quad \dot{\beta}^2\{-(a_0 + a_1)\cos\beta - (b_0\sin\alpha + c_0\cos\alpha)\sin\beta\}^2 + \\ &\quad \dot{\alpha}^2\{(b_0\cos\alpha - c_0\sin\alpha)\cos\beta\}^2 + \dot{z}_0^2 + 2\dot{\alpha}\dot{\beta}[\{-(a_0 + a_1)\sin\beta + \\ &\quad (b_0\sin\alpha + c_0\cos\alpha)\cos\beta\}(b_0\cos\alpha - c_0\sin\alpha)\sin\beta + \{-(a_0 + a_1)\cos\beta - \\ &\quad (b_0\sin\alpha + c_0\cos\alpha)\sin\beta\}(b_0\cos\alpha - c_0\sin\alpha)\cos\beta] - 2\dot{\beta}\dot{z}_o\{(a_0 + a_{1n})\cos\beta + \\ &\quad (b_0\sin\alpha - c_0\cos\alpha)\sin\beta\} + 2\dot{\alpha}\dot{z}_0(b_0\cos\alpha - c_0\sin\alpha)\cos\beta \rangle \\ &= \frac{1}{2}m_b \langle \dot{\alpha}^2(b_0^2 + c_0^2) + \dot{\beta}^2\{(a_0 + a_{1i})^2 + (b_0\sin\alpha + c_0\cos\alpha)^2\} + \dot{z}_0^2 - \\ &\quad 2\dot{\alpha}\dot{\beta}(a_0 + a_{1i})(b_0\cos\alpha - c_0\sin\alpha) - 2\dot{\beta}\dot{z}_o\{(a_0 + a_{1i})\cos\beta + \\ &\quad (b_0\sin\alpha - c_0\cos\alpha)\sin\beta\} + 2\dot{\alpha}\dot{z}_o(b_0\cos\alpha - c_0\sin\alpha)\cos\beta \rangle \end{aligned} \tag{5.32}$$

$$T_b^{ro} = \frac{1}{2}(I_{bx}\omega_{bx}^2 + I_{by}\omega_{by}^2 + I_{bz}\omega_{bz}^2)$$

where $$\omega_{bx} = \dot{\alpha}$$

-continued $\omega_{by} = \dot{\beta}$ $\omega_{bz} = 0$ $\therefore$ $T_b^{ro} = \frac{1}{2}(I_{bx}\dot{\alpha}^2 + I_{by}\dot{\beta}^2)$ $U_b = m_b g z_b$ (5.33)
$= m_b g\{-(a_0 + a_{1n})\sin\beta + (b_0\sin\alpha + c_0\cos\alpha)\cos\beta\}$ <Suspension>

$T_{sn}^{tr} = \frac{1}{2}m_{sn}(\dot{x}_{sn}^2 + \dot{y}_{sn}^2 + \dot{z}_{sn}^2)$ (5.34)

where $x_{sn} = \{z_{6n}\cos(\alpha + \gamma_n + \eta_n) + c_{1n}\cos(\alpha + \gamma_n) + b_{2n}\sin\alpha\}\sin\beta + a_{1n}\cos\beta$
$y_{sn} = -z_{6n}\sin(\alpha + \gamma_n + \eta_n) - c_{1n}\sin(\alpha + \gamma_n) + b_{2n}\cos\alpha$
$z_{sn} = z_0 + \{z_{6n}\cos(\alpha + \gamma_n + \eta_n) + c_{1n}\cos(\alpha + \gamma_n) + b_{2n}\sin\alpha\}\cos\beta - a_{1n}\sin\beta$ $q_{j,k} = z_{6n}, \eta_n, \alpha, \beta, z_0$ (5.35)

$\dfrac{\partial x_{sn}}{\partial z_{6n}} = \cos(\alpha + \gamma_n + \eta_n)\sin\beta$ $\dfrac{\partial x_{sn}}{\partial \eta_n} = -z_{6n}\sin(\alpha + \gamma_n + \eta_n)\sin\beta$ $\dfrac{\partial x_{sn}}{\partial \alpha} = \{-z_{6n}\sin(\alpha + \gamma_n + \eta_n) - c_{1n}\sin(\alpha + \gamma_n) + b_{2n}\cos\alpha\}\sin\beta$ $\dfrac{\partial x_{sn}}{\partial \beta} = \{z_{6n}\cos(\alpha + \gamma_n + \eta_n) + c_{1n}\cos(\alpha + \gamma_n) + b_{2n}\sin\alpha\}\cos\beta - a_{1n}\sin\beta$ $\dfrac{\partial y_{sn}}{\partial z_{6n}} = -\sin(\alpha + \gamma_n + \eta_n)$ $\dfrac{\partial y_{sn}}{\partial \eta_n} = -z_{6n}\cos(\alpha + \gamma_n + \eta_n)$ $\dfrac{\partial y_{sn}}{\partial \alpha} = -z_{6n}\cos(\alpha + \gamma_n + \eta_n) - c_{1n}\cos(\alpha + \gamma_n) - b_{2n}\sin\alpha$ $\dfrac{\partial y_{sn}}{\partial \beta} = \dfrac{\partial x_{sn}}{\partial z_0} = \dfrac{\partial y_{sn}}{\partial z_0} = 0$ $\dfrac{\partial z_{sn}}{\partial z_0} = 1$ $\dfrac{\partial z_{sn}}{\partial z_{6n}} = \cos(\alpha + \gamma_n + \eta_n)\cos\beta$ (5.36)

$\dfrac{\partial z_{sn}}{\partial \eta_n} = -z_{6n}\sin(\alpha + \gamma_n + \eta_n)\cos\beta$ $$\frac{\partial z_{sn}}{\partial \alpha} = \{-z_{6n}\sin(\alpha+\gamma_n+\eta_n) - c_{1n}\sin(\alpha+\gamma_n) + b_{2n}\cos\alpha\}\cos\beta$$

$$\frac{\partial z_{sn}}{\partial \beta} = -\{z_{6n}\cos(\alpha+\gamma_n+\eta_n) + c_{1n}\cos(\alpha+\gamma_n) + b_{2n}\sin\alpha\}\sin\beta - a_{1n}\sin\beta$$

$\therefore$ $$T_{sn}^{tr} = \frac{1}{2}m_{sn}(\dot{x}_{sn}^2 + \dot{y}_{sn}^2 + \dot{z}_{sn}^2) \tag{5.37}$$

$$= \frac{1}{2}m_{sn}\sum_{j,k}\left(\frac{\partial x_{sn}}{\partial q_j}\frac{\partial x_{sn}}{\partial q_k}\dot{q}_j\dot{q}_k + \frac{\partial y_{sn}}{\partial q_j}\frac{\partial y_{sn}}{\partial q_k}\dot{q}_j\dot{q}_k + \frac{\partial z_{sn}}{\partial q_j}\frac{\partial z_{sn}}{\partial q_k}\dot{q}_j\dot{q}_k\right)$$

$$= \frac{1}{2}m_{sn}\langle \dot{z}_{6n}^2 + \dot{\eta}_n^2 z_{6n}^2 + \dot{\alpha}^2[z_{6n}^2 + c_{1n}^2 + b_{2n}^2 + 2\{z_{6n}c_{1n}\cos\eta_n - \tag{5.38}$$
$$z_{6n}b_{2n}\sin(\gamma_n+\eta_n) - c_{1n}b_{2n}\sin\gamma_n\}] + \dot{\beta}^2[\{(z_{6n}\cos(\alpha+\gamma_n+\eta_n) +$$
$$((c_{1n}\cos(\alpha+\gamma_n) + b_{2n}\sin\alpha)\})^2 + a_{1n}^2] + \dot{z}_0^2 + 2\dot{z}_{6n}\dot{\alpha}\{c_{1n}\sin\eta_n + b_{2n}\cos(\gamma_n+\eta_n)\} -$$
$$2\dot{z}_{6n}\dot{\beta}a_{1n}\cos(\alpha+\gamma_n+\eta_n) + 2\dot{\eta}_n\dot{\alpha}z_{6n}\{z_{6n} + c_{1n}\cos\eta_n - b_{2n}\sin(\gamma_n+\eta_n)\} +$$
$$2\dot{\eta}_n\dot{\beta}z_{6n}a_{1n}\sin(\alpha+\gamma_n+\eta_n) + 2\dot{\alpha}\dot{\beta}a_{1n}\{z_{6n}\sin(\alpha+\gamma_n+\eta_n) + c_{1n}\sin(\alpha+\gamma_n) -$$
$$b_{2n}\cos\alpha\} + 2\dot{z}_{6n}\dot{z}_0\cos(\alpha+\gamma_n+\eta_n)\cos\beta - 2\dot{\eta}_n\dot{z}_0 z_{6n}\sin(\alpha+\gamma_n+\eta_n)\cos\beta +$$
$$2\dot{\alpha}\dot{z}_0\{z_{6n}\sin(\alpha+\gamma_n+\eta_n) - c_{1n}\sin(\alpha+\gamma_n) + b_{2n}\cos\alpha\}\cos\beta +$$
$$2\dot{\beta}\dot{z}_0[\{z_{6n}\cos(\alpha+\gamma_n+\eta_n) + c_{1n}\sin(\alpha+\gamma_n) + b_{2n}\cos\alpha\}\sin\beta + a_{1n}\cos\beta]\rangle$$

$T_{sn}^{ro} \cong 0$ $$U_{sn} = m_{sn}gz_{sn} + \frac{1}{2}k_{sn}(z_{6n} - l_{sn})^2$$
$$= m_{sn}g[z_0 + \{z_{6n}\cos(\alpha+\gamma_n+\eta_n) + c_{1n}\cos(\alpha+\gamma_n) +$$
$$b_{2n}\sin\alpha\}\cos\beta - a_{1n}\sin\beta] + \frac{1}{2}k_{sn}(z_{6n} - l_{sn})^2$$

$$F_{sn} = -\frac{1}{2}c_{sn}\dot{z}_{6n}^2 \tag{5.39}$$

<Arm>

$$T_{an}^{tr} = \frac{1}{2}m_{an}(\dot{x}_{an}^2 + \dot{y}_{an}^2 + \dot{z}_{an}^2) \tag{5.40}$$

where $$x_{an} = \{e_{1n}\sin(\alpha+\gamma_n+\theta_n) + c_{2n}\cos(\alpha+\gamma_n) + b_{2n}\sin\alpha\}\sin\beta + a_{1n}\cos\beta \tag{5.41}$$
$$y_{an} = e_{1n}\cos(\alpha+\gamma_n+\theta_n) - c_{2n}\sin(\alpha+\gamma_n) + b_{2n}\cos\alpha$$
$$z_{an} = z_0 + \{e_{1n}\sin(\alpha+\gamma_n+\theta_n) + c_{2n}\cos(\alpha+\gamma_n) + b_{2n}\sin\alpha\}\cos\beta - a_{1n}\sin\beta$$

and $$q_{j,k} = \theta_n, \alpha, \beta, z_0 \tag{5.42}$$

$$\frac{\partial x_{an}}{\partial \theta_n} = e_{1n}\cos(\alpha+\gamma_n+\theta_n)\sin\beta$$

$$\frac{\partial x_{an}}{\partial \alpha} = \{e_{1n}\cos(\alpha+\gamma_n+\theta_n) - c_{2n}\sin(\alpha+\gamma_n) + b_{2n}\cos\alpha\}\sin\beta$$

$$\frac{\partial x_{an}}{\partial \beta} = \{e_{1n}\sin(\alpha+\gamma_n+\theta_n) + c_{2n}\cos(\alpha+\gamma_n) + b_{2n}\sin\alpha\}\cos\beta - a_{1n}\sin\beta$$

$$\frac{\partial y_{an}}{\partial \theta_n} = -e_{1n}\sin(\alpha+\gamma_n+\theta_n)$$

$$\frac{\partial y_{an}}{\partial \alpha} = -e_{1n}\sin(\alpha + \gamma_n + \theta_n) - c_{2n}\cos(\alpha + \gamma_n) - b_{2n}\sin\alpha$$

$$\frac{\partial y_{an}}{\partial \beta} = \frac{\partial x_{an}}{\partial z_0} = \frac{\partial y_{an}}{\partial z_0} = 0$$

$$\frac{\partial z_{an}}{\partial \theta_n} = e_{1n}\cos(\alpha + \gamma_n + \theta_n)\cos\beta$$

$$\frac{\partial z_{an}}{\partial \alpha} = \{e_{1n}\cos(\alpha + \gamma_n + \theta_n) - c_{2n}\sin(\alpha + \gamma_n) + b_{2n}\cos\alpha\}\cos\beta$$

$$\frac{\partial z_{an}}{\partial \beta} = -\{e_{1n}\sin(\alpha + \gamma_n + \theta_n) + c_{2n}\cos(\alpha + \gamma_n) + b_{2n}\sin\alpha\}\sin\beta - a_{1n}\cos\beta$$

$$\frac{\partial z_{an}}{\partial z_0} = 1$$

thus $$T_{an}^{tr} = \frac{1}{2}m_{an}(\dot{x}_{an}^2 + \dot{y}_{an}^2 + \dot{z}_{an}^2) \tag{5.43}$$
$$= \frac{1}{2}m_{an}\sum_{j,k}\left(\frac{\partial x_{an}}{\partial q_j}\frac{\partial x_{an}}{\partial q_k}\dot{q}_j\dot{q}_k + \frac{\partial y_{an}}{\partial q_j}\frac{\partial y_{an}}{\partial q_k}\dot{q}_j\dot{q}_k + \frac{\partial z_{an}}{\partial q_j}\frac{\partial z_{an}}{\partial q_k}\dot{q}_j\dot{q}_k\right)$$

$$= \frac{1}{2}m_{an}\langle\dot{\theta}_n^2 e_{1n}^2 + \dot{\alpha}^2[e_{1n}^2 + c_{2n}^2 + b_{2n}^2 - 2\{e_{1n}c_{2n}\sin\theta_n + e_{1n}b_{2n}\cos(\gamma_n + \theta_n) + \tag{5.44}$$
$$c_{2n}b_{2n}\sin\gamma_n\}] + \dot{\beta}^2[\{e_{1n}\sin(\alpha + \gamma_n + \theta_n) + c_{2n}\cos(\alpha + \gamma_n) + b_{2n}\sin\alpha\}^2 +$$
$$a_{1n}^2] + \dot{z}_0^2 + 2\dot{\theta}_n\dot{\alpha}e_{1n}\{e_{1n} - c_{2n}\sin\theta_n + b_{2n}\cos(\gamma_n + \theta_n)\} -$$
$$2\dot{\theta}_n\dot{\beta}e_{1n}a_{1n}\cos(\alpha + \gamma_n + \theta_n) - 2\dot{\alpha}\dot{\beta}a_{1n}\{e_{1n}\cos(\alpha + \gamma_n + \theta_n) -$$
$$c_{1n}\sin(\alpha + \gamma_n) + b_{2n}\cos\alpha\} - 2\dot{\theta}_n\dot{z}_0 e_{1n}\cos(\alpha + \gamma_n + \theta_n)\cos\beta +$$
$$2\dot{\alpha}\dot{z}_0\{e_{1n}\cos(\alpha + \gamma_n + \theta_n) - c_{2n}\sin(\alpha + \gamma_n) + b_{2n}\cos\alpha\}\cos\beta +$$
$$2\dot{\beta}\dot{z}_0[\{e_{1n}\sin(\alpha + \gamma_n + \theta_n) + c_{2n}\cos(\alpha + \gamma_n) + b_{2n}\sin\alpha\}\sin\beta + a_{1n}\cos\beta]\rangle$$

$$T_{an}^{ro} = \frac{1}{2}I_{ax}\omega_{ax}^2$$
$$= \frac{1}{2}I_{ax}(\dot{\alpha} + \dot{\theta}_n)^2$$

$$U_{an} = m_{an}gz_{an} \tag{5.45}$$
$$= m_{an}g[z_0 + \{e_{1n}\sin(\alpha + \gamma_n + \theta_n) + c_{2n}\cos(\alpha + \gamma_n) + b_{2n}\sin\alpha\}\cos\beta - a_{1n}\sin\beta]$$

<Wheel>

$$T_{wn}^{tr} = \frac{1}{2}m_{wn}(\dot{x}_{wn}^2 + \dot{y}_{wn}^2 + \dot{z}_{wn}^2) \tag{5.46}$$

where $$x_{wn} = \{e_{3n}\sin(\alpha + \gamma_n + \theta_n) + c_{2n}\cos(\alpha + \gamma_n) + b_{2n}\sin\alpha\}\sin\beta + a_{1n}\cos\beta \tag{5.47}$$
$$y_{wn} = e_{3n}\cos(\alpha + \gamma_n + \theta_n) - c_{2n}\sin(\alpha + \gamma_n) + b_{2n}\cos\alpha$$
$$z_{wn} = z_0 + \{e_{3n}\sin(\alpha + \gamma_n + \theta_n) + c_{2n}\cos(\alpha + \gamma_n) + b_{2n}\sin\alpha\}\cos\beta - a_{1n}\sin\beta$$

Substituting $m_{an}$ with $m_{wn}$ and $e_{1n}$ with $e_{3n}$ in the equation for the arm, yields an equation for the wheel as:

$$T_{wn}^{tr} = \frac{1}{2}m_{wn}\langle \dot{\theta}_n^2 e_{3n}^2 + \dot{\alpha}^2[e_{3n}^2 + c_{2n}^2 + b_{2n}^2 - 2\{e_{3n}c_{2n}\sin\theta_n + e_{3n}b_{2n}\cos(\gamma_n + \theta_n) + c_{2n}b_{2n}\sin\gamma_n\}] + \dot{\beta}^2[\{e_{3n}\sin(\alpha + \gamma_n + \theta_n) + c_{2n}\cos(\alpha + \gamma_n) + b_{2n}\sin\alpha\}^2 + a_{1n}^2] + \dot{z}_0^2 + 2\dot{\theta}\dot{\alpha}e_{3n}\{e_{3n} - c_{2n}\sin\theta_n + b_{2n}\cos(\gamma_n + \theta_n)\} - 2\dot{\theta}_n\dot{\beta}e_{3n}a_{1n}\cos(\alpha + \gamma_n + \theta_n) - 2\dot{\alpha}\dot{\beta}a_{1n}\{e_{3n}\cos(\alpha + \gamma_n + \theta_n) - c_{1n}\sin(\alpha + \gamma_n) + b_{2n}\cos\alpha\} + 2\dot{\theta}_n\dot{z}_0 e_{3n}\cos(\alpha + \gamma_n + \theta_n)\cos\beta + 2\dot{\alpha}\dot{z}_0\{e_{3n}\cos(\alpha + \gamma_n + \theta_n) - c_{2n}\sin(\alpha + \gamma_n) + b_{2n}\cos\alpha\}\cos\beta - 2\dot{\beta}\dot{z}_0[\{e_{3n}\sin(\alpha + \gamma_n + \theta_n) + c_{2n}\sin(\alpha + \gamma_n) + b_{2n}\sin\alpha\}\sin\beta + a_{1n}\cos\beta]\rangle \quad (5.48)$$

$$T_{wn}^{ro} = 0 \quad (5.49)$$

$$U_{wn} = m_{wn}g z_{wn} + \frac{1}{2}k_{wn}(z_{12n} - l_{wn})^2$$
$$= m_{wn}g[z_0 + \{e_{3n}\sin(\alpha + \gamma_n + \theta_n) + c_{2n}\cos(\alpha + \gamma_n) + b_{2n}\sin\alpha\}\cos\beta - a_{1n}\sin\beta] + \frac{1}{2}k_{wn}(z_{12n} - l_{wn})^2$$

$$F_{wn} = \frac{1}{2}c_{wn}\dot{z}_{12n}^2$$

<Stabilizer>

$$T_{zn}^{tr} \cong 0 \quad (5.50)$$

$$T_{zn}^{ro} \cong 0 \quad (5.51)$$

$$U_{zi,ii} \cong \frac{1}{2}k_{zi}(z_{zi} - z_{zii})^2 \quad (5.52)$$
$$= \frac{1}{2}k_{zi}[\{e_{0i}\sin(\gamma_i + \theta_i) + c_{2i}\cos\gamma_i\} - \{e_{0ii}\sin(\gamma_{ii} + \theta_{ii}) + c_{2ii}\cos\gamma_{ii}\}]^2$$
$$= \frac{1}{2}k_{zi}e_{0i}^2\{\sin(\gamma_i + \theta_i) + \sin(\gamma_{ii} + \theta_{ii})\}^2$$
where $e_{0ii} = -e_{0i}$, $c_{2ii} = c_{2i}$, $\gamma_{ii} = -\gamma_i$ $$U_{ziii,iv} \cong \frac{1}{2}k_{ziii}(z_{ziii} - z_{ziv})^2$$
$$= \frac{1}{2}k_{ziii}[\{e_{0iii}\sin(\gamma_{iii} + \theta_{iii}) + c_{2iii}\cos\gamma_{iii}\} - \{e_{0iv}\sin(\gamma_{iv} + \theta_{iv}) + c_{2iv}\cos\gamma_{iv}\}]^2$$
$$= \frac{1}{2}k_{ziii}e_{0iii}^2\{\sin(\gamma_{iii} + \theta_{iii}) + \sin(\gamma_{iv} + \theta_{iiv})\}^2$$
where $e_{0ii} = -e_{0iii}$ $c_{2iv} = c_{2iii}$, $\gamma_{iv} = -\gamma_{iii}$ $$F_{zn} \cong 0 \quad (5.53)$$

Therefore the total kinetic energy is:

$$T_{tot} = T_b^{tr} + \sum_{n=i}^{iv} |T_{sn}^{tr} + T_{an}^{tr} + T_{wn}^{tr} + T_b^{ro} + T_{an}^{ro}| \quad (5.54)$$

$$T_{tot} = T_b^{tr} + \sum_{n=i}^{iv} |T_{sn}^{tr} + T_{an}^{tr} + T_{wn}^{tr} + T_b^{ro} + T_{an}^{ro}| \quad (5.55)$$
$$= \frac{1}{2}m_b\langle \dot{\alpha}^2(b_0^2 + c_0^2) + \dot{\beta}^2\{(a_0 + a_{1i})^2 + (b_0\sin\alpha + c_0\cos\alpha)^2\} + \dot{z}_0^2 - 2\dot{\alpha}\dot{\beta}(a_0 + a_{1i})(b_0\cos\alpha - c_0\sin\alpha) - 2\dot{\beta}\dot{z}_0\{(a_0 + a_{1i})\cos\beta + (b_0\sin\alpha + c_0\cos\alpha)\sin\beta\} + 2\dot{\alpha}\dot{z}_0(b_0\cos\alpha - c_0\sin\alpha)\cos\beta\rangle + \sum_{n=i}^{iv}|\frac{1}{2}m_{sn}\langle\dot{z}_{6n}^2 + \dot{\eta}_n^2 z_{6n}^2 + \dot{\alpha}^2[z_{6n}^2 + c_{1n}^2 + b_{2n}^2 + 2\{z_{6n}c_{1n}\cos\eta_n - z_{6n}b_{2n}\sin(\gamma_n + \eta_n) - c_{1n}b_{2n}\sin\gamma_n\}] + \dot{\beta}^2[\{z_{6n}\cos(\alpha + \gamma_n + \eta_n) + c_{1n}\cos(\alpha + \gamma_n) + b_{2n}\sin\alpha\}^2 + a_{1n}^2] + \dot{z}_0^2 + 2z_{6n}\dot{\alpha}\{c_{1n}\sin\eta_n + b_{2n}\cos(\gamma_n + \eta_n)\} - 2\dot{z}_{6n}\dot{\beta}a_{1n}\cos(\alpha + \gamma_n + \eta_n) + 2\dot{\eta}_n\dot{\alpha}z_{6n}\{z_{6n} + c_{1n}\cos\eta_n - b_{2n}\sin(\gamma_n + \eta_n)\} + 2\dot{\eta}_n\dot{\beta}z_{6n}a_{1n}\sin(\alpha + \gamma_n + \eta_n) + 2\dot{\alpha}\dot{\beta}a_{1n}\{z_{6n}\sin(\alpha + \gamma_n + \eta_n) + c_{1n}\sin(\alpha + \gamma_n) - b_{2n}\cos\alpha\} + 2\dot{z}_{6n}\dot{z}_0\cos(\alpha + \gamma_n + \eta_n)\cos\beta - 2\dot{\eta}_n\dot{z}_0 z_{6n}\sin(\alpha + \gamma_n + \eta_n)\cos\beta + 2\dot{\alpha}\dot{z}_0\{-z_{6n}\sin(\alpha + \gamma_n + \eta_n) - c_{1n}\sin(\alpha + \gamma_n) + b_{2n}\cos\alpha\}\cos\beta - 2\dot{\beta}\dot{z}_0[\{z_{6n}\cos(\alpha + \gamma_n + \eta_n) - c_{1n}\cos(\alpha + \gamma_n) + b_{2n}\sin\alpha\} + a_{1n}\cos\beta]\rangle + \frac{1}{2}m_{an}\langle \dot{\theta}_n^2 e_{1n}^2 + \dot{\alpha}^2[e_{1n}^2 + c_{2n}^2 + b_{2n}^2 - 2\{e_{1n}c_{2n}\sin\theta_n + e_{1n}b_{2n}\cos(\gamma_n + \theta_n) + c_{2n}b_{2n}\sin\gamma_n\}] + \dot{\beta}^2[\{e_{il}\sin(\alpha + \gamma_n + \theta_n) + c_{2n}\cos(\alpha + \gamma_n) + b_{2n}\sin\alpha\}^2 + a_{1n}^2] + \dot{z}_0^2 + c_{2n}\sin\theta_n + b_{2n}\cos(\gamma_n + \theta_n)\} - 2\dot{\theta}_n\dot{\beta}e_{1n}a_{1n}\cos(\alpha + \gamma_n + \theta_n) - 2\dot{\alpha}\dot{\beta}a_{1n}\{e_{1n}\cos(\alpha + \gamma_n + \theta_n) - c_{1n}\sin(\alpha + \gamma_n) + b_{2n}\cos\alpha\} + 2\dot{\theta}_n\dot{z}_0 e_{1n}\cos(\alpha + \gamma_n + \theta_n)\cos\beta + 2\dot{\alpha}\dot{z}_0\{e_{1n}\cos(\alpha + \gamma_n + \theta_n) - c_{2n}\sin(\alpha + \gamma_n) + b_{2n}\cos\alpha\}\cos\beta - 2\dot{\beta}\dot{z}_0[\{e_{1n}\sin(\alpha + \gamma_n + \theta_n) + c_{2n}\cos(\alpha + \gamma_n) + b_{2n}\sin\alpha\} + a_{1n}\cos\beta] + \frac{1}{2}m_{wn}\langle \dot{\theta}_n^2 e_{3n}^2 + \dot{\alpha}^2[e_{3n}^2 + c_{2n}^2 + b_{2n}^2 - 2\{e_{3n}c_{2n}\sin\theta_n - e_{3n}b_{2n}\cos(\gamma_n + \theta_n) + c_{2n}b_{2n}\sin\gamma_n\}] + \dot{\beta}^2[\{e_{3n}\sin(\alpha + \gamma_n + \theta_n) + c_{2n}\cos(\alpha + \gamma_n) + b_{2n}\sin\alpha\}^2 + a_{1n}^2] + \dot{z}_0^2 + 2\dot{\theta}\dot{\alpha}e_{3n}\{e_{3n} - c_{2n}\sin\theta_n + b_{2n}\cos(\gamma_n + \theta_n)\} - 2\dot{\theta}_n\dot{\beta}e_{3n}a_{1n}\cos(\alpha + \gamma_n + \theta_n) - 2\dot{\alpha}\dot{\beta}a_{1n}\{e_{3n}\cos(\alpha + \gamma_n + \theta_n) - c_{1n}\sin(\alpha + \gamma_n) + b_{2n}\cos\alpha\} + 2\dot{\theta}_n\dot{z}_0 e_{3n}\cos(\alpha + \gamma_n + \eta_n)\cos\beta + 2\dot{\alpha}\dot{z}_0\{e_{3n}\cos(\alpha + \gamma_n + \theta_n) - c_{2n}\sin(\alpha + \gamma_n) + b_{2n}\cos\alpha\}\cos\beta - 2\dot{\beta}\dot{z}_0[\{e_{3n}\sin(\alpha + \gamma_n + \theta_n) - c_{2n}\cos(\alpha + \gamma_n) + b_{2n}\sin\alpha\} + a_{1n}\cos\beta\rangle + \frac{1}{2}(I_{bx}\dot{\alpha}^2 + I_{by}\dot{\beta}^2) + \frac{1}{2}I_{anx}(\dot{\alpha} + \dot{\theta}_n)^2|$$

-continued $$= \frac{1}{2}[\dot{\alpha}^2 m_{bbI} + \dot{\beta}^2 \{m_{baI} + m_b(b_0\sin\alpha + c_0\cos\alpha)^2\} + \dot{z}_0^2 m_b - \qquad (5.56)$$

$$2\dot{\alpha}(\dot{\beta}m_{ba} - \dot{z}_0 m_b\cos\beta)(b_0\cos\alpha - c_0\sin\alpha) - 2\dot{\beta}\dot{z}_0\{m_{ba}\cos\beta +$$

$$m_b(b_0\sin\alpha + c_0\cos\alpha)\sin\beta\}] + \frac{1}{2}\sum_{n=i}^{iv} |m_{sn}(\dot{z}_{6n}^2 + \dot{\eta}_n^2 z_{6n}^2) +$$

$$\dot{\theta}_n^2 m_{aw2ln} + \dot{z}_0^2 m_{sawn} + \dot{\alpha}^2\langle m_{sawln} + m_{sn}z_{6n}[z_{6n} + 2m_{sn}\{c_{1n}\cos\eta_n -$$

$$b_{2n}\sin(\gamma_n + \eta_n)\}] - 2m_{awln}\{c_{2n}\sin\theta_n - b_{2n}\cos(\gamma_n + \theta_n)\}\rangle +$$

$$\dot{\beta}^2\langle m_{saw2n} + m_{sn}\{z_{6n}\cos(\alpha + \gamma_n + \eta_n) + c_{1n}\cos(\alpha + \gamma_n) +$$

$$b_{2n}\sin\alpha\}^2 + m_{an}\{e_1\sin(\alpha + \gamma_n + \theta_n) + c_{2n}\cos(\alpha + \gamma_n) +$$

$$b_{2n}\sin\alpha\}^2 + m_{wn}\{e_3\sin(\alpha + \gamma_n + \theta_n) + c_{2n}\cos(\alpha + \gamma_n) +$$

$$b_{2n}\sin\alpha\}^2\rangle + 2\dot{z}_{6n}\dot{\alpha}m_{sn}\{c_{1n}\sin\eta_n + b_{2n}\cos(\gamma_n + \eta_n)\} -$$

$$2\dot{z}_{6n}\dot{\beta}ma_{1n}\cos(\alpha + \gamma_n + \eta_n) + 2\dot{\eta}_n\dot{\alpha}m_{sn}z_{6n}\{z_{6n} + c_{1n}\cos\eta_n -$$

$$b_{2n}\sin(\gamma_n + \eta_n)\} + 2\dot{\eta}_n\dot{\beta}m_{sn}z_{6n}a_{1n}\sin(\alpha + \gamma_n + \eta_n) +$$

$$2\dot{\theta}\dot{\alpha}[m_{aw2ln} - m_{awln}\{c_{2n}\sin\theta_n - b_{2n}\cos(\gamma_n + \theta_n)\}] -$$

$$2\dot{\theta}\dot{\beta}m_{awln}a_{1n}\cos(\alpha + \gamma_n + \theta_n) + 2\dot{\alpha}\dot{\beta}a_{1n}\{m_{sawan}\sin(\alpha + \gamma_n) -$$

$$m_{sawbn}\cos\alpha + m_{sn}z_{6n}\sin(\alpha + \gamma_n + \eta_n) - m_{awln}\cos(\alpha + \gamma_n + \theta_n)\} +$$

$$2\dot{z}_{6n}\dot{z}_0 m_{sn}\cos(\alpha + \gamma_n + \eta_n)\cos\beta - 2(\dot{\alpha} + \dot{\eta}_n)\dot{z}_0 z_{6n} m_{sn}\sin(\alpha +$$

$$\gamma_n + \eta_n)\cos\beta + 2\dot{\theta}_n\dot{z}_0 m_{awln}\cos(\alpha + \gamma_n + \theta_n)\cos\beta +$$

$$2\dot{\alpha}\dot{z}_0\{m_{awln}\sin(\alpha + \gamma_n + \theta_n) - m_{sawen}\sin(\alpha + \gamma_n) +$$

$$m_{sawbn}\cos\alpha\}\cos\beta - 2\dot{\beta}\dot{z}_0[\{z_{6n}m_{sn}\cos(\alpha + \gamma_n + \eta_n) - m_{awln}\sin(\alpha +$$

$$\gamma_n) + m_{sawen}\cos(\alpha + \gamma_n) + m_{sawbn}\sin\alpha\}\sin\beta + m_{sawan}\cos\beta])|$$

where $$m_{ba} = m_b(a_0 + a_{1i})$$

$$m_{bbI} = m_b(b_0^2 + c_0^2) + I_{bx}$$

$$m_{baI} = m_b(a_0 + a_{1i})^2 + I_{by}$$

$$m_{sawn} = m_{sn} + m_{an} + m_{wn}$$

$$m_{sawan} = (m_{sn} + m_{an} + m_{wn})a_{1n}$$

$$m_{sawbn} = (m_{sn} + m_{an} + m_{wn})b_{2n}$$

$$m_{sawcn} = m_{sn}c_{1n} + (m_{an} + m_{wn})c_{2n}$$

$$m_{saw2n} = (m_{sn} + m_{an} + m_{wn})a_{1n}^2$$

$$m_{saw1n} = m_{an}e_{1n}^2 + m_{wn}e_{3n}^2 m_{sn}(c_{1n}^2 + b_{2n}^2 - 2c_{1n}b_{2n}\sin\gamma_n) + (m_{an} + m_{wn})(c_{2n}^2 + b_{2n}^2 - 2c_{2n}b_{2n}\sin\gamma_n) + I_{axn}$$

$$m_{aw2ln} = m_{an}e_{1n}^2 + m_{wn}e_{3n}^2 + I_{axn}$$

$$m_{aw1n} = m_{an}e_{1n} + m_{wn}e_{3n}$$

$$m_{aw2n} = m_{an}e_{1n}^2 + m_{wn}e_{3n}^2 \qquad (5.57)$$

Hereafter variables and coefficients which have index "n" implies implicit or explicit that they require summation with n=i, ii, iii, and iv.

The total potential energy is:

$$U_{tot} = U_b + \sum_{n=i}^{iv} |U_{sn} + U_{an} + U_{wn} + U_{zn}| \qquad (5.58)$$

$$= m_b g\{z_0 - (a_0 + a_{1n})\sin\beta + (b_0\sin\alpha + c_0\cos\alpha)\cos\beta\} + \qquad (5.59)$$

$$\sum_{n=i}^{iv} |m_{sn}g[z_0 + \{z_{6n}\cos(\alpha + \gamma_n + \eta_n) + c_{1n}\cos(\alpha + \gamma_n) +$$

$$b_{2n}\sin\alpha\}\cos\beta - a_{1n}\sin\beta] + \frac{1}{2}k_{sn}(z_{6n} - l_{sn})^2 +$$

$$m_{an}g[z_0 + \{e_{1n}\sin(\alpha + \gamma_n + \theta_n) + c_{2n}\cos(\alpha + \gamma_n) +$$

$$b_{2n}\sin\alpha\}\cos\beta - a_{1n}\sin\beta] + m_{wn}g[z_0 + \{e_{3n}\sin$$

$$(\alpha + \gamma_n + \theta_n) + c_{2n}\cos(\alpha + \gamma_n) + b_{2n}\sin\alpha\}\cos\beta -$$

$$a_{1n}\sin\beta] + \frac{1}{2}k_{wn}(z_{12n} - l_{wn})^2| + \frac{1}{2}k_{zi}e_{0i}^2\{\sin(\gamma_i + \theta_i) +$$

$$\sin(\gamma_i + \theta_i)\}^2 + \frac{1}{2}k_{ziii}e_{oiii}^2\{\sin(\gamma_{iii} + \theta_{iii}) + \sin(\gamma_{iv} + \theta_{iv})\}^2$$

$$= g\{z_0 m_b - m_{ba}\sin\beta + m_b(b_0\sin\alpha + c_0\cos\alpha)\cos\beta\} + \qquad (5.60)$$

$$\sum_{n=i}^{iv} \langle g[\{z_0 m_{sawn} + m_{sn}z_{6n}\cos(\alpha + \gamma_n + \eta_n) +$$

$$m_{awln}\sin(\alpha + \gamma_n + \theta_n) + m_{sawcn}\cos(\alpha + \gamma_n) +$$

$$m_{sawbn}\sin\alpha\}\cos\beta - m_{sawan}\sin\beta] + \frac{1}{2}k_{sn}(z_{6n} - l_{sn})^2 +$$

$$\frac{1}{2}k_{wn}(z_{12n} - l_{wn})^2) + \frac{1}{2}k_{zi}e_{0i}^2\{\sin(\gamma_i + \theta_i) +$$

$$\sin(\gamma_{ii} + \theta_{ii})\}^2 + \frac{1}{2}k_{ziii}e_{oiii}^2\{\sin(\gamma_{iii} + \theta_{iii}) + \sin(\gamma_{iv} + \theta_{iv})\}^2$$

where $$m_{ba} = m_b(a_0 + a_{1i})$$

$$m_{sawan} = (m_{sn} + m_{an} + m_{wn})a_{1n}$$

$$m_{sawbn} = (m_{sn} + m_{an} + m_{wn})b_{2n}$$

$$m_{sawcn} = m_{sn}c_{1n} + (m_{an} + m_{wn})c_{2n}$$

$$\gamma_{ii} = -\gamma_i \qquad (5.61)$$

The Lagrangian is written as:

$$L = T_{tot} - U_{tot} \quad (5.62)$$

$$= \frac{1}{2}\left[\dot{\alpha}^2 m_{bbl} + \dot{\beta}^2\{m_{bal} + m_b(b_0\sin\alpha + c_0\cos\alpha)^2\} + \dot{z}_0^2 m_b - (2\dot{\alpha}\dot{\beta}m_{ba} - \dot{z}_0 m_b\cos\beta)(b_0\cos\alpha - c_0\sin\alpha)\right] -$$

$$2\dot{\beta}\dot{z}_0\{m_{ba}\cos\beta + m_b(b_0\sin\alpha + c_0\cos\alpha)\sin\beta\}] +$$

$$\frac{1}{2}\sum_{n=i}^{iv}\left[m_{sn}(\dot{z}_{6n}^2 + \dot{\eta}_n^2 z_{6n}^2) + \dot{\theta}_n^2 m_{aw2ln} + \dot{z}_0^2 m_{sawn} + \right.$$

$$\dot{\alpha}^2\langle m_{sawln} + m_{sn}z_{6n}[z_{6n} + 2\{c_{1n}\cos\eta_n - b_{2n}\sin(\gamma_n + \eta_n)\}] - 2m_{awln}\{c_{2n}\sin\theta_n - b_{2n}\cos(\gamma_n + \theta_n)\}\rangle +$$

$$\dot{\beta}^2\langle m_{saw2n} + m_{sn}\{z_{6n}\cos(\alpha + \gamma_n + \eta_n) + c_{1n}\cos(\alpha + \gamma_n) + b_{2n}\sin\alpha\}^2 + m_{an}\{e_1\sin(\alpha + \gamma_n + \theta_n) + c_{2n}\cos(\alpha + \gamma_n) + b_{2n}\sin\alpha\}^2 + m_{wn}\{e_3\sin(\alpha + \gamma_n + \theta_n) + c_{2n}\cos(\alpha + \gamma_n) + b_{2n}\sin\alpha\}^2\rangle + 2\dot{z}_{6n}\dot{\alpha}m_{sn}\{c_{1n}\sin\eta_n + b_{2n}\cos(\gamma_n + \eta_n)\} -$$

$$2\dot{z}_{6n}\dot{\beta}m_{sn}a_{1n}\cos(\alpha + \gamma_n + \eta_n) + 2\dot{\eta}_n\dot{\alpha}m_{sn}z_{6n}\{z_{6n} + c_{1n}\cos\eta_n - b_{2n}\sin(\gamma_n + \eta_n)\} + 2\dot{\eta}_n\dot{\beta}m_{sn}z_{6n}a_{1n}\sin(\alpha + \gamma_n + \eta_n) + 2\dot{\theta}\dot{\alpha}[m_{aw2ln} - m_{awln}\{c_{2n}\sin\theta_n - b_{2n}\cos(\gamma_n + \theta_n)\}] - 2\dot{\theta}\dot{\beta}m_{awln}a_{1n}\cos(\alpha + \gamma_n + \theta_n) +$$

$$2\dot{\alpha}\dot{\beta}a_{1n}\{m_{sawcn}\sin(\alpha + \gamma_n) - m_{sawbn}\cos\alpha + m_{sn}z_{6n}\sin(\alpha + \gamma_n + \eta_n) - m_{awln}\cos(\alpha + \gamma_n + \theta_n)\} +$$

$$2\dot{z}_0\{z_{6n}m_{sn}\cos(\alpha + \gamma_n + \eta_n) + (\dot{\alpha} + \dot{\theta}_n)m_{awln}\cos(\alpha + \gamma_n + \theta_n) - (\dot{\alpha} + \dot{\eta}_n)z_{6n}m_{sn}\sin(\alpha + \gamma_n + \eta_n) - \dot{\alpha}m_{sawcn}\sin(\alpha + \gamma_n) + \dot{\alpha}m_{sawbn}\cos\alpha - \dot{\beta}m_{sawcn}\}\cos\beta -$$

$$2\dot{\beta}\dot{z}_0[\{z_{6n}m_{sn}\cos(\alpha + \gamma_n + \eta_n) - m_{awln}\sin(\alpha + \gamma_n + \theta_n) + m_{sawcn}\cos(\alpha + \gamma_n) + m_{sawbn}\sin\alpha\}\sin\beta\}] -$$

$$g\{z_0 m_b - m_{ba}\sin\beta + m_b(b_0\sin\alpha + c_0\cos\alpha)\cos\beta\} -$$

$$\frac{1}{2}k_{zi}e_{0i}^2\{\sin(\gamma_i + \theta_i) + \sin(\gamma_{ii} + \theta_{ii})\}^2 - \frac{1}{2}k_{ziii}e_{0iii}^2\{\sin(\gamma_{iii} + \theta_{iii}) + \sin(\gamma_{iv} + \theta_{iv})\}^2 - \sum_{n=i}^{iv}\langle g[z_0 m_{sawn} +$$

$$\{m_{sn}z_{6n}\cos(\alpha + \gamma_n + \eta_n) + m_{awln}\sin(\alpha + \gamma_n + \theta_n) + m_{sawcn}\cos(\alpha + \gamma_n) + m_{sawbn}\sin\alpha\}\cos\beta - m_{sawan}\sin\beta] +$$

$$\frac{1}{2}k_{sn}(z_{6n} - l_{sn})^2 + \frac{1}{2}k_{wn}(z_{12n} - l_{wn})^2\rangle$$

-continued $$\frac{\partial L}{\partial z_0} = -g(m_b + m_{sawn})$$

$$\frac{\partial L}{\partial \dot{z}_0} = \dot{z}_0 m_b + \dot{\alpha}m_b\cos\beta(b_0\cos\alpha - c_0\sin\alpha) - \dot{\beta}\{m_{ba}\cos\beta + m_b(b_0\sin\alpha + c_0\cos\alpha)\sin\beta\} + \dot{z}_0 m_{sawn} + \{z_{6n}m_{sn}\cos(\alpha + \gamma_n + \eta_n) + (\dot{\alpha} + \dot{\theta}_n)m_{awln}\cos(\alpha + \gamma_n + \theta_n) - (\dot{\alpha} + \dot{\eta}_n)z_{6n}m_{sn}\sin(\alpha + \gamma_n + \theta_n) - \dot{\alpha}m_{sawcn}\sin(\alpha + \gamma_n) + \dot{\alpha}m_{sawbn}\cos\alpha - \dot{\beta}m_{sawan}\}\cos\beta - \dot{\beta}\{m_{awln}\sin(\alpha + \gamma_n + \theta_n) - z_{6n}m_{sn}\cos(\alpha + \gamma_n + \eta_n) + m_{sawcn}\cos(\alpha + \gamma_n) + +m_{sawbn}\sin\alpha\}\sin\beta$$

$$\frac{d}{dt}\left(\frac{\partial L}{\partial \dot{z}_0}\right) = \ddot{z}_0(m_b + m_{sawn}) + \ddot{\alpha}m_b(b_0\cos\alpha - c_0\sin\alpha) - \dot{\beta}\dot{\alpha}m_b\sin\beta(b_0\cos\alpha - c_0\sin\alpha) + \dot{\alpha}^2 m_b\cos\beta(b_0\sin\alpha + c_0\cos\alpha) - \ddot{\beta}\{m_{ba}\cos\beta + m_b(b_0\sin\alpha + c_0\cos\alpha)\sin\beta\} +$$

$$\dot{\beta}\{\dot{\beta}m_{ba}\sin\beta + \dot{\alpha}m_b(b_0\cos\alpha - c_0\sin\alpha)\sin\beta + \dot{\beta}m_b(b_0\sin\alpha + c_0\cos\alpha)\cos\beta\} + \{\ddot{z}_{6n}m_{sn}\cos(\alpha + \gamma_n + \eta_n) - (\dot{\alpha} + \dot{\eta}_n)\dot{z}_{6n}m_{sn}\sin(\alpha + \gamma_n + \eta_n) - (\ddot{\alpha} + \ddot{\eta}_n)z_{6n}m_{sn}\sin(\alpha + \gamma_n + \eta_n) - (\dot{\alpha} + \dot{\eta}_n)\dot{z}_{6n}m_{sn}\sin(\alpha + \gamma_n + \eta_n) - (\dot{\alpha} + \dot{\eta}_n)^2 z_{6n}m_{sn}\cos(\alpha + \gamma_n + \eta_n) - \ddot{\alpha}m_{sawcn}\sin(\alpha + \gamma_n) - \dot{\alpha}^2 m_{sawcn}\sin(\alpha + \gamma_n) + \ddot{\alpha}m_{sawbn}\cos\alpha - \dot{\alpha}^2 m_{sawbn}\sin\alpha - \ddot{\beta}m_{sawan}\}\cos\beta -$$

$$\dot{\beta}\{z_{6n}m_{sn}\cos(\alpha + \gamma_n + \eta_n) - (\dot{\alpha} + \dot{\theta}_n)m_{awln}\cos(\alpha + \gamma_n + \theta_n) - (\dot{\alpha} + \dot{\eta}_n)z_{6n}m_{sn}\sin(\alpha + \gamma_n + \eta_n) - \dot{\alpha}m_{sawcn}\sin(\alpha + \gamma_n) - \dot{\alpha}m_{sawbn}\cos\alpha - \dot{\beta}m_{sawan}\}\sin\beta - \dot{\beta}\{m_{awln}\sin(\alpha + \gamma_n + \theta_n) + z_{6n}m_{sn}\cos(\alpha + \gamma_n + \eta_n) + m_{awcn}\cos(\alpha + \gamma_n) + m_{sawbn}\sin\alpha\}\sin\beta - \dot{\beta}\{(\dot{\alpha} + \dot{\theta}_n)m_{awln}\cos(\alpha + \gamma_n + \theta_n) + z_{6n}m_{sn}\cos(\alpha + \gamma_n + \eta_n) - (\dot{\alpha} + \dot{\eta}_n)z_{6n}m_{sn}\sin(\alpha + \gamma_n + \eta_n) - \dot{\alpha}m_{sawcn}\sin(\alpha + \gamma_n) + \dot{\alpha}m_{sawbn}\cos\alpha\}\sin\beta -$$

$$\dot{\beta}^2\{m_{awln}\sin(\alpha + \gamma_n + \theta_n) - z_{6n}m_{sn}\cos(\alpha + \gamma_n + \eta_n) + m_{sawcn}\cos(\alpha + \gamma_n) + +m_{sawbn}\sin\alpha\}\cos\beta$$

$$\frac{\partial L}{\partial \beta} = -\dot{\alpha}\dot{z}_0 m_b \sin\beta(b_0\cos\alpha - c_0\sin\alpha) + \dot{\beta}\dot{z}_0\{m_{ba}\sin\beta - \tag{5.63}$$
$$m_b(b_0\sin\alpha - c_0\cos\alpha)\cos\beta\})g\{m_{ba}\cos\beta +$$
$$m_b(b_0\sin\alpha + c_0\cos\alpha)\sin\beta\} + \langle g[\{m_{sn}z_{6n}\cos(\alpha +$$
$$\gamma_n + \theta_n) + m_{awIn}\sin(\alpha + \theta_n) +$$
$$m_{sawcn}\cos(\alpha + \gamma_n) + m_{sawbn}\sin\alpha\}\sin\beta +$$
$$m_{sawan}\cos\beta] - \dot{z}_0\{\dot{z}_{6n}m_{sn}\cos(\alpha + \gamma_n + \eta_n) +$$
$$(\dot{\alpha} + \dot{\theta}_n)m_{awIn}\cos(\alpha + \gamma_n + \theta_n) -$$
$$(\dot{\alpha} + \dot{\eta}_n)z_{6n}m_{sn}\sin(\alpha + \gamma_n + \eta_n) - \dot{\alpha}m_{sawcn}\sin(\alpha +$$
$$\gamma_n) + \dot{\alpha}m_{sawbn}\cos\alpha - \dot{\beta}m_{sawan}\}\sin\beta +$$
$$\dot{\beta}\dot{z}_0\{m_{awIn}\sin(\alpha + \gamma_n + \theta_n) + z_{6n}m_{sn}\cos(\alpha + \gamma_n + \eta_n) +$$
$$m_{sawcn}\cos(\alpha + \gamma_n) + m_{sawbn}\sin\alpha\}\cos\beta\rangle$$

$$\frac{\partial L}{\partial \alpha} = \{\dot{\beta}^2 m_b(b_0\cos\alpha - c_0\sin\alpha) + \dot{\alpha}\dot{\beta}m_{ba}\}(b_0\sin\alpha + c_0\cos\alpha) - \tag{5.64}$$
$$\dot{\alpha}\dot{z}_0 m_b\cos\beta(b_0\sin\alpha + c_0\cos\alpha) -$$
$$\dot{\beta}\dot{z}_0 m_b(b_0\cos\alpha - c_0\sin\alpha)\sin\beta +$$
$$\lfloor\dot{\beta}^2\langle m_{sn}\{z_{6n}\cos(\alpha + \gamma_n + \eta_n) + c_{1n}\cos(\alpha + \gamma_n) +$$
$$b_{2n}\sin\alpha\}\{-z_{6n}\sin(\alpha + \gamma_n + \eta_n) - c_{1n}\sin(\alpha + \gamma_n) + b_{2n}\cos\alpha\} +$$
$$m_{an}\{e_{1n}\sin(\alpha + \gamma_n + \theta_n) + c_{2n}\cos(\alpha + \gamma_n) + b_{2n}\sin\alpha\}\{e_1\cos(\alpha +$$
$$\gamma_n + \theta_n) - c_{2n}\sin(\alpha + \gamma_n) + b_{2n}\cos\alpha\} + m_{wn}\{e_{3n}\sin(\alpha +$$
$$\gamma_n + \theta_n) + c_{2n}\cos(\alpha + \gamma_n) + b_{2n}\sin\alpha\}\{e_3\cos(\alpha +$$
$$\gamma_n + \theta_n) - c_{2n}\sin(\alpha + \gamma_n) + b_{2n}\cos\alpha\}\rangle +$$
$$\dot{z}_{6n}\dot{\beta}m_{sn}a_{1n}\sin(\alpha + \gamma_n + \eta_n) + \dot{\eta}_n\dot{\beta}m_{sn}z_{6n}a_{1n}\cos(\alpha + \gamma_n + \eta_n) +$$
$$\dot{\theta}\dot{\beta}m_{awIn}a_{1n}\sin(\alpha + \gamma_n + \theta_n) + \dot{\alpha}\dot{\beta}a_{1n}\{m_{sawcn}\cos(\alpha + \gamma_n) +$$
$$m_{sawbn}\sin\alpha + m_{sn}z_{6n}\cos(\alpha + \gamma_n + \eta_n) + m_{awIn}\sin(\alpha +$$
$$\theta_n)\} - \dot{z}_0\{\dot{z}_{6n}m_{sn}\sin(\alpha + \gamma_n + \eta_n) + (\dot{\alpha} + \dot{\theta}_n)m_{awIn}\sin(\alpha + \gamma_n +$$
$$\theta_n) + (\dot{\alpha} + \dot{\eta}_n)z_{6n}m_{sn}\cos(\alpha + \gamma_n + \eta_n) +$$
$$\dot{\alpha}m_{sawcn}\cos(\alpha + \gamma_n) + \dot{\alpha}m_{sawbn}\sin\alpha\}\cos\beta -$$
$$\dot{\beta}\dot{z}_0[\{m_{awIn}\cos(\alpha + \gamma_n + \theta_n) - z_{6n}m_{sn}\sin(\alpha + \gamma_n + \eta_n) -$$
$$m_{sawcn}\sin(\alpha + \gamma_n) + m_{sawbn}\cos\alpha\}\sin\beta\rfloor - gm_b(b_0\cos\alpha -$$
$$c_0\sin\alpha)\cos\beta + g\{m_{sn}z_{6n}\sin(\alpha + \gamma_n + \eta_n) - m_{awIn}\cos(\alpha +$$
$$\gamma_n + \theta_n) + m_{sawcn}\sin(\alpha + \gamma_n) - m_{sawbn}\cos\alpha\}\cos\beta$$

$$\frac{\partial L}{\partial \eta_n} = \dot{\alpha}^2 m_{sn}z_{6n}\{-c_{1n}\sin\eta_n - b_{2n}\cos(\gamma_n + \eta_n)\} + \tag{5.65}$$
$$\dot{\beta}^2 m_{sn}\{z_{6n}\cos(\alpha + \gamma_n + \eta_n) +$$
$$c_{1n}\cos(\alpha + \gamma_n) + b_{2n}\sin\alpha\}\{-z_{6n}\sin(\alpha + \gamma_n + \eta_n)\} +$$
$$z_{6n}\dot{\alpha}m_{sn}\{c_{1n}\cos\eta_n - b_{2n}\sin(\gamma_n + \eta_n)\} +$$
$$\dot{z}_{6n}\dot{\beta}m_{sn}a_{1n}\sin(\alpha + \gamma_n + \eta_n) - \dot{\eta}_n\dot{\alpha}m_{sn}z_{6n}\{c_{1n}\sin\eta_n +$$
$$b_{2n}\cos(\gamma_n + \eta_n)\} + \dot{\eta}_n\dot{\beta}m_{sn}z_{6n}a_{1n}\cos(\alpha + \gamma_n + \eta_n) +$$
$$\dot{\alpha}\dot{\beta}a_{1n}m_{sn}z_{6n}\cos(\alpha + \gamma_n + \eta_n) +$$
$$gm_{sn}z_{6n}\sin(\alpha + \gamma_n + \eta_n)\cos\beta -$$
$$\dot{z}_0\{\dot{z}_{6n}m_{sn}\sin(\alpha + \gamma_n + \eta_n) + (\dot{\alpha} + \dot{\eta}_n)z_{6n}m_{sn}\cos(\alpha +$$
$$\gamma_n + \eta_n)\}\cos\beta + \dot{\beta}\dot{z}_0 z_{6n}m_{sn}\sin(\alpha + \gamma_n + \eta_n)\sin\beta$$

$$\frac{\partial L}{\partial \theta_n} = -k_{zi}e_{0i}^2\{\sin(\gamma_i + \theta_i) + \sin(\gamma_{ii} + \theta_{ii})\}\{\cos(\gamma_i + \theta_i) + \tag{5.66}$$
$$\cos(\gamma_{ii} + \theta_{ii})\} - k_{ziii}e_{0iii}^2\{\sin(\gamma_{iii} + \theta_{iii}) +$$
$$\sin(\gamma_{iv} + \theta_{iv})\}\{\cos(\gamma_{iii} + \theta_{iii}) +$$
$$\cos(\gamma_{iv} + \theta_{iv})\} - \dot{\alpha}^2 m_{awIn}\{c_{2n}\cos\theta_n + b_{2n}\sin(\gamma_n +$$
$$\theta_n)\} + \dot{\beta}^2\langle m_{an}\{e_{1n}\sin(\alpha + \gamma_n + \theta_n) + c_{2n}\cos(\alpha + \gamma_n) +$$
$$b_{2n}\sin\alpha\}e_{1n}\cos(\alpha + \gamma_n + \theta_n) + m_{wn}\{e_{3n}\sin(\alpha + \gamma_n + \theta_n) +$$
$$c_{2n}\cos(\alpha + \gamma_n) + b_{2n}\sin\alpha\}e_{3n}\cos(\alpha + \gamma_n + \theta_n)\rangle -$$
$$\dot{\theta}\dot{\alpha}m_{awIn}\{c_{2n}\cos\theta_n + b_{2n}\sin(\gamma_n + \theta_n)\} + \dot{\theta}\dot{\beta}m_{awIn}a_{1n}\sin(\alpha +$$
$$\gamma_n + \theta_n) + \dot{\alpha}\dot{\beta}a_{1n}m_{awIn}\sin(\alpha + \gamma_n + \theta_n) - gm_{awIn}\cos(\alpha +$$
$$\gamma_n + \theta_n)\cos\beta - \dot{z}_0(\dot{\alpha} + \dot{\theta}_n)m_{awIn}\sin(\alpha + \gamma_n + \theta_n)\cos\beta -$$
$$\dot{\beta}\dot{z}_0 m_{awIn}\cos(\alpha + \gamma_n + \theta_n)\sin\beta$$

$$\frac{\partial L}{\partial z_{6n}} = m_{sn}\dot{\eta}_n^2 z_{6n} + \dot{\alpha}^2 m_{sn}[z_{6n} + \{c_{1n}\cos\eta_n - b_{2n}\sin(\gamma_n + \eta_n)\}] + \tag{5.67}$$
$$\dot{\beta}^2 m_{sn}\{z_{6n}\cos(\alpha + \gamma_n + \eta_n) + c_{1n}\cos(\alpha + \gamma_n) +$$
$$b_{2n}\sin\alpha\}\cos(\alpha + \gamma_n + \eta_n) +$$
$$\dot{\eta}_n\dot{\alpha}m_{sn}\{2z_{6n} + c_{1n}\cos\eta_n - b_{2n}\sin(\gamma_n + \eta_n)\} +$$
$$\dot{\eta}_n\dot{\beta}m_{sn}a_{1n}\sin(\alpha + \gamma_n + \eta_n) + \dot{\alpha}\dot{\beta}a_{1n}m_{sn}\sin(\alpha + \gamma_n + \eta_n) -$$
$$gm_{sn}\cos(\alpha + \gamma_n + \eta_n)\cos\beta - k_{sn}(z_{6n} - l_{sn}) -$$
$$(\dot{\alpha} + \dot{\eta}_n)\dot{z}_0 m_{sn}\sin(\alpha +$$
$$\gamma_n + \eta_n)\cos\beta - \dot{\beta}\dot{z}_0 m_{sn}\cos(\alpha + \gamma_n + \eta_n)\sin\beta$$

$$\frac{\partial L}{\partial z_{12n}} = -k_{wn}(z_{12n} - l_{wn}) \tag{5.68}$$

$$\frac{\partial L}{\partial \dot{\beta}} = \dot{\beta}(m_{saw2n} + m_{bal} + m_b(b_0\sin\alpha + c_0\cos\alpha)^2 + \tag{5.69}$$
$$m_{sn}\{z_{6n}\cos(\alpha + \gamma_n + \eta_n) + c_{1n}\cos(\alpha + \gamma_n) +$$
$$b_{2n}\sin\alpha\}^2 + m_{an}\{e_{1n}\sin(\alpha + \gamma_n + \theta_n) +$$
$$c_{2n}\cos(\alpha + \gamma_n) + b_{2n}\sin\alpha\}^2 + m_{wn}\{e_{3n}\sin(\alpha +$$
$$\gamma_n + \theta_n) + c_{2n}\cos(\alpha + \gamma_n) + b_{2n}\sin\alpha\}^2\rangle - \dot{\alpha}m_{ba}(b_0\cos\alpha -$$
$$c_0\sin\alpha) - \dot{z}_{6n}m_{sn}a_{1n}\cos(\alpha + \gamma_n + \eta_n) +$$
$$\dot{\eta}_n m_{sn}z_{6n}a_{1n}\sin(\alpha + \gamma_n + \eta_n) - \dot{\theta}m_{awIn}a_{1n}\cos(\alpha + \gamma_n + \theta_n) +$$
$$\dot{\alpha}a_{1n}\{m_{sawcn}\sin(\alpha + \gamma_n) - m_{sawbn}\cos\alpha + m_{sn}z_{6n}\sin(\alpha +$$
$$\gamma_n + \eta_n) - m_{awIn}\cos(\alpha + \gamma_n + \theta_n)\} - \dot{z}_0[\{m_b b_0\sin\alpha +$$
$$c_0\cos\alpha) + m_{awbn}\sin(\alpha + \gamma_n + \eta_n) + z_{6n}m_{sn}\cos(\alpha + \gamma_n + \eta_n) +$$
$$m_{sawcn}\cos(\alpha + \gamma_n) + m_{sawbn}\sin\alpha\}\sin\beta + (m_{ba} + m_{sawcn})\cos\beta]$$

-continued $$\frac{d}{dt}\left(\frac{\partial L}{\partial \dot\beta}\right) = \ddot\beta\langle m_{saw2n} + m_{bal} + m_b(b_0\sin\alpha + c_0\cos\alpha)^2 + \\ m_{sn}\{z_{6n}\cos(\alpha+\gamma_n+\eta_n) + c_{1n}\cos(\alpha+\gamma_n) + \\ b_{2n}\sin\alpha\}^2 + m_{an}\{e_{1n}\sin(\alpha+\gamma_n+\theta_n) + \\ c_{2n}\cos(\alpha+\gamma_n) + b_{2n}\sin\alpha\}^2 + m_{wn}\{e_{3n}\sin(\alpha+\gamma_n+\theta_n) + c_{2n}\cos(\alpha+\gamma_n) + b_{2n}\sin\alpha\}^2\rangle + \\ 2\dot\beta\langle\dot\alpha m_b(b_0\sin\alpha + c_0\cos\alpha)(b_0\cos\alpha - c_0\sin\alpha) + \\ m_{sn}\{z_{6n}\cos(\alpha+\gamma_n+\eta_n) + \\ c_{1n}\cos(\alpha+\gamma_n) + b_{2n}\sin\alpha\}\{\dot z_{6n}\cos(\alpha+\gamma_n+\eta_n) - (\dot\alpha+\dot\eta_n)z_{6n}\sin(\alpha+\gamma_n+\eta_n) - \dot\alpha[c_{1n}\sin(\alpha+\gamma_n) - b_{2n}\cos\alpha]\} + m_{an}\{e_{1n}\sin(\alpha+\gamma_n+\theta_n) + \\ c_{2n}\cos(\alpha+\gamma_n) + b_{2n}\sin\alpha\}\{(\dot\alpha+\dot\theta_n)e_{1n}\cos(\alpha+\gamma_n+\theta_n) - \\ \dot\alpha[c_{2n}\sin(\alpha+\gamma_n) - b_{2n}\cos\alpha]\} + m_{wn}\{e_{3n}\sin(\alpha+\gamma_n+\theta_n) + c_{2n}\cos(\alpha+\gamma_n) + b_{2n}\sin\alpha\}\{(\dot\alpha+\dot\theta_n)e_{3n}\sin(\alpha+\gamma_n+\theta_n) - \dot\alpha[c_{2n}\sin(\alpha+\gamma_n) - b_{2n}\cos\alpha]\}\rangle - \\ \ddot\alpha m_{ba}(b_0\cos\alpha - c_0\sin\alpha) + \dot\alpha^2 m_{ba}(b_0\sin\alpha + c_0\cos\alpha) - \\ \ddot z_{6n}m_{sn}a_{1n}\cos(\alpha+\gamma_n+\eta_n) + \dot z_{6n}(\dot\alpha+\dot\eta_n)m_{sn}a_{1n}\sin(\alpha+\gamma_n+\eta_n) + \ddot\eta_n m_{sn}z_{6n}a_{1n}\sin(\alpha+\gamma_n+\eta_n) + \\ \dot\eta_n m_{sn}\dot z_{6n}a_{1n}\sin(\alpha+\gamma_n+\eta_n) + \\ \dot\eta_n(\dot\alpha+\dot\eta_n)m_{sn}z_{6n}a_{1n}\cos(\alpha+\gamma_n+\eta_n) - \ddot\theta_n m_{awIn}a_{1n}\cos(\alpha+\gamma_n+\theta_n) + \\ \dot\theta_n(\dot\alpha+\dot\theta_n)m_{awIn}a_{1n}\sin(\alpha+\gamma_n+\theta_n) + \ddot\alpha a_{1n}\{m_{sawcn}\sin(\alpha+\gamma_n) - m_{sawbn}\cos\alpha + m_{sn}z_{6n}\sin(\alpha+\gamma_n+\eta_n) - \\ m_{awIn}\cos(\alpha+\gamma_n+\theta_n)\} + \dot\alpha a_{1n}\{\dot\alpha m_{sawcn}\cos(\alpha+\gamma_n) + \\ \dot\alpha m_{sawbn}\sin\alpha + (\dot\alpha+\dot\eta_n)m_{sn}z_{6n}\cos(\alpha+\gamma_n+\eta_n) + \\ m_{sn}\dot z_{6n}\sin(\alpha+\gamma_n+\eta_n) + (\dot\alpha+\dot\theta_n)m_{awIn}\sin(\alpha+\gamma_n+\theta_n)\} - \ddot z_0[\{m_b(b_0\sin\alpha + c_0\cos\alpha) + m_{awIn}\sin(\alpha+\gamma_n+\theta_n) + z_{6n}m_{sn}\cos(\alpha+\gamma_n+\eta_n) + m_{sawcn}\cos(\alpha+\gamma_n) + m_{sawbn}\sin\alpha\}\sin\beta + (m_{ba}+m_{sawan}\cos\beta] - \\ \dot z_0[\{\dot\alpha m_b(b_0\cos\alpha - c_0\sin\alpha) + (\dot\alpha+\dot\theta_n)m_{awIn}\cos(\alpha+\gamma_n+\theta_n) + \dot z_{6n}m_{sn}\cos(\alpha+\gamma_n+\eta_n) - (\dot\alpha+\dot\eta_n)z_{6n}m_{sn}\sin(\alpha+\gamma_n+\eta_n) - \dot\alpha m_{sawcn}\sin(\alpha+\gamma_n) + \dot\alpha m_{sawbn}\cos\alpha\}\sin\beta + \\ \dot\beta\{m_b(b_0\sin\alpha + c_0\cos\alpha) + m_{awIn}\sin(\alpha+\gamma_n+\theta_n) + z_{6n}m_{sn}\cos(\alpha+\gamma_n+\eta_n) + m_{sawcn}\cos(\alpha+\gamma_n) + \\ m_{sawbn}\sin\alpha\}\cos\beta - \dot\beta(m_{ba}+m_{sawan})\sin\beta]$$ (5.70)

$$\frac{\partial L}{\partial\dot\alpha} = \dot\alpha m_{bbl} - \dot\beta m_{ba}(b_0\cos\alpha - c_0\sin\alpha) + \\ \dot z_0 m_b\cos\beta(b_0\cos\alpha - c_0\sin\alpha) + \\ \dot\alpha\langle m_{sawIn} + m_{sn}z_{6n}[z_{6n} + 2\{c_{1n}\cos\eta_n - b_{2n}\sin(\gamma_n+\eta_n)\}] - 2m_{awIn}\{c_{2n}\sin\theta_n - b_{2n}\cos(\gamma_n+\theta_n)\}\rangle + \\ \dot z_{6n}m_{sn}\{c_{1n}\sin\eta_n + b_{2n}\cos(\gamma_n+\eta_n)\} + \dot\eta_n m_{sn}z_{6n}\{z_{6n} + c_{1n}\cos\eta_n - b_{2n}\sin(\gamma_n+\eta_n)\} + \dot\theta[m_{aw2In} - m_{awIn}\{c_{2n}\sin\theta_n - b_{2n}\cos(\gamma_n+\theta_n)\}] + \dot\beta a_{1n}\{m_{sawcn}\sin(\alpha+\gamma_n) - m_{sawbn}\cos\alpha + \\ m_{sn}z_{6n}\sin(\alpha+\gamma_n+\eta_n) - m_{awIn}\cos(\alpha+\gamma_n+\theta_n)\} + \\ \dot z_0\{m_{awIn}\cos(\alpha+\gamma_n+\theta_n) - z_{6n}m_{sn}\sin(\alpha+\gamma_n+\eta_n) - \\ m_{sawcn}\sin(\alpha+\gamma_n) + m_{sawbn}\cos\alpha\}\cos\beta$$ (5.71)

$$\frac{d}{dt}\left(\frac{\partial L}{\partial\dot\alpha}\right) = -\ddot\beta m_{ba}(b_0\cos\alpha - c_0\sin\alpha) + \dot\beta\dot\alpha m_b(b_0\sin\alpha + c_0\cos\alpha) + \\ \ddot z_0 m_b\cos\beta(b_0\cos\alpha - c_0\sin\alpha) - \dot\beta\dot z_0 m_b\sin\beta(b_0\cos\alpha - c_0\sin\alpha) - \dot\alpha\dot z_0 m_b\cos\beta(b_0\sin\alpha + c_0\cos\alpha) + \ddot\alpha\langle m_{bbl} + \\ m_{sawIn} + m_{sn}z_{6n}[z_{6n} + 2\{c_{1n}\cos\eta_n - b_{2n}\sin(\gamma_n+\eta_n)\}] - \\ 2m_{awIn}\{c_{2n}\sin\theta_n - b_{2n}\cos(\gamma_n+\theta_n)\}\rangle + \dot\alpha\langle m_{sn}z_{6n}[z_{6n} + \\ 2\{c_{1n}\cos\eta_n - b_{2n}\sin(\gamma_n+\eta_n)\}] + m_{sn}z_{6n}[\dot z_{6n} - \\ 2\dot\eta_n\{c_{1n}\sin\eta_n + b_{2n}\cos(\gamma_n+\eta_n)\}] - 2\dot\theta_n m_{awIn}\{c_{2n}\cos\theta_n + \\ b_{2n}\sin(\gamma_n+\theta_n)\}\rangle + \ddot z_{6n}m_{sn}\{c_{1n}\sin\eta_n + b_{2n}\cos(\gamma_n+\eta_n)\} + \\ \dot z_{6n}\dot\eta_n m_{sn}\{c_{1n}\cos\eta_n - b_{2n}\sin(\gamma_n+\eta_n)\} + \ddot\eta_n m_{sn}z_{6n}\{z_{6n} + \\ c_{1n}\cos\eta_n - b_{2n}\sin(\gamma_n+\eta_n)\} + \dot\eta_n m_{sn}\dot z_{6n}\{z_{6n} + c_{1n}\cos\eta_n - \\ b_{2n}\sin(\gamma_n+\eta_n)\} + \dot\eta_n m_{sn}z_{6n}\{\dot z_{6n} - \dot\eta_n[c_{1n}\sin\eta_n + b_{2n}\cos(\gamma_n+\eta_n)]\} + \ddot\theta[m_{aw2In} - m_{awIn}\{c_{2n}\sin\theta_n - b_{2n}\cos(\gamma_n+\theta_n)\}] - \dot\theta_n^2 m_{awIn}\{c_{2n}\cos\theta_n + b_{2n}\sin(\gamma_n+\theta_n)\}] + \\ \ddot\beta a_{1n}\{m_{sawcn}\sin(\alpha+\gamma_n) - m_{sawbn}\cos\alpha + m_{sn}z_{6n}\sin(\alpha+\gamma_n+\eta_n) - m_{awIn}\cos(\alpha+\gamma_n+\theta_n)\} + \\ \dot\beta a_{1n}\{\dot\alpha[m_{sawcn}\cos(\alpha+\gamma_n) + \\ m_{sawbn}\sin\alpha] + m_{sn}\dot z_{6n}\sin(\alpha+\gamma_n+\eta_n) + \\ (\dot\alpha+\dot\eta_n)m_{sn}z_{6n}\cos(\alpha+\gamma_n+\eta_n) + (\dot\alpha+\dot\theta_n)m_{awIn}\sin(\alpha+\gamma_n+\theta_n)\} - \ddot z_0\{m_{awIn}\cos(\alpha+\gamma_n+\theta_n) + \\ z_{6n}m_{sn}\sin(\alpha+\gamma_n+\eta_n) - m_{sawcn}\sin(\alpha+\gamma_n) + \\ m_{sawbn}\cos\alpha\}\cos\beta - \dot z_0\{-(\dot\alpha+\dot\theta_n)m_{awIn}\sin(\alpha+\gamma_n+\theta_n) + \\ \dot z_{6n}m_{sn}\sin(\alpha+\gamma_n+\eta_n) - (\dot\alpha+\dot\eta_n)z_{6n}m_{sn}\cos(\alpha+\gamma_n+\eta_n) - \dot\alpha m_{sawcn}\cos(\alpha+\gamma_n) - \dot\alpha m_{sawbn}\sin\alpha\}\cos\beta - \\ \dot\beta\dot z_0\{m_{awIn}\cos(\alpha+\gamma_n+\theta_n) - z_{6n}m_{sn}\sin(\alpha+\gamma_n+\eta_n) - m_{sawcn}\sin(\alpha+\gamma_n) + m_{sawbn}\cos\alpha\}\sin\beta$$ (5.72)

$$\frac{\partial L}{\partial\dot\eta_n} = m_{sn}\dot\eta_n z_{6n}^2 + \dot\alpha m_{sn}z_{6n}\{z_{6n} + c_{1n}\cos\eta_n - b_{2n}\sin(\gamma_n+\eta_n)\} + \\ \dot\beta m_{sn}z_{6n}a_{1n}\sin(\alpha+\gamma_n+\eta_n) - \dot z_0 z_{6n}m_{sn}\sin(\alpha+\gamma_n+\eta_n)\cos\beta$$ (5.73)

$$\frac{d}{dt}\left(\frac{\partial L}{\partial\dot\eta_n}\right) = m_{sn}\ddot\eta_n z_{6n}^2 + 2m_{sn}\dot\eta_n\dot z_{6n}z_{6n} + \ddot\alpha m_{sn}z_{6n}\{z_{6n} + c_{1n}\cos\eta_n - \\ b_{2n}\sin(\gamma_n+\eta_n)\} + \dot\alpha m_{sn}\dot z_{6n}\{z_{6n} + c_{1n}\cos\eta_n - \\ b_{2n}\sin(\gamma_n+\eta_n)\} + \dot\alpha m_{sn}z_{6n}\{\dot z_{6n} - \dot\eta_n[c_{1n}\sin\eta_n + \\ b_{2n}\cos(\gamma_n+\eta_n)]\} + \ddot\beta m_{sn}z_{6n}a_{1n}\sin(\alpha+\gamma_n+\eta_n) + \\ \dot\beta m_{sn}\dot z_{6n}a_{1n}\sin(\alpha+\gamma_n+\eta_n) + \\ \dot\beta(\dot\alpha+\dot\eta_n)m_{sn}z_{6n}a_{1n}\cos(\alpha+\gamma_n+\eta_n) - \\ \ddot z_0 z_{6n}m_{sn}\sin(\alpha+\gamma_n+\eta_n)\cos\beta - \dot z_0\dot z_{6n}m_{sn}\sin(\alpha+\gamma_n+\eta_n)\cos\beta - (\dot\alpha+\dot\eta_n)\dot z_0 z_{6n}m_{sn}\cos(\alpha+\gamma_n+\eta_n)\cos\beta - \dot\beta\dot z_0 z_{6n}m_{sn}\sin(\alpha+\gamma_n+\eta_n)\cos\beta$$ (5.74)

$$\frac{\partial L}{\partial\dot\theta_n} = \dot\theta_n m_{aw2In} + \dot\alpha[m_{aw2In} - m_{awIn}\{c_{2n}\sin\theta_n - b_{2n}\cos(\gamma_n+\theta_n)\}] - \\ \dot\beta m_{awIn}a_{1n}\cos(\alpha+\gamma_n+\theta_n) + \dot z_0 m_{awIn}\cos(\alpha+\gamma_n+\theta_n)\cos\beta$$ (5.75)

$$\frac{d}{dt}\left(\frac{\partial L}{\partial\dot\theta_n}\right) = \ddot\theta_n m_{aw2In} + \ddot\alpha[m_{aw2In} - m_{awIn}\{c_{2n}\sin\theta_n - b_{2n}\cos(\gamma_n+\theta_n)\}] - \dot\alpha\dot\theta_n m_{awIn}\{c_{2n}\cos\theta_n + b_{2n}\sin(\gamma_n+\theta_n)\} - \\ \ddot\beta m_{awIn}a_{1n}\cos(\alpha+\gamma_n+\theta_n) + \\ \dot\beta(\dot\alpha+\dot\theta_n)m_{awIn}a_{1n}\sin(\alpha+\gamma_n+\theta_n) + \\ \ddot z_0 m_{awIn}\cos(\alpha+\gamma_n+\theta_n)\cos\beta - \\ (\dot\alpha+\dot\theta_n)\dot z_0 m_{awIn}\sin(\alpha+\gamma_n+\theta_n)\cos\beta - \\ \dot\beta\dot z_0 m_{awIn}\cos(\alpha+\gamma_n+\theta_n)\sin\beta$$ (5.76)

$$\frac{\partial L}{\partial \dot{z}_{6n}} = m_{sn}\dot{z}_{6n} + \dot{\alpha}m_{sn}\{c_{1n}\sin\eta_n + b_{2n}\cos(\gamma_n + \eta_n)\} - \quad (5.77)$$

$$\dot{\beta}m_{sn}a_{1n}\cos(\alpha + \gamma_n + \eta_n) + \dot{z}_0 m_{sn}\cos(\alpha + \gamma_n + \eta_n)\cos\beta$$

$$\frac{d}{dt}\left(\frac{\partial L}{\partial \dot{z}_{6n}}\right) = m_{sn}\ddot{z}_{6n} + \ddot{\alpha}m_{sn}\{c_{1n}\sin\eta_n + b_{2n}\cos(\gamma_n + \eta_n)\} + \quad (5.78)$$

$$\dot{\alpha}\dot{\eta}_n m_{sn}\{c_{1n}\cos\eta_n - b_{2n}\sin(\gamma_n + \eta_n)\} - \ddot{\beta}m_{sn}a_{1n}\cos(\alpha + \gamma_n + \eta_n) + \dot{\beta}(\dot{\alpha}+\dot{\eta}_n)m_{sn}a_{1n}\sin(\alpha + \gamma_n + \eta_n) + \ddot{z}_0 m_{sn}\cos(\alpha + \gamma_n + \eta_n)\cos\beta - (\dot{\alpha}+\dot{\eta}_n)\dot{z}_0 m_{sn}\sin(\alpha + \gamma_n + \eta_n)\cos\beta - \dot{\beta}\dot{z}_0 m_{sn}\cos(\alpha + \gamma_n + \eta_n)\sin\beta$$

$$\frac{\partial L}{\partial z_{12n}} = 0 \quad (5.79)$$

$$\frac{d}{dt}\left(\frac{\partial L}{\partial \dot{z}_{12n}}\right) = 0 \quad (5.80)$$

The dissipative function is:

$$F_{tot} = -\frac{1}{2}(c_{sn}\dot{z}_{6n}^2 + c_{wn}\dot{z}_{12n}^2) \quad (5.81)$$

The constraints are based on geometrical constraints, and the touch point of the road and the wheel. The geometrical constraint is expressed as $$e_{2n}\cos\theta_n = -(z_{6n}-d_{1n})\sin\eta_n$$

$$e_{2n}\sin\theta_n - (z_{6n}-d_{1n})\cos\eta_n = c_{1n}-c_{2n} \quad (5.82)$$

The touch point of the road and the wheel is defined as $$z_{tn} = z_{pr_{touchpoint\ n}} \quad (5.83)$$

$$= z_0 + \{z_{12n}\cos\alpha + e_{3n}\sin(\alpha+\gamma_n+\theta_n) + c_{2n}\cos(\alpha+\gamma_n) + b_{2n}\sin\alpha\}\cos\beta - a_{1n}\sin\beta$$

$$= R_n(t)$$

where $R_n(t)$ is road input at each wheel.
Differentials are:

$$\dot{\theta}_n e_{2n}\sin\theta_n - \dot{z}_{6n}\sin\eta_n - \dot{\eta}_n(z_{6n}-d_{1n})\cos\eta_n = 0$$

$$\dot{\theta}_n e_{2n}\cos\theta_n - \dot{z}_{6n}\cos\eta_n + \dot{\eta}_n(z_{6n}-d_{1n})\sin\eta_n = 0$$

$$\dot{z}_0 + \{\dot{z}_{12n}\cos\alpha - \dot{\alpha}z_{12n}\sin\alpha + (\dot{\alpha}+\dot{\theta}_n)e_{3n}\cos(\alpha+\gamma_n+\theta_n) - \quad (5.84)$$

$$\dot{\alpha}c_{2n}\sin(\alpha+\gamma_n) + \dot{\alpha}b_{2n}\cos\alpha\}\cos\beta -$$

$$\dot{\beta}[\{z_{12n}\cos\alpha + e_{3n}\sin(\alpha+\gamma_n+\theta_n) + c_{2n}\cos(\alpha+\gamma_n) + b_{2n}\sin\alpha\}\sin\beta + a_{1n}\cos\beta] - \dot{R}_n(t) = 0$$

Since the differentials of these constraints are written as $$\sum_j a_{lnj}d\dot{q}_j + a_{lnt}dt = 0 \quad (l=1,2,3\ n=i,ii,iii,iv) \quad (5.85)$$

then the values $a_{1nj}$ are obtained as follows.

$a_{1n0}=0$
$a_{2n0}=0$
$a_{3n0}=1$ $a_{1n1}=0$, $a_{1n2}=0$, $a_{1n3}=-(z_{6n}-d_{1n})\cos\eta_n$, $a_{1n4}=e_{2n}\sin\theta_n$, $a_{1n5}=-\sin\eta_n$, $a_{1n6}=0$ $a_{2n1}=0$, $a_{2n2}=0$, $a_{2n3}=(z_{6n}-d_{1n})\sin\eta_n$, $a_{2n4}=e_{2n}\cos\theta_n$, $a_{2n5}=-\cos\eta_n$, $a_{2n6}=0$ $a_{3n1}=-\{z_{12n}\cos\alpha+e_{3n}\sin(\alpha+\gamma_n+\theta_n)+c_{2n}\cos(\alpha+\gamma_n)+b_{2n}\sin\alpha\}\sin\beta+a_{1n}\cos\beta$, $a_{3n2}=\{-z_{12n}\sin\alpha+e_{3n}\cos(\alpha+\gamma_n+\theta_n)-c_{2n}\sin(\alpha+\gamma_n)+b_{2n}\cos\alpha\}\cos\beta$, $a_{3n3}=0$, $a_{3n4}=e_{3n}\cos(\alpha+\gamma_n+\theta_n)\cos\beta$, $a_{3n5}=0$, $a_{3n6}=\cos\alpha\cos\beta$ (5.86)

From the above, Lagrange's equation becomes $$\frac{d}{dt}\left(\frac{\partial L}{\partial \dot{q}_j}\right) - \frac{\partial L}{\partial q_j} = Q_j + \sum_{l,n}\lambda_{ln}a_{lnj} \quad (5.87)$$

where $q_0=z_0$
$q_1=\beta$, $q_2=\alpha$, $q_{3i}=\eta_i$, $q_{4i}=\theta_i$, $q_{5i}=z_{6i}$, $q_{6i}=z_{12i}$
$q_{3ii}=\eta_{ii}$, $q_{4ii}=\theta_{ii}$, $q_{5ii}=z_{6ii}$, $q_{6ii}=z_{12ii}$
$q_{3iii}=\eta_{iii}$, $q_{4iii}=\theta_{iii}$, $q_{5iii}=z_{6iii}$, $q_{6iii}=z_{12iii}$
$q_{3iv}=\eta_{iv}$, $q_{4iv}=\theta_{iv}$, $q_{5iv}=z_{6iv}$, $q_{6iv}=z_{12iv}$ (5.88)

$$\frac{d}{dt}\left(\frac{\partial L}{\partial \dot{z}_0}\right) - \frac{\partial L}{\partial z_0} = \frac{\partial F}{\partial \dot{z}_0} + \sum_{l,n}\lambda_{ln}a_{ln0}\ l=1,2,3\ n=i,ii,iii,iv$$

$$\ddot{z}_0(m_b+m_{sawn}) + \ddot{\alpha}m_b\cos\beta(b_0\cos\alpha-c_0\sin\alpha) - \dot{\alpha}^2 m_b\cos\beta(b_0\sin\alpha-c_0\cos\alpha) -$$

$$\ddot{\beta}\{m_{ba}\cos\beta + m_b(b_0\sin\alpha-c_0\cos\alpha)\sin\beta\} + \dot{\beta}\{\dot{\beta}(m_{ba}+m_{sawan})\sin\beta + \dot{\beta}m_b(b_0\sin\alpha-c_0\cos\alpha)\cos\beta\} +$$

$$\{\ddot{z}_{6n}m_{sn}\cos(\alpha+\gamma_n+\eta_n) - 2(\dot{\alpha}+\dot{\eta}_n)\dot{z}_{6n}m_{sn}\sin(\alpha+\gamma_n+\eta_n) + (\ddot{\alpha}+\ddot{\theta})m_{aw1n}\cos(\alpha+\gamma_n+\theta_n) -$$

$$(\dot{\alpha}+\dot{\theta}_n)^2 m_{aw1n}\sin(\alpha+\gamma_n+\theta_n) - (\ddot{\alpha}+\ddot{\theta}_n)z_{6n}m_{sn}\sin(\alpha+\gamma_n+\eta_n) - (\dot{\alpha}+\dot{\theta}_n)^2 z_{6n}m_{sn}\cos(\alpha+\gamma_n+\eta_n) -$$

$$\ddot{\alpha}m_{sawcn}\sin(\alpha+\gamma_n) - \dot{\alpha}^2 m_{sawcn}\cos(\alpha+\gamma_n) + \ddot{\alpha}m_{sawbn}\cos\alpha - \dot{\alpha}^2 m_{sawbn}\sin\alpha - \ddot{\beta}m_{sawan}\}\cos\beta -$$

$$2\dot{\beta}\{\dot{z}_{6n}m_{sn}\cos(\alpha+\gamma_n+\eta_n) + (\dot{\alpha}+\dot{\theta}_n)m_{aw1n}\cos(\alpha+\gamma_n+\theta_n) - (\dot{\alpha}+\dot{\eta}_n)z_{6n}m_{sn}\sin(\alpha+\gamma_n+\eta_n) -$$

$$\dot{\alpha}m_{sawcn}\sin(\alpha+\gamma_n) + \dot{\alpha}m_{sawbn}\cos\alpha\}\sin\beta -$$

$$(\ddot{\beta}\sin\beta + \dot{\beta}^2\cos\beta)\{m_{aw1n}\sin(\alpha+\gamma_n+\theta_n) + z_{6n}m_{sn}\cos(\alpha+\gamma_n+\eta_n) + m_{sawcn}\cos(\alpha+\gamma_n) + m_{sawbn}\sin\alpha\} +$$

$$g(m_b+m_{sawn}) = \lambda_{3n}$$

-continued $$\ddot{a}m_bC_\beta A_2 - \dot{\alpha}^2 m_b A_1 - \ddot{\beta}\{m_{ba}C_\beta + m_b A_1 S_\beta\} + \dot{\beta}\{m_{ba}S_\beta + \dot{\beta}m_b A_1 C_\beta\} +$$
$$\{\ddot{z}_{6n}m_{sn}C_{\alpha\gamma\eta} - 2(\dot{\alpha}+\dot{\eta}_n)\dot{z}_{6n}m_{sn}S_{\alpha\gamma\eta} + (\ddot{\alpha}+\ddot{\theta}_n)m_{aw1n}C_{\alpha\gamma\eta} -$$
$$(\dot{\alpha}+\dot{\theta}_n)^2 m_{aw1n}S_{\alpha\gamma\eta} - (\ddot{\alpha}+\ddot{\eta}_n)z_{6n}m_{sn}S_{\alpha\gamma\eta} - (\dot{\alpha}+\dot{\eta}_n)^2 z_{6n}m_{sn}C_{\alpha\gamma\eta} -$$
$$\ddot{a}m_{sawcn}S_{\alpha\gamma\eta} - \dot{\alpha}^2 m_{sawcn}C_{\alpha\gamma\eta} + \ddot{a}m_{sawcn}C_\alpha - \dot{\alpha}^2 m_{sawbn}S_\alpha - \ddot{\beta}m_{sawan}\}C_\beta -$$
$$2\dot{\beta}\{\dot{z}_{6n}m_{sn}C_{\alpha\gamma\eta} + (\dot{\alpha}+\dot{\theta}_n)m_{aw1n}C_{\alpha\gamma\eta} - (\dot{\alpha}+\dot{\eta}_n)z_{6n}m_{sn}S_{\alpha\gamma\eta} -$$
$$\dot{\alpha}m_{sawcn}S_{\alpha\gamma\eta} + \dot{\alpha}m_{sawbn}C_\alpha - \dot{\beta}m_{sawan}/2\}S_\beta -$$
$$\ddot{z}_0 = \lambda_{3n} - g - \frac{(\ddot{\beta}S_\beta + \dot{\beta}^2 C_\beta)\{m_{aw1n}S_{\alpha\gamma\eta} + z_{6n}m_{sn}C_{\alpha\gamma\eta} + m_{sawcn}C_{\alpha\gamma\eta} + m_{sawbn}S_\alpha\}}{m_{bsawn}}$$

$$\frac{d}{dt}\left(\frac{\partial L}{\partial \dot{\beta}}\right) - \frac{\partial L}{\partial \beta} = \frac{\partial F}{\partial \dot{\beta}} + \sum_{l,n} \lambda_{ln} a_{ln1} \quad l=1,2,3 \quad n=i, ii, iii, iv \tag{5.89}$$

$$\ddot{\beta}(m_{saw2n} + m_{bal} + m_b(b_0\sin\alpha + c_0\cos\alpha)^2 + m_{sn}\{z_{6n}\cos(\alpha+\gamma_n+\eta_n) + c_{1n}\cos(\alpha+\gamma_n) + b_{2n}\sin\alpha\}^2 + \tag{5.90}$$
$$m_{an}\{e_{1n}\sin(\alpha+\gamma_n+\theta_n) + c_{2n}\cos(\alpha+\gamma_n) + b_{2n}\sin\alpha\}^2 +$$
$$m_{wn}\{e_{3n}\sin(\alpha+\gamma_n+\theta_n) + c_{2n}\cos(\alpha+\gamma_n) + b_{2n}\sin\alpha\}^2) +$$
$$2\dot{\beta}\langle\dot{\alpha}m_b(b_0\sin\alpha+c_0\cos\alpha)(b_0\cos\alpha - c_0\sin\alpha) + m_{sn}\{z_{6n}\cos(\alpha+\gamma_n+\eta_n) + c_{1n}\cos(\alpha+\gamma_n) + b_{2n}\sin\alpha\}$$
$$\{\dot{z}_{6n}\cos(\alpha+\gamma_n+\eta_n) - (\dot{\alpha}+\dot{\eta}_n)z_{6n}\sin(\alpha+\gamma_n+\eta_n) - \dot{\alpha}[c_{1n}\sin(\alpha+\gamma_n) - b_{2n}\cos\alpha]\} +$$
$$m_{an}\{e_{1n}\sin(\alpha+\gamma_n+\theta_n) + c_{2n}\cos(\alpha+\gamma_n) + b_{2n}\sin\alpha\}\{(\dot{\alpha}+\dot{\theta}_n)e_{1n}\cos(\alpha+\gamma_n+\theta_n) - \dot{\alpha}[$$
$$c_{2n}\sin(\alpha+\gamma_n) - b_{2n}\cos\alpha]\} + m_{wn}\{e_{3n}\sin(\alpha+\gamma_n+\theta_n) + c_{2n}\cos(\alpha+\gamma_n) + b_{2n}\sin\alpha\}$$
$$\{(\dot{\alpha}+\dot{\theta}_n)e_{3n}\sin(\alpha+\gamma_n+\theta_n) - \dot{\alpha}[c_{2n}\sin(\alpha+\gamma_n) - b_{2n}\cos\alpha]\}\rangle -$$
$$\ddot{a}m_{ba}(b_0\cos\alpha - c_0\sin\alpha) + \dot{\alpha}^2 m_{ba}(b_0\sin\alpha + c_0\cos\alpha) - \ddot{z}_{6n}m_{sn}a_{1n}\cos(\alpha+\gamma_n+\eta_n) +$$
$$\dot{z}_{6n}(\dot{\alpha}+\dot{\eta}_n)m_{sn}a_{1n}\sin(\alpha+\gamma_n+\eta_n) + \ddot{\eta}_n m_{sn}z_{6n}a_{1n}\sin(\alpha+\gamma_n+\eta_n) +$$
$$\dot{\eta}_n m_{sn}\dot{z}_{6n}a_{1n}\sin(\alpha+\gamma_n+\eta_n) + \dot{\eta}_n(\dot{\alpha}+\dot{\eta}_n)m_{sn}z_{6n}a_{1n}\cos(\alpha+\gamma_n+\eta_n) -$$
$$\ddot{\theta}_n m_{aw1n}a_{1n}\cos(\alpha+\gamma_n+\theta_n) + \dot{\theta}_n(\dot{\alpha}+\dot{\theta}_n)m_{aw1n}a_{1n}\sin(\alpha+\gamma_n+\theta_n) +$$
$$\ddot{\alpha}a_{1n}\{m_{sawcn}\sin(\alpha+\gamma_n) - m_{sawbn}\cos\alpha + m_{sn}z_{6n}\sin(\alpha+\gamma_n+\eta_n) - m_{aw1n}\cos(\alpha+\gamma_n+\theta_n)\} +$$
$$\dot{\alpha}a_{1n}\{\dot{\alpha}m_{sawcn}\cos(\alpha+\gamma_n) + \dot{\alpha}m_{sawbn}\sin\alpha + (\dot{\alpha}+\dot{\eta}_n)m_{sn}z_{6n}\cos(\alpha+\gamma_n+\eta_n) + m_{sn}\dot{z}_{6n}\sin(\alpha+\gamma_n+\eta_n) +$$
$$(\dot{\alpha}+\dot{\theta}_n)m_{aw1n}\sin(\alpha+\gamma_n+\theta_n)\} - \ddot{z}_0[\{m_b(b_0\sin\alpha + c_0\cos\alpha) + m_{aw1n}\sin(\alpha+\gamma_n+\theta_n) +$$
$$z_{6n}m_{sn}\cos(\alpha+\gamma_n+\eta_n) + m_{sawcn}\cos(\alpha+\gamma) + m_{sawbn}\sin\alpha\}\sin\beta + (m_{ba} + m_{sawan}\cos\beta)] -$$
$$\dot{z}_0[\{\dot{\alpha}m_b(b_0\cos\alpha - c_0\sin\alpha) + (\dot{\alpha}+\dot{\theta}_n)m_{aw1n}\cos(\alpha+\gamma_n+\theta_n) + \dot{z}_{6n}m_{sn}\cos(\alpha+\gamma_n+\eta_n) -$$
$$(\dot{\alpha}+\dot{\eta}_n)z_{6n}m_{sn}\sin(\alpha+\gamma_n+\eta_n) - \dot{\alpha}m_{sawcn}\sin(\alpha+\gamma_n) + \dot{\alpha}m_{sawbn}\cos\alpha\}\sin\beta +$$
$$\dot{\beta}\dot{z}_0\{m_b(b_0\sin\alpha + c_0\cos\alpha) + m_{aw1n}\sin(\alpha+\gamma_n+\theta_n) + z_{6n}m_{sn}\cos(\alpha+\gamma_n+\eta_n) +$$
$$m_{sawcn}\cos(\alpha+\gamma_n) + m_{sawbn}\sin\alpha\}\cos\beta - (m_{ba} + m_{sawan}\sin\beta)] +$$
$$\dot{\alpha}\dot{z}_0 m_b\sin\beta(b_0\cos\alpha - c_0\sin\alpha) - \dot{\beta}\dot{z}_0\{m_{ba}\sin\beta - m_b(b_0\sin\alpha + c_0\cos\alpha)\cos\beta\} -$$
$$gm_{ba}\cos\beta +$$
$$m_b(b_0\sin\alpha + c_0\cos\alpha)\sin\beta\} -$$
$$\langle g[\{m_{sn}z_{6n}\cos(\alpha+\gamma_n+\eta_n) + m_{aw1n}\sin(\alpha+\gamma_n+\theta_n) + m_{sawcn}\cos(\alpha+\gamma_n) + m_{sawbn}\sin\alpha\}\sin\beta + m_{sawan}\cos\beta] -$$
$$\dot{z}_0\{\dot{z}_{6n}m_{sn}\cos(\alpha+\gamma_n+\eta_n) + (\dot{\alpha}+\dot{\theta}_n)m_{aw1n}\cos(\alpha+\gamma_n+\theta_n) -$$
$$(\dot{\alpha}+\dot{\eta}_n)z_{6n}m_{sn}\sin(\alpha+\gamma_n+\eta_n) - \dot{\alpha}m_{sawcn}\sin(\alpha+\gamma_n) + \dot{\alpha}m_{sawbn}\cos\alpha - \dot{\beta}m_{sawan}\}\sin\beta\} -$$
$$\dot{\beta}\dot{z}_0\{m_{aw1n}\sin(\alpha+\gamma_n+\theta_n) + z_{6n}m_{sn}\cos(\alpha+\gamma_n+\eta_n) + m_{sawcn}\cos(\alpha+\gamma_n) +$$
$$m_{sawbn}\sin\alpha\}\cos\beta\rangle =$$
$$\lambda_{3n}[-\{z_{12n}\cos\alpha + e_{3n}\sin(\alpha+\gamma_n+\theta_n) + c_{2n}\cos(\alpha+\gamma_n) + b_{2n}\sin\alpha\}$$
$$\sin\beta + a_{1n}\cos\beta]$$

$$\ddot{\beta}(m_{saw2n} + m_{bal} + m_b A_1^2 + m_{sn}B_1^2 + m_{an}B_2^2 + m_{wn}B_3^2) + \tag{5.91}$$
$$2\dot{\beta}[\dot{\alpha}m_b A_1 A_2 + m_{sn}B_1\{\dot{z}_{6n}C_{\alpha\gamma\eta n} - (\dot{\alpha}+\dot{\eta}_n)z_{6n}S_{\alpha\gamma\eta n} - \dot{\alpha}A_4\} + m_{an}B_2\{(\dot{\alpha}+\dot{\theta}_n)e_{1n}C_{\alpha\gamma\theta n} - \dot{\alpha}A_6\} +$$
$$m_{wn}B_3\{(\dot{\alpha}+\dot{\theta}_n)e_{3n}S_{\alpha\gamma\theta n} - \dot{\alpha}A_6\}] - \ddot{a}m_{ba}A_2 + \dot{\alpha}^2 m_{ba}A_1 - \ddot{z}_{6n}m_{sn}a_{1n}C_{\alpha\gamma\eta n} +$$
$$2\dot{z}_{6n}(\dot{\alpha}+\dot{\eta}_n)m_{sn}a_{1n}S_{\alpha\gamma\eta n} + \ddot{\eta}_n m_{sn}z_{6n}a_{1n}S_{\alpha\gamma\eta n} + \dot{\eta}_n(2\dot{\alpha}+\dot{\eta}_n)m_{sn}z_{6n}a_{1n}C_{\alpha\gamma\eta n} - \ddot{\theta}_n m_{aw1n}a_{1n}C_{\alpha\gamma\theta n} +$$
$$\dot{\theta}_n(2\dot{\alpha}+\dot{\theta}_n)m_{aw1n}a_{1n}S_{\alpha\gamma\theta n} + \ddot{a}a_{1n}\{m_{sawcn}S_{\alpha\gamma n} - m_{sawbn}C_\alpha + m_{sn}z_{6n}S_{\alpha\gamma\eta n} - m_{aw1n}C_{\alpha\gamma\theta n}\} +$$
$$\dot{\alpha}^2 a_{1n}\{m_{sawcn}C_{\alpha\gamma n} + m_{sawbn}S_\alpha + m_{sn}z_{6n}C_{\alpha\gamma\eta n} + m_{aw1n}S_{\alpha\gamma\theta n}\} -$$
$$\ddot{z}_0[\{m_b(b_0 S_\alpha + c_0 C_\alpha) + m_{aw1n}S_{\alpha\gamma\eta n} + z_{6n}m_{sn}C_{\alpha\gamma\eta n} + m_{sawcn}C_{\alpha\gamma n} + m_{sawbn}S_\alpha\}S_\beta + (m_{ba} + m_{sawan})C_\beta] +$$
$$\dot{z}_0(1-\dot{\beta})(m_{ba} + m_{sawan})\sin\beta -$$
$$g[m_{ba}C_\beta + m_b A_1 S_\beta + \{m_{sn}z_{6n}C_{\alpha\gamma\eta n} + m_{aw1n}S_{\alpha\gamma\theta n} + m_{sawcn}C_{\alpha\gamma n} + m_{sawbn}S_\alpha\}S_\beta + m_{sawan}C_\beta] =$$
$$\lambda_{3n}[-\{z_{12n}C_\alpha + e_{3n}S_{\alpha\gamma\theta n} + c_{2n}C_{\alpha\gamma n} + b_{2n}S_\alpha\}S_\beta + a_{1n}C_\beta]$$

$$\ddot{\beta} = \frac{\begin{aligned}&2\dot{\beta}[\dot{\alpha}m_b A_1 A_2 + m_{sn}B_1\{\dot{z}_{6n}C_{\alpha\gamma\eta n} - (\dot{\alpha}+\dot{\eta}_n)z_{6n}S_{\alpha\gamma\eta n} - \dot{\alpha}A_4\} + m_{an}B_2\{(\dot{\alpha}+\dot{\theta}_n)e_{1n}C_{\alpha\gamma\theta n} - \dot{\alpha}A_6\} +\\&m_{wn}B_3\{(\dot{\alpha}+\dot{\theta}_n)e_{3n}S_{\alpha\gamma\theta n} - \dot{\alpha}A_6\}] - \ddot{\alpha}m_{ba}A_2 + \dot{\alpha}^2 m_{ba}A_1 - \ddot{z}_{6n}m_{sn}a_{1n}C_{\alpha\gamma\eta n} + 2\dot{z}_{6n}(\dot{\alpha}+\dot{\eta}_n)m_{sn}a_{1n}S_{\alpha\gamma\eta n} +\\&\ddot{\eta}_n m_{sn}z_{6n}a_{1n}S_{\alpha\gamma\eta n} + \dot{\eta}_n(2\dot{\alpha}+\dot{\eta}_n)m_{sn}z_{6n}a_{1n}C_{\alpha\gamma\eta n} - \ddot{\theta}_n m_{awln}a_{1n}C_{\alpha\gamma\theta n} + \dot{\theta}_n(2\dot{\alpha}+\dot{\theta}_n)m_{awln}a_{1n}S_{\alpha\gamma\theta n} +\\&\ddot{\alpha}a_{1n}\{m_{sawcn}S_{\alpha\gamma n} - m_{sawbn}C_\alpha + m_{sn}z_{6n}S_{\alpha\gamma\eta n} - m_{awln}C_{\alpha\gamma\theta n}\} +\\&\dot{\alpha}^2 a_{1n}\{m_{sawcn}C_{\alpha\gamma n} + m_{sawbn}S_\alpha + m_{sn}z_{6n}C_{\alpha\gamma\eta n} + m_{awln}S_{\alpha\gamma\theta n}\} -\\&\ddot{z}_0[\{m_b(b_0 S_\alpha + c_0 C_\alpha) + m_{awln}S_{\alpha\gamma\eta n} + z_{6n}m_{sn}C_{\alpha\gamma\eta n} + m_{sawcn}C_{\alpha\gamma n} +\\&m_{sawbn}S_\alpha\}S_\beta + (m_{ba} + m_{sawan})C_\beta] + \ddot{z}_0(1-\dot{\beta})(m_{ba} + m_{sawan})\sin\beta -\\&g[m_{ba}C_\beta + m_b A_1 S_\beta + \{m_{sn}z_{6n}C_{\alpha\gamma\eta n} + m_{awln}S_{\alpha\gamma\theta n} + m_{sawcn}C_{\alpha\gamma n} +\\&m_{sawbn}S_\alpha\}S_\beta + m_{sawan}C_\beta] + \lambda_{3n}\{(z_{12n}C_\alpha + e_{3n}S_{\alpha\gamma\theta n} + c_{2n}C_{\alpha\gamma n} + b_{2n}S_\alpha)S_\beta - a_{1n}C_\beta\}\end{aligned}}{-(m_{saw2n} + m_{bal} + m_b A_1^2 + m_{sn}B_1^2 + m_{an}B_2^2 + m_{wn}B_3^2)} \quad (5.92)$$

$$\frac{d}{dt}\left(\frac{\partial L}{\partial \dot{\alpha}}\right) - \frac{\partial L}{\partial \alpha} = \frac{\partial F}{\partial \alpha} + \sum_{l,n}\lambda_{ln}a_{ln2} \quad l=1,2,3 \; n=i,ii,iii,iv \quad (5.93)$$

$$\begin{aligned}&-\ddot{\beta}m_{ba}(b_0\cos\alpha - c_0\sin\alpha) + \dot{\beta}\dot{\alpha}m_{ba}(b_0\sin\alpha + c_0\cos\alpha) + \ddot{z}_0 m_b\cos\beta(b_0\cos\alpha - c_0\sin\alpha) -\\&\dot{\beta}\dot{z}_0 m_b\sin\beta(b_0\cos\alpha - c_0\sin\alpha) - \dot{\alpha}\dot{z}_0 m_b\cos\beta(b_0\sin\alpha - c_0\cos\alpha) + \ddot{\alpha}\langle m_{bbl} + m_{sawln} +\\&m_{sn}z_{6n}[z_{6n} + 2\{c_{1n}\cos\eta_n - b_{2n}\sin(\gamma_n + \eta_n)\}] - 2m_{awln}\{c_{2n}\sin\theta_n - b_{2n}\cos(\gamma_n + \theta_n)\}\rangle +\\&\dot{\alpha}\langle m_{sn}\dot{z}_{6n}[z_{6n} + 2\{c_{1n}\cos\eta_n - b_{2n}\sin(\gamma_n + \eta_n)\}] + m_{sn}z_{6n}[\dot{z}_{6n} - 2\dot{\eta}_n\{c_{1n}\sin\eta_n + b_{2n}\cos(\gamma_n + \eta_n)\}] -\\&2\dot{\theta}_n m_{awln}\{c_{2n}\cos\theta_n + b_{2n}\sin(\gamma_n + \theta)\}\rangle + \ddot{z}_{6n}m_{sn}\{c_{1n}\sin\eta_n + b_{2n}\cos(\gamma_n + \eta_n)\} +\\&\dot{z}_{6n}\dot{\eta}_n m_{sn}\{c_{1n}\cos\eta_n - b_{2n}\sin(\gamma_n + \eta_n)\} + \ddot{\eta}_n m_{sn}z_{6n}\{z_{6n} + c_{1n}\cos\eta_n - b_{2n}\sin(\gamma_n + \eta_n)\} +\\&\dot{\eta}_n m_{sn}\dot{z}_{6n}\{z_{6n} + c_{1n}\cos\eta_n - b_{2n}\sin(\gamma_n + \eta_n)\} + \dot{\eta}_n m_{sn}z_{6n}\{\dot{z}_{6n} - \dot{\eta}_n[c_{1n}\sin\eta_n + b_{2n}\cos(\gamma_n + \eta_n)]\} +\\&\ddot{\theta}[m_{aw2ln} - m_{awln}\{c_{2n}\sin\theta_n - b_{2n}\cos(\gamma_n + \theta_n)\}] - \dot{\theta}_n^2 m_{awln}\{c_{2n}\cos\theta_n + b_{2n}\sin(\gamma_n + \theta_n)\}] +\\&\ddot{\beta}a_{1n}\{m_{sawcn}\sin(\alpha+\gamma_n) - m_{sawbn}\cos\alpha + m_{sn}z_{6n}\sin(\alpha+\gamma_n+\eta_n) - m_{awln}\cos(\alpha+\gamma_n+\theta_n)\} +\\&\dot{\beta}a_{1n}\{\dot{\alpha}[m_{sawcn}\cos(\alpha+\gamma_n) + m_{sawbn}\sin\alpha] + m_{sn}\dot{z}_{6n}\sin(\alpha+\gamma_n+\eta_n) +\\&(\dot{\alpha}+\dot{\eta}_n)m_{sn}z_{6n}\cos(\alpha+\gamma_n+\eta_n) + (\dot{\alpha}+\dot{\theta}_n)m_{awln}\sin(\alpha+\gamma_n+\theta_n)\} +\\&\ddot{z}_0\{m_{awln}\cos(\alpha+\gamma_n+\theta_n) - z_{6n}m_{sn}\sin(\alpha+\gamma_n+\eta_n) - m_{sawcn}\sin(\alpha+\gamma_n) + m_{sawbn}\cos\alpha\}\cos\beta +\\&\dot{z}_0\{-(\dot{\alpha}+\dot{\theta}_n)m_{awln}\sin(\alpha+\gamma_n+\theta_n) - z_{6n}m_{sn}\sin(\alpha+\gamma_n+\eta_n) - (\dot{\alpha}+\dot{\eta}_n)z_{6n}m_{sn}\cos(\alpha+\gamma_n+\eta_n) -\\&\dot{\alpha}m_{sawcn}\cos(\alpha+\gamma_n) - \dot{\alpha}m_{sawbn}\sin\alpha\}\cos\beta -\\&\dot{\beta}\dot{z}_0\{m_{awln}\cos(\alpha+\gamma_n+\theta_n) - z_{6n}m_{sn}\sin(\alpha+\gamma_n+\eta_n) - m_{sawcn}\sin(\alpha+\gamma_n) + m_{sawbn}\cos\alpha\}\cos\beta -\\&\{\dot{\beta}^2 m_b(b_0\cos\alpha - c_0\sin\alpha) + \dot{\alpha}\dot{\beta}m_{ba}\}(b_0\sin\alpha + c_0\cos\alpha) -\\&|\dot{\beta}^2\langle m_{sn}\{z_{6n}\cos(\alpha+\gamma_n+\eta_n) + c_{1n}\cos(\alpha+\gamma_n) + b_{2n}\sin\alpha\}\{-z_{6n}\sin(\alpha+\gamma_n+\eta_n) - c_{1n}\sin(\alpha+\gamma_n) + b_{2n}\cos\alpha\} +\\&m_{an}\{e_{1n}\sin(\alpha+\gamma_n+\theta_n) + c_{2n}\cos(\alpha+\gamma_n) + b_{2n}\sin\alpha\}\\&\{e_1\cos(\alpha+\gamma_n+\theta_n) - c_{2n}\sin(\alpha+\gamma_n) + b_{2n}\cos\alpha\} + m_{wn}\\&\{e_{3n}\sin(\alpha+\gamma_n+\theta_n) + c_{2n}\cos(\alpha+\gamma_n) + b_{2n}\sin\alpha\}\{e_3\cos(\alpha+\gamma_n+\theta_n) - c_{2n}\sin(\alpha+\gamma_n) + b_{2n}\cos\alpha\}\rangle +\\&\dot{z}_{6n}\dot{\beta}m_{sn}a_{1n}\sin(\alpha+\gamma_n+\eta_n) + \dot{\eta}_n\dot{\beta}m_{sn}z_{6n}a_{1n}\cos(\alpha+\gamma_n+\eta_n) + \dot{\theta}\dot{\beta}m_{awln}a_{1n}\sin(\alpha+\gamma_n+\theta_n) +\\&\dot{\alpha}\dot{\beta}a_{1n}\{m_{sawcn}\cos(\alpha+\gamma_n) + m_{sawbn}\sin\alpha + m_{sn}z_{6n}\cos(\alpha+\gamma_n+\eta_n) + m_{awln}\sin(\alpha+\gamma_n+\theta_n)\} -\\&\dot{z}_0\{\dot{z}_{6n}m_{sn}\sin(\alpha+\gamma_n+\eta_n) + (\dot{\alpha}+\dot{\theta}_n)m_{awln}\sin(\alpha+\gamma_n+\theta_n) +\\&(\dot{\alpha}+\dot{\eta}_n)z_{6n}m_{sn}\cos(\alpha+\gamma_n+\eta_n) + \dot{\alpha}m_{sawcn}\cos(\alpha+\gamma_n) + \dot{\alpha}m_{sawbn}\sin\alpha\}\\&\cos\beta\dot{\beta}\dot{z}_0[\{m_{awln}\cos(\alpha+\gamma_n+\theta_n) - z_{6n}m_{sn}\sin(\alpha+\gamma_n+\eta_n) - m_{sawn}\sin(\alpha+\gamma_n) + m_{sawbn}\cos\alpha\}\sin\beta| +\\&gm_b(b_0\cos\alpha - c_0\sin\alpha)\\&\cos\beta - g\{m_{sn}z_{6n}\sin(\alpha+\gamma_n+\eta_n) - m_{awln}\cos(\alpha+\gamma_n+\theta_n) + m_{sawcn}\sin(\alpha+\gamma_n) - m_{sawbn}\cos\alpha\}\\&\cos\beta = \lambda_{3n}\{-z_{12n}\sin\alpha + e_{3n}\cos(\alpha+\gamma_n+\theta_n) - c_{2n}\sin(\alpha+\gamma_n) + b_{2n}\cos\alpha\}\cos\beta\end{aligned} \quad (5.94)$$

$$\begin{aligned}&\ddot{z}_0\{m_b A_2 + m_{awln}C_{\alpha\gamma\theta n} - z_{6n}m_{sn}S_{\alpha\gamma\eta n} - m_{sawcn}S_{\alpha\gamma n} + m_{sawbn}C_\alpha\}C_\beta - \ddot{\beta}m_{ba}A_2 +\\&\ddot{\alpha}\{m_{bbl} + m_{sawln} + m_{sn}z_{6n}(z_{6n} + 2E_{1n}) - 2m_{awln}H_{1n}\} + 2\dot{\alpha}\{m_{sn}\dot{z}_{6n}(z_{6n} + E_{1n}) - m_{sn}z_{6n}\dot{\eta}_n E_{2n} - \dot{\theta}_n m_{awln}H_{2n}\} +\\&\ddot{z}_{6n}m_{sn}E_{2n} + \dot{z}_{6n}\dot{\eta}_n m_{sn}E_{1n} + \ddot{\eta}_n m_{sn}z_{6n}\{z_{6n} + E_{1n}\} + \dot{\eta}_n m_{sn}\dot{z}_{6n}\{2z_{6n} + E_{1n}\} - \dot{\eta}_n^2 m_{sn}z_{6n}E_{2n} +\\&\ddot{\theta}(m_{aw2ln} - m_{awln}H_{1n}) - \dot{\theta}_n^2 m_{awln}H_{2n} + \ddot{\beta}a_{1n}(m_{sawcn}S_{\alpha\gamma n} - m_{sawbn}C_\alpha + m_{sn}z_{6n}S_{\alpha\gamma\eta n} - m_{awln}C_{\alpha\gamma\theta n}) +\\&\dot{\beta}a_{1n}\{\dot{\alpha}(m_{sawcn}C_{\alpha\gamma n} + m_{sawbn}S_\alpha) + m_{sn}\dot{z}_{6n}S_{\alpha\gamma\eta n} + (\dot{\alpha}+\dot{\eta}_n)m_{sn}z_{6n}C_{\alpha\gamma\eta n} + (\dot{\alpha}+\dot{\theta}_n)m_{awln}S_{\alpha\gamma\theta n}\} - \dot{\beta}^2 m_b A_2 A_1 - [\\&\dot{\beta}^2\{m_{sn}B_1(-z_{6n}S_{\alpha\gamma\eta n} - A_4) + m_{an}B_2(e_1 C_{\alpha\gamma\theta n} - A_6) + m_{wn}B_3(e_3 C_{\alpha\gamma\theta n} - A_6)\} + \dot{z}_{6n}\dot{\beta}m_{sn}a_{1n}S_{\alpha\gamma\eta n} + \dot{\eta}_n\dot{\beta}m_{sn}z_{6n}a_{1n}C_{\alpha\gamma\eta n} +\\&\dot{\theta}\dot{\beta}m_{awln}a_{1n}S_{\alpha\gamma\theta n} + \dot{\alpha}\dot{\beta}a_{1n}\{m_{sawcn}C_{\alpha\gamma n} + m_{sawbn}S_\alpha + m_{sn}z_{6n}C_{\alpha\gamma\eta n} + m_{awln}S_{\alpha\gamma\theta n}\}] + gm_b A_2 C_\beta -\\&g\{m_{sn}z_{6n}S_{\alpha\gamma\eta n} - m_{awln}C_{\alpha\gamma\theta n} + m_{sawcn}S_{\alpha\gamma n} - m_{sawbn}C_\alpha\}C_\beta = \lambda_{3n}\{-z_{12n}S_\alpha + e_{3n}C_{\alpha\gamma\theta n} - c_{2n}S_{\alpha\gamma n} + b_{2n}C_\alpha\}C_\beta\end{aligned} \quad (5.95)$$

-continued $$\ddot{z}_0\{m_b A_2 + m_{awln}C_{\alpha\gamma\theta n} - z_{6n}m_{sn}S_{\alpha\gamma\eta n} - m_{sawcn}S_{\alpha\gamma n} + m_{sawbn}C_\alpha\}C_\beta - \ddot{\beta}m_{ba}A_2 + \qquad (5.96)$$
$$\ddot{\alpha}\{m_{bbl} + m_{sawln} + m_{sn}z_{6n}(z_{6n} + 2E_{1n}) - 2m_{awln}H_{1n}\} + m_{sn}(2\dot{\alpha}\dot{z}_{6n} + \dot{\eta}_n z_{6n} + 2\dot{\eta}_n\dot{z}_{6n})(z_{6n} + E_{1n}) -$$
$$2\dot{\alpha}(m_{sn}z_{6n}\dot{\eta}_n E_{2n} + \dot{\theta}_n m_{awln}H_{2n}) + \ddot{z}_{6n}m_{sn}E_{2n} - \dot{\eta}_n^2 m_{sn}z_{6n}E_{2n} + \ddot{\theta}(m_{aw2ln} - m_{awln}H_{1n}) -$$
$$\dot{\theta}_n^2 m_{awln}H_{2n} + \ddot{\beta}a_{1n}(m_{sawcn}S_{\alpha\gamma n} - m_{sawbn}C_\alpha + m_{sn}z_{6n}S_{\alpha\gamma\eta n} - m_{awln}C_{\alpha\gamma\theta n}) -$$
$$\dot{\beta}^2\{m_b A_2 A_1 + m_{sn}B_1(-z_{6n}S_{\alpha\gamma\eta n} - A_4) + m_{an}B_2(e_1 C_{\alpha\gamma\theta n} - A_6) + m_{wn}B_3(e_3 C_{\alpha\gamma\theta n} - A_6)\} + gm_b A_2 C_\beta -$$
$$g\{m_{sn}z_{6n}S_{\alpha\gamma\eta n} - m_{awln}C_{\alpha\gamma\theta n} + m_{sawcn}S_{\alpha\gamma n} - m_{sawbn}C_\alpha\}C_\beta = \lambda_{3n}(-z_{12n}S_\alpha + e_{3n}C_{\alpha\gamma\theta n} - c_{2n}S_{\alpha\gamma n} + b_{2n}C_\alpha)C_\beta$$

$$\therefore$$

$$\ddot{\alpha} = \frac{\begin{array}{c}\ddot{z}_0\{m_b A_2 + m_{awln}C_{\alpha\gamma\theta n} - z_{6n}m_{sn}S_{\alpha\gamma\eta n} - m_{sawcn}S_{\alpha\gamma n} + m_{sawbn}C_\alpha\}C_\beta \\ m_{sn}(2\dot{\alpha}\dot{z}_{6n} + \dot{\eta}_n z_{6n} + 2\dot{\eta}_n\dot{z}_{6n})(z_{6n} + E_{1n}) - 2\dot{\alpha}(m_{sn}z_{6n}\dot{\eta}_n E_{2n} + \dot{\theta}_n m_{awln}H_{2n}) + \\ \ddot{z}_{6n}m_{sn}E_{2n} - \dot{\eta}_n^2 m_{sn}z_{6n}E_{2n} + \ddot{\theta}(m_{aw2ln} - m_{awln}H_{1n}) - \dot{\theta}_n^2 m_{awln}H_{2n} + \\ \ddot{\beta}a_{1n}(m_{sawcn}S_{\alpha\gamma n} - m_{sawbn}C_\alpha + m_{sn}z_{6n}S_{\alpha\gamma\eta n} - m_{awln}C_{\alpha\gamma\theta n}) - \\ \dot{\beta}^2\{m_b A_2 A_1 + m_{sn}B_1(-z_{6n}S_{\alpha\gamma\eta n} - A_4) + m_{an}B_2(e_1 C_{\alpha\gamma\theta n} - A_6) + \\ m_{wn}B_3(e_3 C_{\alpha\gamma\theta n} - A_6)\} + gm_b A_2 C_\beta - g\{m_{sn}z_{6n}S_{\alpha\gamma\eta n} - m_{awln}C_{\alpha\gamma\theta n} + \\ m_{sawcn}S_{\alpha\gamma n} - m_{sawbn}C_\alpha\}C_\beta - \ddot{\beta}m_{ba}A_2 + \lambda_{3n}(z_{12n}S_\alpha - e_{3n}C_{\alpha\gamma\theta n} + \\ c_{2n}S_{\alpha\gamma n} - b_{2n}C_\alpha)C_\beta\end{array}}{-\{m_{bbl} + m_{sawln} + m_{sn}z_{6n}(z_{6n} + 2E_{1n}) - 2m_{awln}H_{1n}\}} \qquad (5.97)$$

$$\frac{d}{dt}\left(\frac{\partial L}{\partial \dot{\eta}_n}\right) - \frac{\partial L}{\partial \eta_n} = \frac{\partial F}{\partial \dot{\eta}_n} + \sum_{l,n}\lambda_{ln}a_{ln3} \quad l = 1, 2, 3 \; n = i, ii, iii, iv \qquad (5.98)$$

$$m_{sn}\ddot{\eta}_n z_{6n}^2 + 2m_{sn}\dot{\eta}_n\dot{z}_{6n}z_{6n} + \ddot{\alpha}m_{sn}z_{6n}\{z_{6n} + c_{1n}\cos\eta_n - b_{2n}\sin(\gamma_n + \eta_n)\} + \dot{\alpha}m_{sn}\dot{z}_{6n}\{z_{6n} + c_{1n}\cos\eta_n - b_{2n}\sin(\gamma_n + \eta_n)\} + \qquad (5.99)$$
$$\dot{\alpha}m_{sn}z_{6n}\{\dot{z}_{6n} - \dot{\eta}_n[c_{1n}\sin\eta_n + b_{2n}\cos(\gamma_n + \eta_n)]\} + \ddot{\beta}m_{sn}z_{6n}a_{1n}\sin(\alpha + \gamma_n + \eta_n) +$$
$$\dot{\beta}m_{sn}\dot{z}_{6n}a_{1n}\sin(\alpha + \gamma_n + \eta_n) + \dot{\beta}(\dot{\alpha} + \dot{\eta}_n)m_{sn}z_{6n}a_{1n}\cos(\alpha + \gamma_n + \eta_n) - \ddot{z}_0 z_{6n}m_{sn}\sin(\alpha + \gamma_n + \eta_n)\cos\beta -$$
$$\dot{z}_0\dot{z}_{6n}m_{sn}\sin(\alpha + \gamma_n + \eta_n)\cos\beta - (\dot{\alpha} + \dot{\eta}_n)\dot{z}_0 z_{6n}m_{sn}\cos(\alpha + \gamma_n + \eta_n)\cos\beta - \dot{\beta}\dot{z}_0 z_{6n}m_{sn}\sin(\alpha + \gamma_n + \eta_n)\sin\beta -$$
$$\langle\dot{\alpha}^2 m_{sn}z_{6n}\{-c_{1n}\sin\eta_n - b_{2n}\cos(\gamma_n + \eta_n)\} + \dot{\beta}^2 m_{sn}\{z_{6n}\cos(\alpha + \gamma_n + \eta_n) + c_{1n}\cos(\alpha + \gamma_n) + b_{2n}\sin\alpha\}$$
$$\{-z_{6n}\sin(\alpha + \gamma_n + \eta_n)\} + \dot{z}_{6n}\dot{\alpha}m_{sn}\{c_{1n}\cos\eta_n - b_{2n}\sin(\gamma_n + \eta_n)\} + \dot{z}_{6n}\dot{\beta}m_{sn}a_{1n}\sin(\alpha + \gamma_n + \eta_n) -$$
$$\dot{\eta}_n\dot{\alpha}m_{sn}z_{6n}\{c_{1n}\sin\eta_n + b_{2n}\cos(\gamma_n + \eta_n)\} + \dot{\eta}_n\dot{\beta}m_{sn}z_{6n}a_{1n}\cos(\alpha + \gamma_n + \eta_n) + \dot{\alpha}\dot{\beta}a_{1n}m_{sn}z_{6n}\cos(\alpha + \gamma_n + \eta_n) +$$
$$gm_{sn}z_{6n}\sin(\alpha + \gamma_n + \eta_n)\cos\beta - \ddot{z}_0\{z_{6n}m_{sn}\sin(\alpha + \gamma_n + \eta_n) + (\dot{\alpha} + \dot{\eta}_n)\dot{z}_0 z_{6n}m_{sn}\cos(\alpha + \gamma_n + \eta_n)\}\cos\beta +$$
$$\dot{\beta}\dot{z}_0 z_{6n}m_{sn}\sin(\alpha + \gamma_n + \eta_n)\sin\beta\rangle = -\lambda_{1n}(z_{6n} - d_{1n})\cos\eta_n + \lambda_{2n}(z_{6n} - d_{1n})\sin\eta_n$$

$$m_{sn}\ddot{\eta}_n z_{6n}^2 + 2m_{sn}\dot{\eta}_n\dot{z}_{6n}z_{6n} + \ddot{\alpha}m_{sn}z_{6n}\{z_{6n} + E_1\} + \dot{\alpha}m_{sn}\dot{z}_{6n}\{2z_{6n} + E_1\} - \dot{\alpha}m_{sn}z_{6n}\dot{\eta}_n E_2 + \qquad (5.100)$$
$$\ddot{\beta}m_{sn}z_{6n}a_{1n}S_{\alpha\gamma\eta n} + \dot{\beta}m_{sn}\dot{z}_{6n}a_{1n}S_{\alpha\gamma\eta n} + \dot{\beta}(\dot{\alpha} + \dot{\eta}_n)m_{sn}z_{6n}a_{1n}C_{\alpha\gamma\eta n} - \ddot{z}_0 z_{6n}m_{sn}S_{\alpha\gamma\eta n}C_\beta +$$
$$\dot{\alpha}^2 m_{sn}z_{6n}E_2 + \dot{\beta}^2 m_{sn}B_1 z_{6n}S_{\alpha\gamma\eta n} - \dot{z}_{6n}\dot{\alpha}m_{sn}E_1 - \dot{z}_{6n}\dot{\beta}m_{sn}a_{1n}S_{\alpha\gamma\eta n} + \dot{\eta}_n\dot{\alpha}m_{sn}z_{6n}E_2 -$$
$$\dot{\eta}_n\dot{\beta}m_{sn}z_{6n}a_{1n}C_{\alpha\gamma\eta n} - \dot{\alpha}\dot{\beta}a_{1n}m_{sn}z_{6n}C_{\alpha\gamma\eta n} - gm_{sn}z_{6n}S_{\alpha\gamma\eta n}C_\beta = -\lambda_{1n}(z_{6n} - d_{1n})C_{\eta n} + \lambda_{2n}(z_{6n} - d_{1n})S_{\eta n}$$

$$m_{sn}z_{6n}\{\ddot{\eta}_n z_{6n} + 2\dot{\eta}_n\dot{z}_{6n} + \ddot{\alpha}(z_{6n} + E_1) + 2\dot{\alpha}\dot{z}_{6n} + \ddot{\beta}a_{1n}S_{\alpha\gamma\eta n} - \ddot{z}_0 S_{\alpha\gamma\eta n}C_\beta + \dot{\alpha}^2 E_2 + \dot{\beta}^2 B_1 S_{\alpha\gamma\eta n} - gS_{\alpha\gamma\eta n}C_\beta\} = \qquad (5.101)$$
$$-\lambda_{1n}(z_{6n} - d_{1n})C_{\eta n} + \lambda_{2n}(z_{6n} - d_{1n})S_{\eta n}$$

$$\therefore$$

$$\lambda_{1n} = \frac{m_{sn}z_{6n}\{\ddot{\eta}_n z_{6n} + 2\dot{\eta}_n\dot{z}_{6n} + \ddot{\alpha}(z_{6n} + E_1) + 2\dot{\alpha}\dot{z}_{6n} + \ddot{\beta}a_{1n}S_{\alpha\gamma\eta n} - \ddot{z}_0 S_{\alpha\gamma\eta n}C_\beta + \dot{\alpha}^2 E_2 + \dot{\beta}^2 \beta_1 S_{\alpha\gamma\eta n} - gS_{\alpha\gamma\eta n}C_\beta\} - \lambda_{2n}(z_{6n} - d_{1n})S_{\eta n}}{-(z_{6n} - d_{1n})C_{\eta n}} \qquad (5.102)$$

$$\frac{d}{dt}\left(\frac{\partial L}{\partial \dot{\theta}_n}\right) - \frac{\partial L}{\partial \theta_n} = \frac{\partial F}{\partial \dot{\theta}_n} + \sum_{l,n}\lambda_{ln}a_{ln4} \quad l = 1, 2, 3 \; n = i, ii, iii, iv \qquad (5.103)$$

$$\ddot{\theta}_n m_{aw2ln} + \qquad (5.104)$$
$$\ddot{\alpha}[m_{aw2ln} - m_{awln}\{c_{2n}\sin\theta_n - b_{2n}\cos(\gamma_n + \theta_n)\} - \dot{\alpha}\dot{\theta}_n m_{awln}\{c_{2n}\cos\theta_n + b_{2n}\sin(\gamma_n + \theta_n)\} - \ddot{\beta}m_{awln}a_{1n}\cos(\alpha + \gamma_n + \theta_n) +$$
$$\dot{\beta}(\dot{\alpha} + \dot{\theta}_n)m_{awln}a_{1n}\sin(\alpha + \gamma_n + \theta_n) + \ddot{z}_0 m_{awln}\cos(\alpha + \gamma_n + \theta_n)\cos\beta - (\dot{\alpha} + \dot{\theta}_n)\dot{z}_0 m_{awln}\sin(\alpha + \gamma_n + \theta_n)\cos\beta -$$
$$\dot{\beta}\dot{z}_0 m_{awln}\cos(\alpha + \gamma_n + \theta_n)\sin\beta - [-k_{zi}e_{0i}^2\{\sin(\gamma_i + \theta_i) - \sin(\gamma_{ii} + \theta_{ii})\}\cos(\gamma_n + \theta_n)X_s -$$
$$k_{ziii}e_{0iii}^2\{\sin(\gamma_{iii} + \theta_{iii}) - \sin(\gamma_{iv} + \theta_{iv})\}\cos(\gamma_n + \theta_n)X_s - \dot{\alpha}^2 m_{awln}\{c_{2n}\cos\theta_n + b_{2n}\sin(\gamma_n + \theta_n)\} +$$
$$\dot{\beta}^2\langle m_{an}\{e_{1n}\sin(\alpha + \gamma_n + \theta_n) + c_{2n}\cos(\alpha + \gamma_n) + b_{2n}\sin\alpha\}e_{1n}\cos(\alpha + \gamma_n + \theta_n) +$$
$$m_{wn}\{e_{3n}\sin(\alpha + \gamma_n + \theta_n) + c_{2n}\cos(\alpha + \gamma_n) + b_{2n}\sin\alpha\}e_{3n}\cos(\alpha + \gamma_n + \theta_n)\rangle -$$
$$\dot{\theta}\dot{\alpha}m_{awln}\{c_{2n}\cos\theta_n + b_{2n}\sin(\gamma_n + \theta_n)\} + \dot{\theta}\dot{\beta}m_{awln}a_{1n}\sin(\alpha + \gamma_n + \theta_n) + \dot{\alpha}\dot{\beta}a_{1n}m_{awln}\sin(\alpha + \gamma_n + \theta_n) -$$
$$gm_{awln}\cos(\alpha + \gamma_n + \theta_n)\cos\beta - \ddot{z}_0(\dot{\alpha} + \dot{\theta}_n)m_{awln}\sin(\alpha + \gamma_n + \theta_n)\cos\beta - \dot{\beta}\dot{z}_0 m_{awln}\cos(\alpha + \gamma_n + \theta_n)\sin\beta] =$$
$$\lambda_{1n}e_{2n}\sin\theta_n + \lambda_{2n}e_{2n}\cos\theta_n + \lambda_{3n}e_{3n}\cos(\alpha + \gamma_n + \theta_n)\cos\beta$$

-continued $$\ddot{\theta}_n m_{aw2ln} + \ddot{\alpha}(m_{aw2ln} - m_{awln}H_1) - \dot{\alpha}\dot{\theta}_n m_{awln}H_2 - \ddot{\beta}m_{awln}a_{1n}C_{\alpha\gamma\theta n} + \dot{\beta}(\dot{\alpha}+\dot{\theta}_n)m_{awln}a_{1n}S_{\alpha\gamma\theta n} + \ddot{z}_0 m_{awln}C_{\alpha\gamma\theta n}C_\beta - [ \quad (5.105)$$
$$-k_{zi}e_{0i}^2\{\sin(\gamma_i+\theta_i)+\sin(\gamma_{ii}+\theta_{ii})\}X_s - k_{ziii}e_{0iii}^2\{\sin(\gamma_{iii}+\theta_{iii})+\sin(\gamma_{iv}+\theta_{iv})\}\cos(\gamma_n+\theta_n)X_s -$$
$$\dot{\alpha}^2 m_{awln}H_2 + \dot{\beta}^2(m_{an}B_2 e_{1n}C_{\alpha\gamma\theta n} + m_{wn}B_3 e_{3n}C_{\alpha\gamma\theta n}) - \dot{\theta}\dot{\alpha}m_{awln}H_2 + \dot{\theta}\dot{\beta}m_{awln}a_{1n}S_{\alpha\gamma\theta n} +$$
$$\dot{\alpha}\dot{\beta}a_{1n}m_{awln}S_{\alpha\gamma\theta n} - gm_{awln}C_{\alpha\gamma\theta n}C_\beta] = \lambda_{1n}e_{2n}S_{\theta n} + \lambda_{2n}e_{2n}C_{\theta n} + \lambda_{3n}e_{3n}C_{\alpha\gamma\theta n}C_\beta$$

$$\ddot{\theta}_n m_{aw2ln} + \ddot{\alpha}(m_{aw2ln} - m_{awln}H_1) - \ddot{\beta}m_{awln}a_{1n}C_{\alpha\gamma\theta n} + \ddot{z}_0 m_{awln}C_{\alpha\gamma\theta n}C_\beta + \dot{\alpha}^2 m_{awln}H_2 - \quad (5.106)$$
$$\dot{\beta}^2(m_{an}B_2 e_{1n}C_{\alpha\gamma\theta n} + m_{wn}B_3 e_{3n}C_{\alpha\gamma\theta n}) + gm_{awln}C_{\alpha\gamma\theta n}C_\beta + k_{zi}e_{0i}^2\{\sin(\gamma_i+\theta_i)+\sin(\gamma_{ii}+\theta_{ii})\}\cos(\gamma_n+\theta_n) +$$
$$k_{ziii}e_{0iii}^2\{\sin(\gamma_{iii}+\theta_{iii})+\sin(\gamma_{iv}+\theta_{iv})\}\cos(\gamma_n+\theta_n) = \lambda_{1n}e_{2n}S_{\theta n} + \lambda_{2n}e_{2n}C_{\theta n} + \lambda_{3n}e_{3n}C_{\alpha\gamma\theta n}C_\beta$$

$$\therefore$$

$$\ddot{\theta}_n = \frac{\begin{array}{c}\ddot{\alpha}(m_{aw2ln}-m_{awln}H_1) - \ddot{\beta}m_{awln}a_{1n}C_{\alpha\gamma\theta n} + \ddot{z}_0 m_{awln}C_{\alpha\gamma\theta n}C_\beta + \dot{\alpha}^2 m_{awwln}H_2 - \\ \dot{\beta}^2(m_{an}B_2 e_{1n}C_{\alpha\gamma\theta n} + m_{wn}B_3 e_{3n}C_{\alpha\gamma\theta n}) + gm_{awln}C_{\alpha\gamma\theta n}C_\beta - \lambda_{1n}e_{2n}S_{\theta n} - \\ \lambda_{2n}e_{2n}C_{\theta n} - \lambda_{3n}e_{3n}C_{\alpha\gamma\theta n} + C_\beta + k_{zi}e_{0i}^2\{\sin(\gamma_i+\theta_i)+\sin(\gamma_{ii}+\theta_{ii})\} \\ \cos(\gamma_n+\theta_n) + k_{ziii}e_{0iii}^2\{\sin(\gamma_{iii}+\theta_{iii})+\sin(\gamma_{iv}+\theta_{iv})\}\cos(\gamma_n+\theta_n)\end{array}}{-m_{aw2ln}} \quad (5.107)$$

$$\frac{d}{dt}\left(\frac{\partial L}{\partial \dot{z}_{6n}}\right) - \frac{\partial L}{\partial z_{6n}} = \frac{\partial F}{\partial \dot{z}_{6n}} + \sum_{l,n}\lambda_{ln}a_{ln5} \quad l=1,2,3 \; n=i,ii,iii,iv \quad (5.108)$$

$$m_{sn}\ddot{z}_{6n} + \ddot{\alpha}m_{sn}\{c_{1n}\sin\eta_n + b_{2n}\cos(\gamma_n+\eta_n)\} + \quad (5.109)$$
$$\dot{\alpha}\dot{\eta}_n m_{sn}\{c_{1n}\cos\eta_n - b_{2n}\sin(\gamma_n+\eta_n)\} - \ddot{\beta}m_{sn}a_{1n}\cos(\alpha+\gamma_n+\eta_n) + \dot{\beta}(\dot{\alpha}+\dot{\eta}_n)m_{sn}a_{1n}\sin(\alpha+\gamma_n+\eta_n) +$$
$$\ddot{z}_0 m_{sn}\cos(\alpha+\gamma_n+\eta_n)\cos\beta - (\dot{\alpha}+\dot{\eta}_n)\dot{z}_0 m_{sn}\sin(\alpha+\gamma_n+\eta_n)\cos\beta - \dot{\beta}\dot{z}_0 m_{sn}\cos(\alpha+\gamma_n+\eta_n)\sin\beta -$$
$$\left(m_{sn}\dot{\eta}_n^2 z_{6n} + \dot{\alpha}^2 m_{sn}[z_{6n}+\{c_{1n}\cos\eta_n - b_{2n}\sin(\gamma_n+\eta_n)\}]\right) + \dot{\beta}^2 m_{sn}\{z_{6n}\cos(\alpha+\gamma_n+\eta_n)+c_{1n}\cos(\alpha+\gamma_n)+b_{2n}\sin\alpha\}$$
$$\cos(\alpha+\gamma_n+\eta_n) + \dot{\eta}_n\dot{\alpha}m_{sn}\{2z_{6n}+c_{1n}\cos\eta_n - b_{2n}\sin(\gamma_n+\eta_n)\} + \dot{\eta}_n\dot{\beta}m_{sn}a_{1n}\sin(\alpha+\gamma_n+\eta_n) +$$
$$\dot{\alpha}\dot{\beta}a_{1n}m_{sn}\sin(\alpha+\gamma_n+\eta_n) - gm_{sn}\cos(\alpha+\gamma_n+\eta_n)\cos\beta - k_{sn}(z_{6n}-l_{sn}) +$$
$$\dot{z}_0(\dot{\alpha}+\dot{\eta}_n)m_{sn}\sin(\alpha+\gamma_n+\eta_n)\cos\beta - \dot{\beta}\dot{z}_0 m_{sn}\cos(\alpha+\gamma_n+\eta_n\sin\beta) = -c_{sn}\dot{z}_{6n} - \lambda_{1n}\sin\eta_n - \lambda_{2n}\cos\eta_n$$

$$m_{sn}\{\ddot{z}_{6n} + \ddot{\alpha}E_2 - \ddot{\beta}a_{1n}C_{\alpha\gamma\eta n} - \dot{\eta}_n^2 z_{6n} - \dot{\alpha}^2(z_{6n}+E_1) - \dot{\beta}^2 B_1 C_{\alpha\gamma\eta n} - 2\dot{\eta}_n\dot{\alpha}z_{6n} + gC_{\alpha\gamma\eta n}C_\beta\} + k_{sn}(z_{6n}-l_{sn}) = \quad (5.110)$$
$$-c_{sn}\dot{z}_{6n} - \lambda_{1n}S_{\eta n} - \lambda_{2n}C_{\eta n}$$

$$\therefore$$

$$\lambda_{2n} = \frac{m_{sn}\{\ddot{z}_{6n} + \ddot{\alpha}E_2 - \ddot{\beta}a_{1n}C_{\alpha\gamma\eta n} - \dot{\eta}_n^2 z_{6n} - \dot{\alpha}^2(z_{6n}+E_1) - \dot{\beta}^2 B_1 C_{\alpha\gamma\eta 2} - 2\dot{\eta}_n\dot{\alpha}z_{6n} + gC_{\alpha\gamma\eta n}C_\beta\} + k_{sn}(z_{6n}-l_{sn}) + c_{sn}\dot{z}_{6n} + \lambda_{1n}S_{\eta n}}{-C_{\eta n}} \quad (5.111)$$

$$\frac{d}{dt}\left(\frac{\partial L}{\partial \dot{z}_{12n}}\right) - \frac{\partial L}{\partial z_{12n}} = \frac{\partial F}{\partial \dot{z}_{12n}} + \sum_{l,n}\lambda_{ln}a_{ln6} \quad l=1,2,3 \; n=i,ii,iii,iv$$

$$k_{wn}(z_{12n}-l_{wn}) = -c_{wn}\dot{z}_{12n} + \lambda_{3n}\cos\alpha\cos\beta \quad (5.112)$$
$$= -c_{wn}\dot{z}_{12n} + \lambda_{3n}C_\alpha C_\beta$$

$$\therefore$$

$$\lambda_{3n} = \frac{c_{wn}\dot{z}_{12n} + k_{wn}(z_{12n}-l_{wn})}{C_\alpha} \quad (5.113)$$

From the differentiated constraints it follows that:

$\dot{\theta}_n e_{2n}S_{\theta n}+\ddot{\theta}$ $_n^2 e_{2n}C_{\theta n}-\ddot{z}$ $_{6n}S_{\eta n}-\dot{z}_{6n}\dot{\eta}$ $_n C_{\eta n}-\eta_n$ $(z_{6n}-d_{1n})C_{\eta n}$ $-\dot{\eta}_n \dot{z}_{6n}C_{\eta n}$ $+\dot{\eta}_n^2$ $(z_{6n}-d_{1n})S_{\eta n}=0$ $\dot{\theta}_n e_{2n}C_{\theta n}$ $-\dot{\theta}_n^2 e_{2n}S_{\theta n}$ $-\ddot{z}_{6n}C_{\eta n}-\dot{z}_{6n}$ $\dot{\eta}_n S_{\eta n}$ $-\eta_n(z_{6n}-d_{1n})$ $S_{\eta n}-\dot{\eta}_n\dot{z}$ $_{6n}S_{\eta n}+\dot{\eta}_n^2$ $(z_{6n}-d_{1n})C_{\eta n}=0$

∴

$$\ddot{\eta}_n = \frac{\dot{\theta}_n e_{2n} S_{\theta n} + \dot{\theta}_n^2 e_{2n} C_{\theta n} - \ddot{z}_{6n} S_{\eta n} - 2\dot{\eta}_n \dot{z}_{6n} C_{\eta n} + \dot{\eta}_n^2 (z_{6n} - d_{1n}) S_{\eta n}}{(z_{6n} - d_{1n}) C_{\eta n}} \quad (5.115)$$

and $$\ddot{z}_{6n} = \frac{\dot{\theta}_n e_{2n} C_{\theta n} - \dot{\theta}_n^2 e_{2n} S_{\theta n} + \ddot{\eta}_n (z_{6n} - d_{1n}) S_{\eta n} + 2\dot{\eta}_n \dot{z}_{6n} S_{\eta n} + \dot{\eta}_n^2 (z_{6n} - d_{1n}) C_{\eta n}}{C_{\eta n}} \quad (5.116)$$

$$\ddot{z}_{12n} = \frac{\{\ddot{\alpha} z_{12n} S_\alpha - (\dot{\alpha} + \dot{\theta}_n)e_{3n} C_{\alpha\gamma\theta n} + \dot{\alpha} c_{2n} S_{\alpha\gamma n} - \dot{\alpha} b_{2n} C_\alpha\} C_\beta - \ddot{z}_0 + \dot{\beta}[\{z_{12n} C_\alpha + e_{3n} S_{\alpha\gamma\theta n} + c_{2n} C_{\alpha\gamma n} + b_{2n} S_\alpha\} S_\beta + a_{1n} C_\beta] + \dot{R}_n(t)}{C_\alpha C_\beta} \quad (5.117)$$

Supplemental differentiation of equation (5.113) for the later entropy production calculation yields:

$$k_{wn}\dot{z}_{12n} = -c_{wn}\ddot{z}_{12n} + \ddot{\lambda}_{3n}C_\alpha C_\beta - \dot{\alpha}\lambda_{3n}S_\alpha C_\beta - \dot{\beta}\lambda_{3n}C_\alpha S_{62} \quad (5.118)$$

therefore $$\ddot{z}_{12n} = \frac{\ddot{\lambda}_{3n}C_\alpha C_\beta - \dot{\alpha}\lambda_{3n}S_\alpha C_\beta - \dot{\beta}\lambda_{3n}C_\alpha S_\beta - k_{wn}\dot{z}_{12n}}{c_{wn}} \quad (5.119)$$

or from the third equation of constraint:

$$\ddot{z}_0 + \{\ddot{z}_{12n}\cos\alpha - \dot{z}_{12n}\dot{\alpha}\cos\alpha - \ddot{\alpha}z_{12n}\sin\alpha - \dot{\alpha}\dot{z}_{12n}\sin\alpha - \dot{\alpha}^2 z_{12n}\cos\alpha + (\ddot{\alpha} + \dot{\theta}_n)e_{3n}\cos(\alpha + \gamma_n + \theta_n) - (\dot{\alpha} + \dot{\theta}_n)^2 e_{3n}\sin(\alpha + \gamma_n + \theta_n) - \ddot{\alpha}c_{2n}\sin(\alpha + \gamma_n) - \dot{\alpha}^2 c_{2n}\cos(\alpha + \gamma_n) + \ddot{\alpha}b_{2n}\cos\alpha - \dot{\alpha}^2 b_{2n}\sin\alpha\}\cos\beta - \dot{\beta}\{\dot{z}_{12n}\cos\alpha - \dot{\alpha}z_{12n}\sin\alpha + (\dot{\alpha} + \dot{\theta}_n)e_{3n}\cos(\alpha + \gamma_n + \theta_n) - \dot{\alpha}c_{2n}\sin(\alpha + \gamma_n) + \dot{\alpha}b_{2n}\cos\alpha\}\sin\beta - \dot{\beta}[\{z_{12n}\cos\alpha + e_{3n}\sin(\alpha + \gamma_n + \theta_n) + c_{2n}\cos(\alpha + \gamma_n) + b_{2n}\sin\alpha\}\sin\beta + a_{1n}\cos\beta] - \dot{\beta}[\{\dot{z}_{12n}\cos\alpha - \dot{\alpha}z_{12n}\sin\alpha + (\dot{\alpha} + \dot{\theta}_n)e_{3n}\cos(\alpha + \gamma_n + \theta_n) - (\dot{\alpha} + \dot{\gamma}_n)c_{2n}\sin(\alpha + \gamma_n) + \dot{\alpha}b_{2n}\cos\alpha\}\sin\beta + \dot{\beta}\{z_{12n}\cos\alpha + e_{3n}\sin(\alpha + \gamma_n + \theta_n) + c_{2n}\cos(\alpha + \gamma_n) + b_{2n}\sin\alpha\}\cos\beta - \dot{\beta}a_{1n}\sin\beta] - \ddot{R}_n(t) = 0 \quad (5.120)$$

$$\ddot{z}_{12n} = \frac{\ddot{z}_0 + \{-\dot{z}_{12n}\dot{\alpha}\cos\alpha - \ddot{\alpha}z_{12n}\sin\alpha - \dot{\alpha}\dot{z}_{12n}\sin\alpha - \dot{\alpha}^2 z_{12n}\cos\alpha + (\ddot{\alpha} + \dot{\theta}_n)e_{3n}\cos(\alpha + \gamma_n + \theta_n) - (\dot{\alpha} + \dot{\theta}_n)^2 e_{3n}\sin(\alpha + \gamma_n + \theta_n) - \ddot{\alpha}c_{2n}\sin(\alpha + \gamma_n) - \dot{\alpha}^2 c_{2n}\cos(\alpha + \gamma_n) + \ddot{\alpha}b_{2n}\cos\alpha - \dot{\alpha}^2 b_{2n}\sin\alpha\}\cos\beta - \dot{\beta}\{z_{12n}\cos\alpha - \dot{\alpha}z_{12n}\sin\alpha + (\dot{\alpha} + \dot{\theta}_n)e_{3n}\cos(\alpha + \gamma_n + \theta_n) - \dot{\alpha}c_{2n}\sin(\alpha + \gamma_n) + \dot{\alpha}b_{2n}\cos\alpha\}\sin\beta - \dot{\beta}[\{z_{12n}\cos\alpha + e_{3n}\sin(\alpha + \gamma_n + \theta_n) + c_{2n}\cos(\alpha + \gamma_n) + b_{2n}\sin\alpha\}\sin\beta + a_{1n}\cos\beta] - \dot{\beta}[\{\dot{z}_{12n}\cos\alpha - \dot{\alpha}z_{12n}\sin\alpha + (\ddot{\alpha} + \dot{\theta}_n)e_{3n}\cos(\alpha + \gamma_n + \theta_n) - (\dot{\alpha} + \dot{\gamma}_n)c_{2n}\sin(\alpha + \gamma_n) + \dot{\alpha}b_{2n}\cos\alpha\}\sin\beta + \dot{\beta}\{z_{12n}\cos\alpha + e_{3n}\sin(\alpha + \gamma_n + \theta_n) + c_{2n}\cos(\alpha + \gamma_n) + b_{2n}\sin\alpha\}\cos\beta - \dot{\beta}a_{1n}\sin\beta] - \ddot{R}_n(t)}{-\cos\alpha\cos\beta} \quad (5.121)$$

Equations for entropy production are developed below. Minimum entropy production (for use in the fitness function of the genetic algorithm) is expressed as:

$$-2\dot{\beta}^2 [\dot{\alpha} m_b A_1 A_2 + m_{sn} B_1 \{\dot{z}_{6n} C_{\alpha\gamma\eta n} - (\dot{\alpha} + \dot{\eta}_n) z_{6n} S_{\alpha\gamma\eta n} - \dot{\alpha} A_4\} + m_{an} B_2 \{(\dot{\alpha} + \dot{\theta}_n) e_{1n} C_{\alpha\gamma\theta n} - \dot{\alpha} A_6\} + m_{wn} B_3 \{(\dot{\alpha} + \quad (5.122)$$

$$\frac{d_\beta S}{dt} = \frac{\dot{\theta}_n)e_{3n}S_{\alpha\gamma\theta n} - \dot{\alpha}A_6\} - \dot{z}_0(m_{ba} + m_{sawan})S_\beta/2]}{m_{saw2n} + m_{bal} + m_b A_1^2 + m_{sn}B_1^2 + m_{an}B_2^2 + m_{wn}B_3^2}$$

$$\frac{d_\alpha S}{dt} = \frac{-2\dot{\alpha}^2 \{m_{sn}\dot{\alpha}\dot{z}_{6n}(z_{6n} + E_{1n}) + m_{sn}z_{6n}\dot{\eta}_n E_{2n} + \dot{\theta}_n m_{awln} H_{2n}\}}{m_{bbl} + m_{sawln} + m_{sn}z_{6n}(z_{6n} + 2E_{1n}) - 2m_{awln}H_{1n}} \quad (5.123)$$

$$\frac{d_{\eta_n}S}{dt} = \dot{\eta}_n^3 tg\eta_n - \frac{2\dot{\eta}_n^2 \dot{z}_{6n}}{z_{6n} - d_{1n}} \quad (5.124)$$

$$\frac{d_{z_{6n}}S}{dt} = 2\dot{\eta}_n \dot{z}_{6n}^2 tg\eta_n \quad (5.125)$$

$$\frac{d_{z_{12n}}S}{dt} = \dot{z}_{12n}^2(\dot{\alpha} + \dot{\alpha}tg\alpha + 2\dot{\beta}tg\beta) \quad (5.126)$$

Figure 8A:
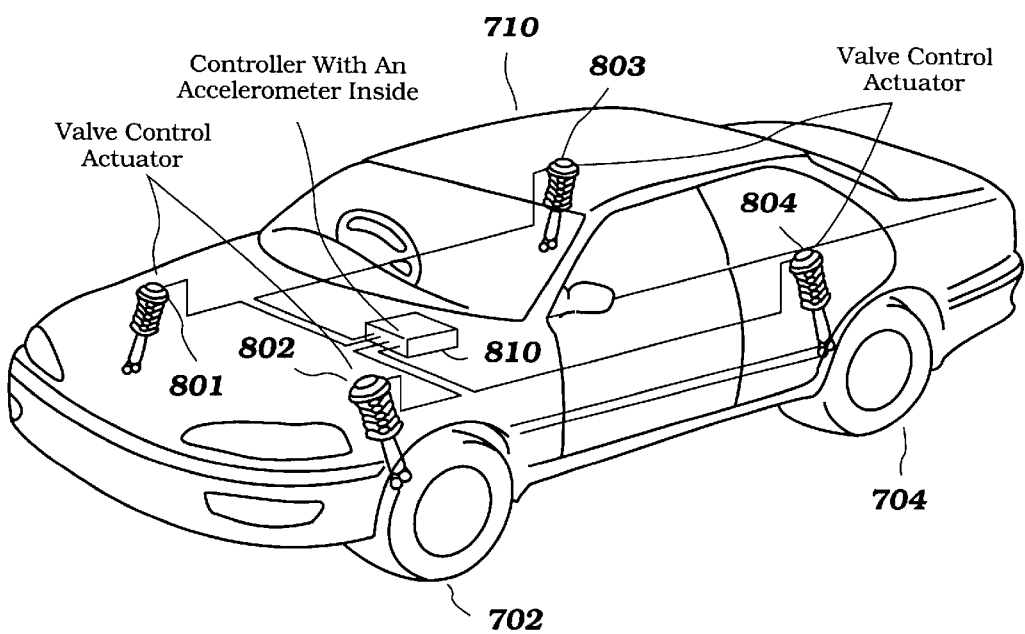
FIG. 8A shows a control damper layout for a suspension-controlled vehicle having adjustable dampers.

FIG. 8A shows the vehicle body 710 and the wheels 702 and 704 (the wheels 701 and 703 are hidden). FIG. 8A also shows dampers 801–804 configured to provide adjustable damping for the wheels 701–704 respectively. In one embodiment, the dampers 801–804 are electronically-controlled dampers. In one embodiment, a stepping motor actuator on each damper controls an oil valve. Oil flow in each rotary valve position determines the damping factor provided by the damper.

Figure 8B:
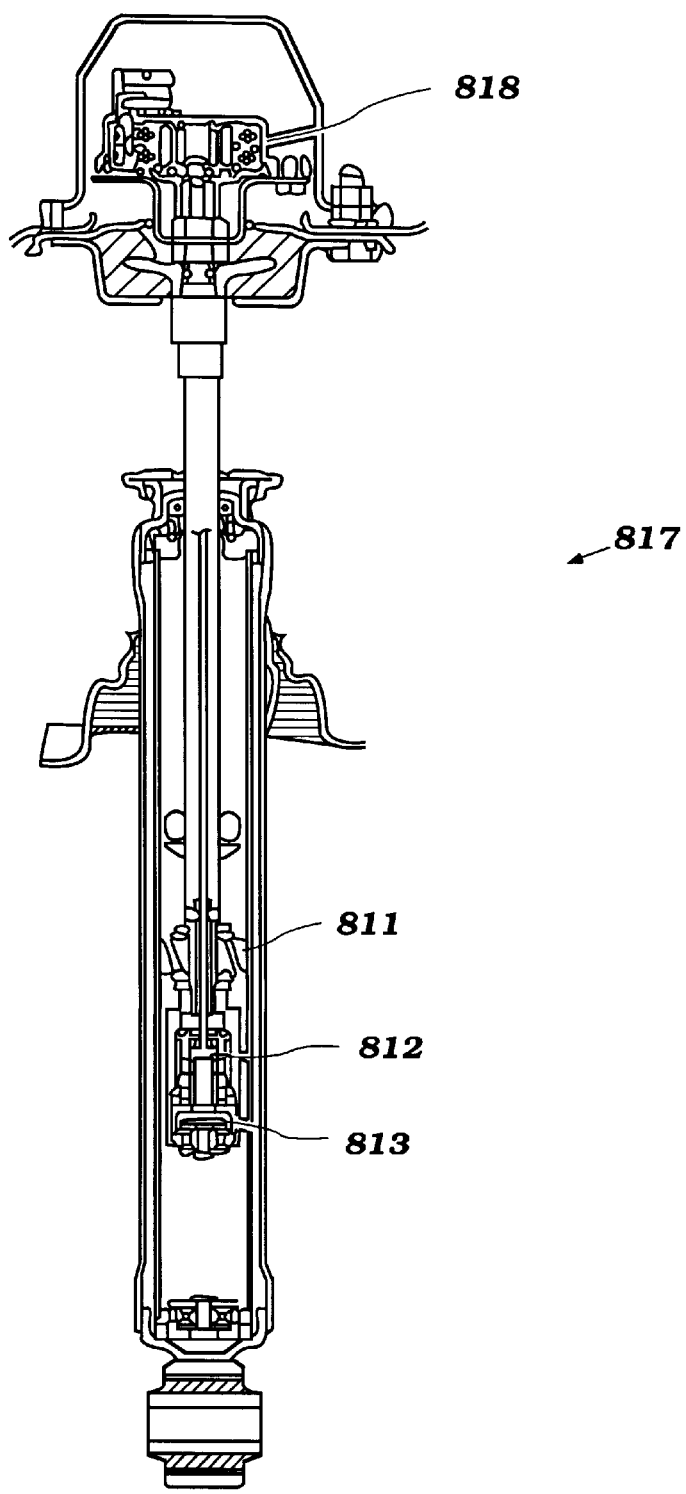
FIG. 8B shows an adjustable damper for the suspension-controlled vehicle.

FIG. 8B shows an adjustable damper 817 having an actuator 818 that controls a rotary valve 812. A hard-damping valve 811 allows fluid to in the adjustable damper 817 to produce hard damping. A soft-damping valve 813 allows fluid to flow in the adjustable damper 817 to produce soft damping. The rotary valve 812 controls the amount of fluid that flows through the soft-damping valve 813. The actuator 818 controls the rotary valve 812 to allow more or less fluid to flow through the soft-damping valve 813, thereby producing a desired damping. In one embodiment, the actuator 818 is a stepping motor. The actuator 818 receives control signals from the controller 810.

Figure 8C:
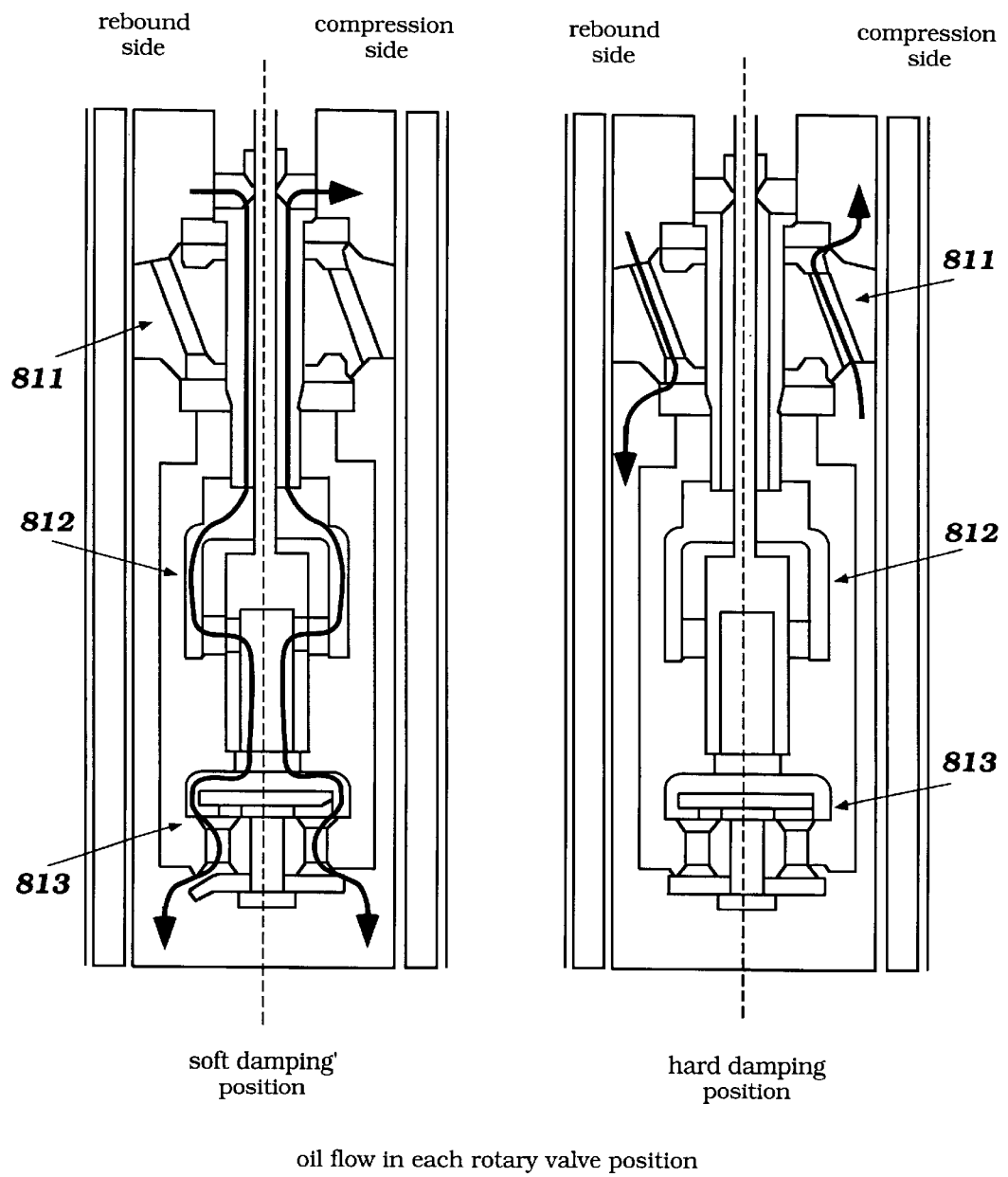
FIG. 8C shows fluid flow for soft and hard damping in the adjustable damper from FIG. 8B.

FIG. 8C shows fluid flow through the soft-damping valve 813 when the rotary valve 812 is opened. FIG. 8C also shows fluid flow through the hard-damping valve 810 when then rotary valve 812 is closed.

Figure 9:
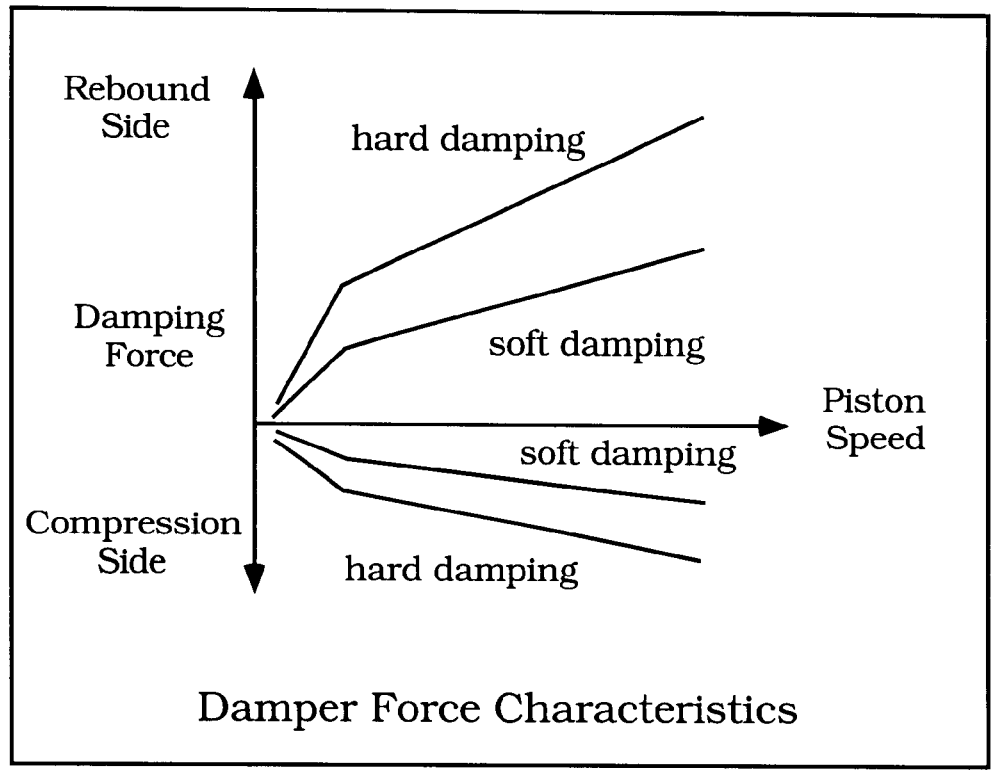
FIG. 9 shows damper force characteristics for the adjustable dampers illustrated in FIG. 8.

FIG. 9 shows damper force characteristics as damper force versus piston speed characteristics when the rotary valve is placed in a hard damping position and in a soft damping position. The valve is controlled by the stepping motor to be placed between the soft and the hard damping positions to generate intermediate damping force.

Figure 10:
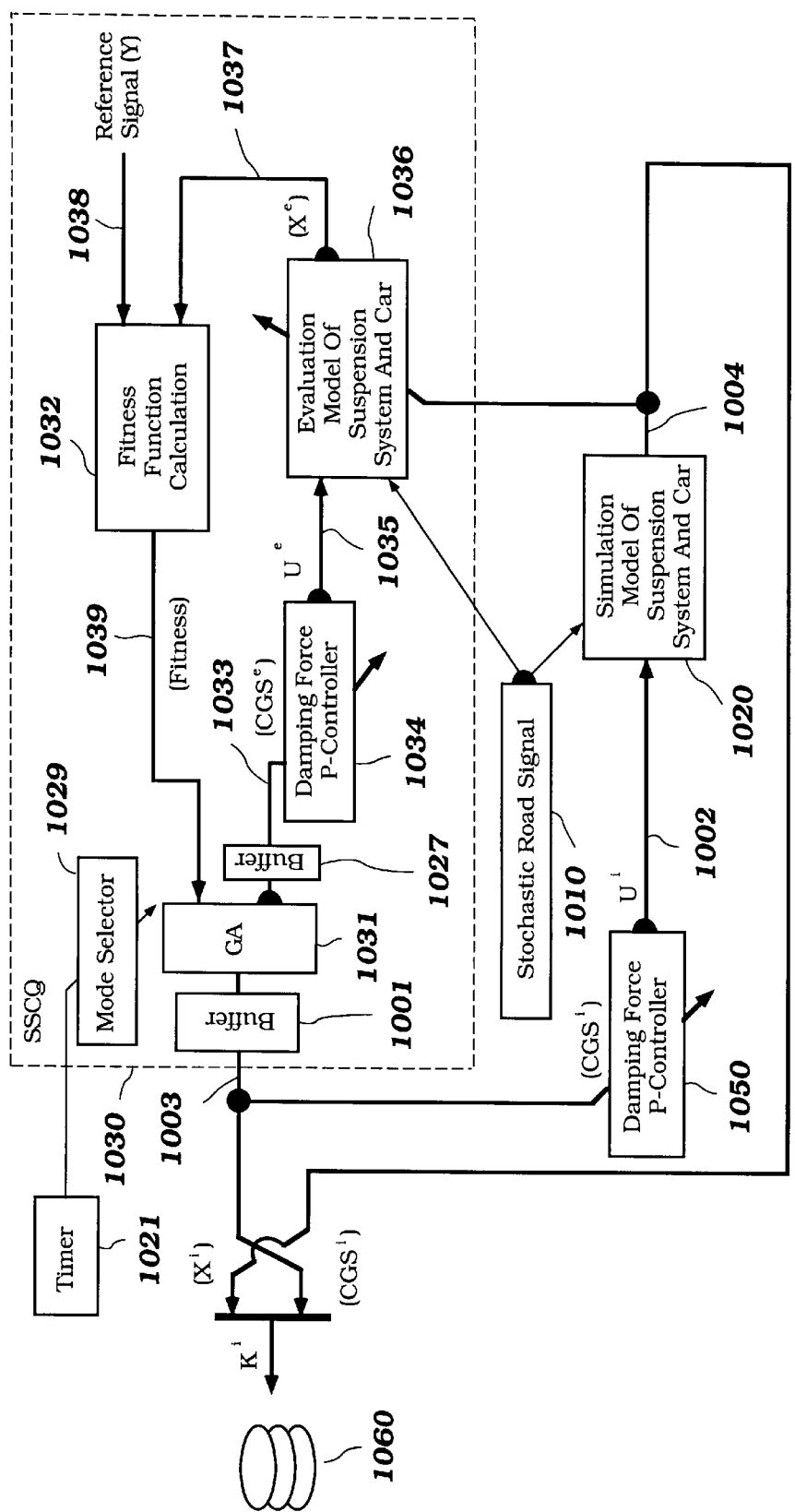
FIG. 10 shows the structure of an SSCQ for use in connection with a simulation model of the full car and suspension system.

The SSCQ 130, shown in FIG. 2, is an off-line block that produces the teaching signal $K_t$ for the FLCS 140. FIG. 10 shows the structure of an SSCQ 1030 for use in connection with a simulation model of the full car and suspension system. The SSCQ 1030 is one embodiment of the SSCQ 130. In addition to the SSCQ 1030, FIG. 10 also shows a stochastic road signal generator 1010, a suspension system simulation model 1020, a proportional damping force controller 1050, and a timer 1021. The SSCQ 1030 includes a mode selector 1029, an output buffer 1001, a GA 1031, a buffer 1022, a proportional damping force controller 1034, a fitness function calculator 1032, and an evaluation model 1036.

The Timer 1021 controls the activation moments of the SSCQ 1030. An output of the timer 1021 is provided to an input of the mode selector 1029. The mode selector 1029 controls operational modes of the SSCQ 1030. In the SSCQ 1030, a reference signal y is provided to a first input of the fitness function calculator 1032. An output of the fitness function calculator 1032 is provided to an input of the GA 1031. A $CGS^e$ output of the GA 1031 is provided to a training input of the damping force controller 1034 through the buffer 1022. An output of the damping force controller 1034 is provided to an input of the evaluation model 1036. An $X^e$ output of the evaluation model 1036 is provided to a second input of the fitness function calculator 1032. A $CGS^i$ output of the GA 1031 is provided (through the buffer 1001) to a training input of the damping force controller 1050. A control output from the damping force controller 1050 is provided to a control input of the suspension system simulation model 1020. The stochastic road signal generator 1010 provides a stochastic road signal to a disturbance input of the suspension system simulation model 1020 and to a disturbance input of the evaluation model 1036. A response output $X^i$ from the suspension system simulation model 1020 is provided to a training input of the evaluation model 1036. The output vector $K^i$ from the SSCQ 1030 is obtained by combining the $CGS^i$ output from the GA 1031 (through the buffer 1001) and the response signal $X^i$ from the suspension system simulation model 1020.

Road signal generator 1010 generates a road profile. The road profile can be generated from stochastic simulations as described above in connection with FIGS. 4–6F, or the road profile can be generated from measured road data. The road signal generator 1010 generates a road signal for each time instant (e.g., each clock cycle) generated by the timer 1021.

The simulation model 1020 is a kinetic model of the full car and suspension system with equations of motion, as obtained, for example, in connection with FIG. 7. In one embodiment, the simulation model 1020 is integrated using high-precision order differential equation solvers.

The SSCQ 1030 is an optimization module that operates on a discrete time basis. In one embodiment, the sampling time of the SSCQ 1030 is the same as the sampling time of the control system 1050. Entropy production rate is calculated by the evaluation model 1036, and the entropy values are included into the output ($X^e$) of the evaluation model 1036.

The following designations regarding time moments are used herein:

T=Moments of SSCQ calls $T_c$=the sampling time of the control system 1050

$T_e$=the evaluation (observation) time of the SSCQ 1030

Figure 11:
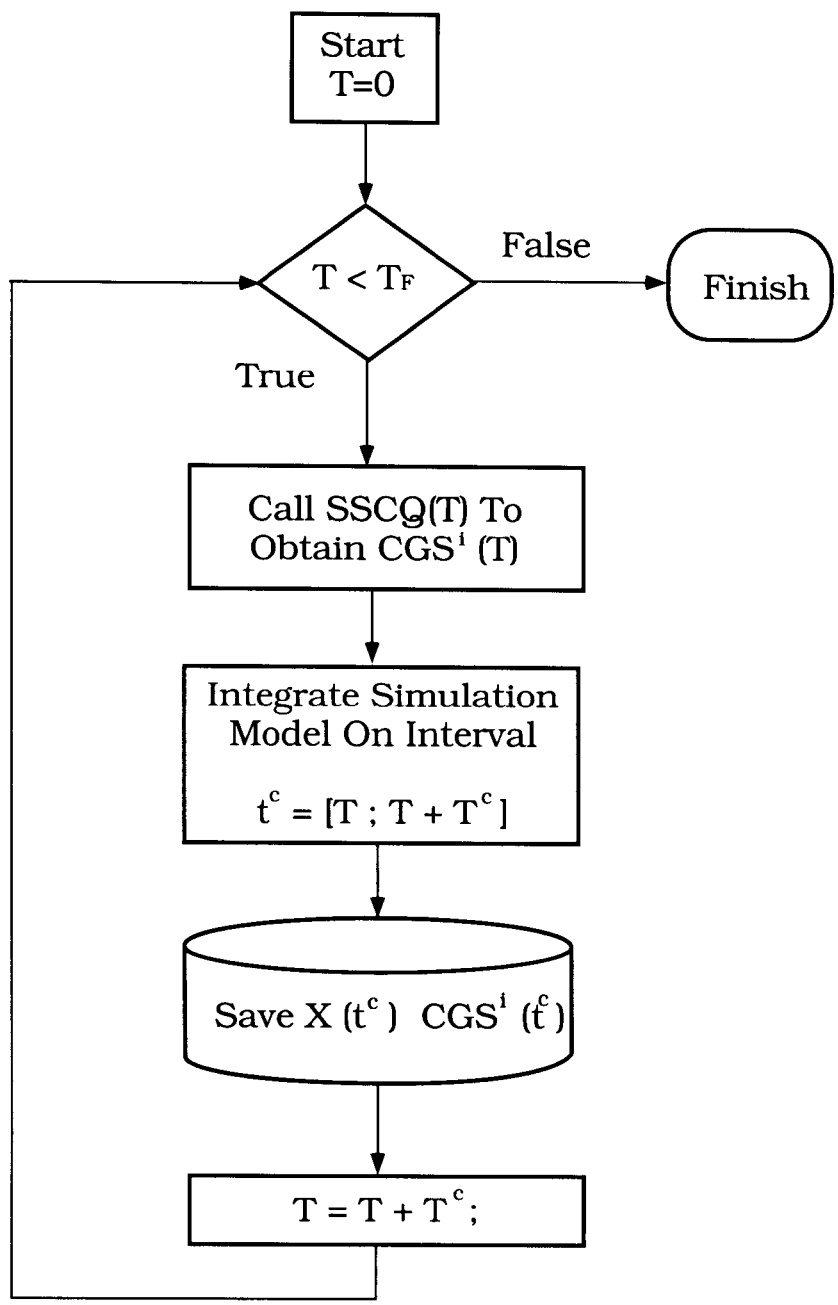
FIG. 11 is a flowchart showing operation of the SSCQ.

$t_c$=the integration interval of the simulation model 1004 with fixed control parameters, $t_c \in [T; T+T_c]$ $t_e$=Evaluation (Observation) time interval of the SSCQ, $te \in [T; T+Te]$ FIG. 11 is a flowchart showing operation of the SSCQ 1030 as follows:

1. At the initial moment (T=0) the SSCQ 1030 is activated and the SSCQ 1030 generates the initial control signal $CGS^i(T)$.
2. The simulation model 1020 is integrated using the road signal from the stochastic road generator 1010 and the control signal $CGS^i(T)$ on a first time interval $t_c$ to generate the output $X^i$.
3. The output $X^i$ and with the output $CGS^i(T)$ are is saved into the data file 1060 as a teaching signal $K^i$.
4. The time interval T is incremented by $T_c(T=T+T_c)$.
5. The sequence 1–4 is repeated a desired number of times (that is while $T<T_F$). In one embodiment, the sequence 1–4 is repeated until the end of road signal is reached Regarding step 1 above, the SSCQ block has two operating modes:

1. Updating of the buffer 1001 using the GA 1031
2. Extraction of the output $CGS^i(T)$ from the buffer 1001.

Figure 12:
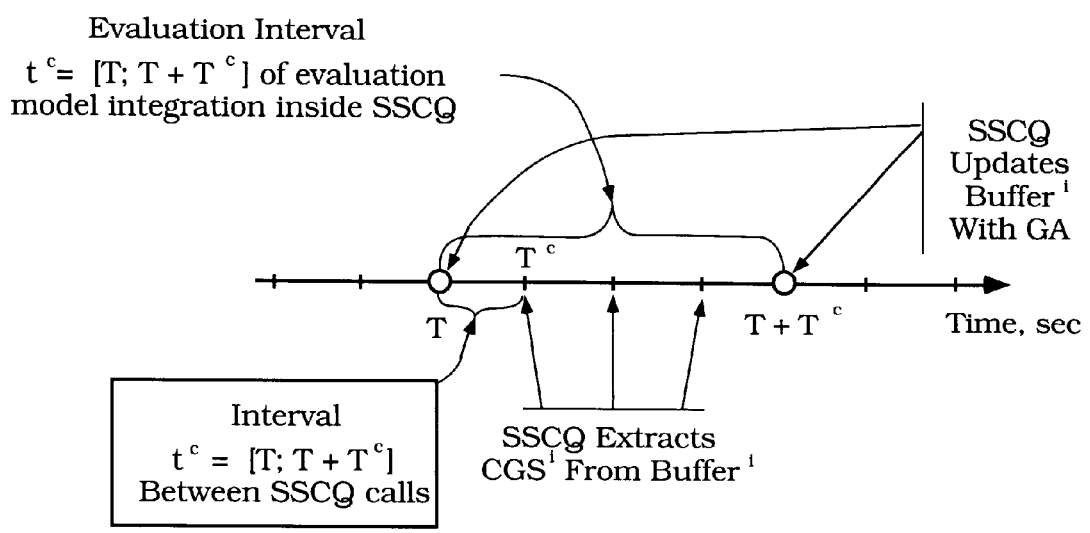
FIG. 12 shows time intervals associated with the operating mode of the SSCQ.

The operating mode of the SSCQ 1030 is controlled by the mode selector 1029 using information regarding the current time moment T, as shown in FIG. 12. At intervals of $T_e$ the SSCQ 1030 updates the output buffer 1001 with results from the GA 1031. During the interval $T_e$ at each interval $T_c$, the SSCQ extracts the vector $CGS^i$ from the output buffer 1001.

Figure 13:
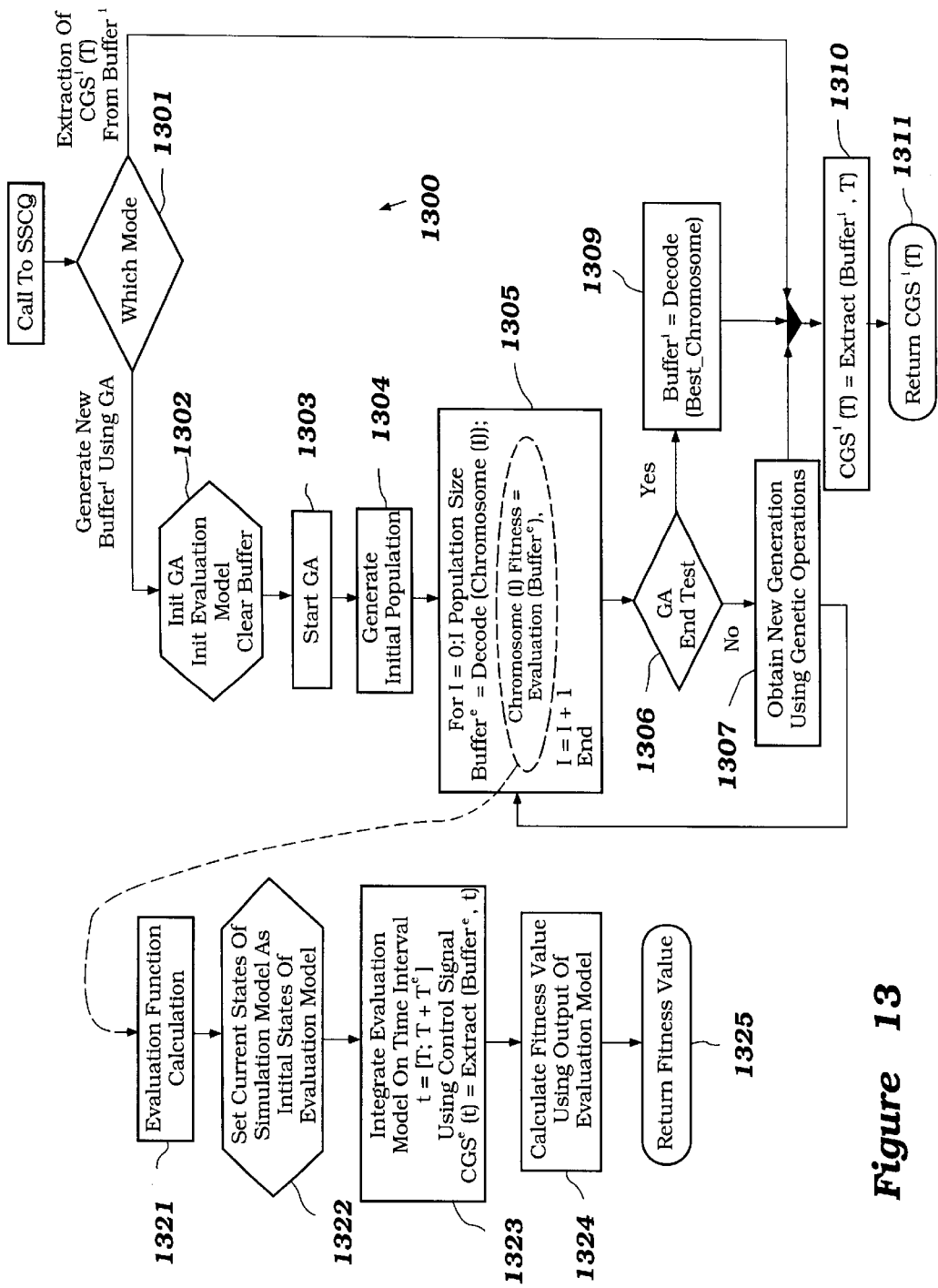
FIG. 13 is a flowchart showing operation of the SSCQ in connection with the GA.

FIG. 13 is a flowchart 1300 showing operation of the SSCQ 1030 in connection with the GA 1031 to compute the control signal $CGS^i$. The flowchart 1300 begins at a decision block 1301, where the operating mode of the SSCQ 1030 is determined. If the operating mode is a GA mode, then the process advances to a step 1302; otherwise, the process advances to a step 1310. In the step 1302, the GA 1031 is initialized, the evaluation model 1036 is initialized, the output buffer 1001 is cleared, and the process advances to a step 1303. In the step 1303, the GA 1031 is started, and the process advances to a step 1304 where an initial population of chromosomes is generated. The process then advances to a step 1305 where a fitness value is assigned to each chromosome. The process of assigning a fitness value to each chromosome is shown in an evaluation function calculation, shown as a sub-flowchart having steps 1322–1325. In the step 1322, the current states of $X^i(T)$ are initialized as initial states of the evaluation model 1036, and the current chromosome is decoded and stored in the evaluation buffer 1022. The sub-process then advances to the step 1323. The step 1323 is provided to integrate the evaluation model 1036 on time interval $t_e$ using the road signal from the road generator 1010 and the control signal $CGS^e(t_e)$ from the evaluation buffer 1022. The process then advances to the step 1324 where a fitness value is calculated by the fitness function calculator 1032 by using the output $X^e$ from the evaluation model 1036. The output $X^e$ is a response from the evaluation model 1036 to the control signals $CGS^e(t_e)$ which are coded into the current chromosome. The process then advances to the step 1325 where the fitness value is returned to the step 1305. After the step 1305, the process advances to a decision block 1306 to test for termination of the GA. If the GA is not to be terminated, then the process advances to a step 1307 where a new generation of chromosomes is generated, and the process then returns to the step 1305 to evaluate the new generation. If the GA is to be terminated, then the process advances to the step 1309, where the best chromosome of the final generation of the GA, is decoded and stored in the output buffer 1001. After storing the decoded chromosome, the process advances to the step 1310 where the current control value $CGS^i(T)$ is extracted from the output buffer 1001.

The structure of the output buffer 1001 is shown below as a set of row vectors, where first element of each row is a time value, and the other elements of each row are the control parameters associated with these time values. The values for each row include a damper valve position $VP_{FL}$, $VP_{FR}$, $VP_{RL}$, $VP_{RR}$, corresponding to front-left, front-right, rear-left, and rear-right respectively.

| Time* | | CGS$^i$ | | |
|---|---|---|---|---|
| T | $VP_{FL}(T)$** | $VP_{FR}(T)$ | $VP_{RL}(T)$ | $VP_{RR}(T)$ |
| $T + T^c$ | $VP_{FL}(T + T^c)$ | $VP_{FR}(T + T^c)$ | $VP_{RL}(T + T^c)$ | $VP_{RR}(T + T^c)$ |
| ... | ... | ... | ... | ... |
| $T + T^e$ | $VP_{FL}(T + T^e)$ | $VP_{FR}(T + T^e)$ | $VP_{RL}(T + T^e)$ | $VP_{RR}(T + T^e)$ |

The output buffer 1001 stores optimal control values for evaluation time interval $t_e$ from the control simulation model, and the evaluation buffer 1022 stores temporal control values for evaluation on the interval $t_e$ for calculation of the fitness function.

Two simulation models are used. The simulation model 1020 is used for simulation and the evaluation model 1036 is used for evaluation. There are many different methods for numerical integration of systems of differential equations. Practically, these methods can be classified into two main classes: (1) variable-step integration methods with control of integration error; and (2) fixed-step integration methods without integration error control.

Numerical integration using methods of type (1) is very precise, but time-consuming. Methods of type (2) are typically faster, but with smaller precision. During each SSCQ call in the GA mode, the GA 1031 evaluates the fitness function 1032 many times and each fitness function calculation requires integration of the model of dynamic system (the integration is done each time). By choosing a small-enough integration step size, it is possible to adjust a fixed-step solver such that the integration error on a relatively small time interval (like the evaluation interval $t_e$) will be small and it is possible to use the fixed-step integration in the evaluation loop for integration of the evaluation model 1036. In order to reduce total integration error it is possible to use the result of high-order variable-step integration of the simulation model 1020 as initial conditions for evaluation model integration. The use of variable-step solvers to integrate the evaluation model can provide better numerical precision, but at the expense of greater computational overhead and thus longer run times, especially for complicated models.

The fitness function calculation block 1032 computes a fitness function using the reference signal Y and the response ($X^e$) from the evaluation model 1036 (due to the control signal $CGS^e(t_e)$ provided to the evaluation module 1036).

The fitness function 1032 is computed as a vector of selected components of a matrix ($x^e$) and its squared absolute value using the following form:

$$Fitness^2 = \sum_{t \in [T;T^e]} \left[ \sum_i w_i(x_{it}^e)^2 + \sum_j w_j(y_j - x_{jt}^e)^2 + \sum_k w_k f(x_{kt}^e)^2 \right] \to \min, \qquad (6.1)$$

where:
i denotes indexes of state variables which should be minimized by their absolute value; j denotes indexes of state variables whose control error should be minimized; k denotes indexes of state variables whose frequency components should be minimized; and $w_r$, r=i,j,k are weighting factors which represent the importance of the corresponding parameter from the human feelings point of view. By setting these weighting function parameters, it is possible to emphasize those elements from the output of the evaluation model that are correlated with the desired human requirements (e.g., handling, ride quality, etc.). In one embodiment, the weighting factors are initialized using empirical values and then the weighting factors are adjusted using experimental results.

Extraction of frequency components can be done using standard digital filtering design techniques for obtaining the filter parameters. Digital filtering can be provided by a standard difference equation applied to elements of the matrix $X^e$:

$$a(1)f(x_k^e(t^e(N))) = b(1)x_k^e(t^e(N)) + b(2)x_k^e(t^e(N-1)) + \ldots + \qquad (6.2)$$
$$b(n_b + 1)x_k^e(t^e(N - n_b)) -$$
$$-a(2)x_k^e(t^e(N-1)) - \ldots - a(n_a + 1)x_k^e(t^e(N - n_a))$$

where a,b are parameters of the filter, N is the number of the current point, and $n_b$, $n_a$ describe the order of the filter. In case of a Butterworth filter, $n_b = n_a$.

In one embodiment, the GA 1031 is a global search algorithms based on the mechanics of natural genetics and natural selection. In the genetic search, each a design variable is represented by a finite length binary string and then these finite binary strings are connected in a head-to-tail manner to form a single binary string. Possible solutions are coded or represented by a population of binary strings. Genetic transformations analogous to biological reproduction and evolution are subsequently used to improve and vary the coded solutions. Usually, three principle operators, i.e., reproduction (selection), crossover, and mutation are used in the genetic search.

The reproduction process biases the search toward producing more fit members in the population and eliminating the less fit ones. Hence, a fitness value is first assigned to each string (chromosome) the population. One simple approach to select members from an initial population to participate in the reproduction is to assign each member a probability of selection on the basis of its fitness value. A new population pool of the same size as the original is then created with a higher average fitness value.

The process of reproduction simply results in more copies of the dominant or fit designs to be present in the population. The crossover process allows for an exchange of design characteristics among members of the population pool with the intent of improving the fitness of the next generation. Crossover is executed by selecting strings of two mating parents, randomly choosing two sites.

Mutation safeguards the genetic search process from a premature loss of valuable genetic material during reproduction and crossover. The process of mutation is simply to choose few members from the population pool according to the probability of mutation and to switch a 0 to 1 or vice versa at randomly sites on the chromosome.

Figure 14:
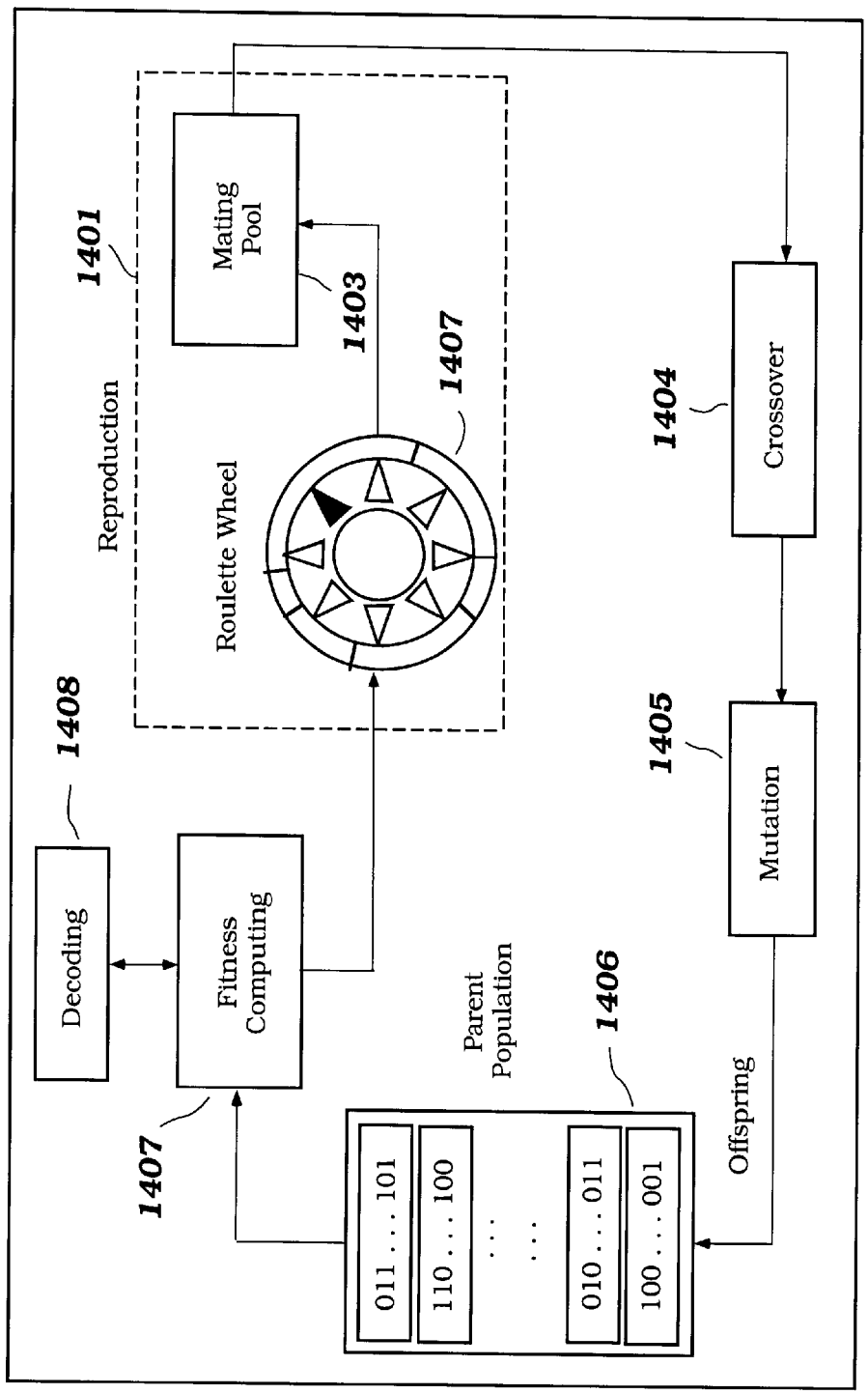
FIG. 14 shows the genetic analyzer process and the operations of reproduction, crossover, and mutation.

FIG. 14 illustrates the processes of reproduction, crossover and mutation on a set of chromosomes in a genetic analyzer. A population of strings is first transformed into decimal codes and then sent into the physical process 1407 for computing the fitness of the strings in the population. A biased roulette wheel 1402, where each string has a roulette wheel slot sized in proportion to its fitness is created. A spinning of the weighted roulette wheel yields the reproduction candidate. In this way, a higher fitness of strings has a higher number of offspring in the succeeding generation. Once a string has been selected for reproduction, a replica of the string based on its fitness is created and then entered into a mating pool 1401 for waiting the further genetic operations. After reproduction, a new population of strings is generated through the evolutionary processes of crossover 1404 and mutation 1405 to produce a new parent population 1406. Finally, the whole genetic process, as mentioned above, is repeated again and again until an optimal solution is found.

The Fuzzy Logic Control System (FLCS) 240 shown in FIG. 2 includes the information filter 241, the FNN 142 and the FC 143. The information filter 241 compresses the teaching signal $K^i$ to obtain the simplified teaching signal $K^c$, which is used with the FNN 142. The FNN 142, by interpolation of the simplified teaching signal $K^c$, obtains the knowledge base (KB) for the FC 143.

As it was described above, the output of the SSCQ is a teaching signal $K^i$ that contains the information of the behavior of the controller and the reaction of the controlled object to that control. Genetic algorithms in general perform a stochastic search. The output of such a search typically contains much unnecessary information (e.g., stochastic noise), and as a result such a signal can be difficult to interpolate. In order to exclude the unnecessary information from the teaching signal $K^i$, the information filter 241 (using as a background the Shannon's information theory) is provided. For example, suppose that A is a message source that produces the message a with probability p(a), and further suppose that it is desired to represent the messages with sequences of binary digits (bits) that are as short as possible. It can be shown that the mean length L of these bit sequences is bounded from below by the Shannon entropy H(A) of the source: $L \geq H(A)$, where $$H(A) = -\sum_a p(s) \log_2 p(a) \quad (7.1)$$

Furthermore, if entire blocks of independent messages are coded together, then the mean number $\overline{L}$ of bits per message can be brought arbitrary close to H(A).

This noiseless coding theorem shows the importance of the Shannon entropy H(A) for the information theory. It also provides the interpretation of H(A) as a mean number of bits necessary to code the output of A using an ideal code. Each bit has a fixed 'cost' (in units of energy or space or money), so that H(A) is a measure of the tangible resources necessary to represent the information produced by A.

In classical statistical mechanics, in fact, the statistical entropy is formally identically to the Shannon entropy. The entropy of a macrostate can be interpreted as the number of bits that would be required to specify the microstate of the system.

Suppose $x_1, \ldots, x_N$ are N independent, identical distributed random variables, each with mean $\overline{x}$ and finite variance. Given $\delta, \epsilon > 0$, there exist $N_0$ such that, for $N \geq N_0$, $$P\left(\left|\frac{1}{N}\sum_i x_i - \overline{x}\right| > \delta\right) < \varepsilon \quad (7.2)$$

This result is known as the weak law of large numbers. A sufficiently long sequence of independent, identically distributed random variables will, with a probability approaching unity, have an average that is close to mean of each variable.

The weak law can be used to derive a relation between Shannon entropy H(A) and the number of 'likely' sequences of N identical random variables. Assume that a message source A produces the message a with probability p(a). A sequence $\alpha = a_1 a_2 \ldots a_N$ of N independent messages from the same source will occur in ensemble of all N sequences with probability $P(\alpha) = p(a_1) \cdot p(a_2) \ldots p(a_N)$. Now define a random variable for each message by $x = -\log_2 p(a)$, so that $H(A) = \overline{x}$. It is easy to see that $$-\log_2 P(\alpha) = \sum_i x_i.$$

From the weak law, it follows that, if $\epsilon, \delta > 0$, then for sufficient large N $$P\left(\left|-\frac{1}{N}\log_2 P(\alpha) - H(A)\right| > \delta\right) < \varepsilon \quad (7.3)$$

for N sequences of $\alpha$. It is possible to partition the set of all N sequences into two subsets:
a) A set $\Lambda$ of "likely" sequences for which $$\left|-\frac{1}{N}\log_2 P(\alpha) - H(A)\right| \leq \delta$$

b) A set of 'unlikely' sequences with total probability less than $\epsilon$, for which this inequality fails.

This provides the possibility to exclude the 'unlikely' information from the set $\Lambda$ which leaves the set of sequences $\Lambda_1$ with the same information amount as in set $\Lambda$ but with a smaller number of sequences.

The FNN 142 is used to find the relations between (Input) and (Output) components of the teaching signal $K^c$. The FNN 142 is a tool that allows modeling of a system based on a fuzzy logic data structure, starting from the sampling of a process/function expressed in terms of input-output values pairs (patterns). Its primary capability is the automatic generation of a database containing the inference rules and the parameters describing the membership functions. The generated Fuzzy Logic knowledge base (KB) represents an optimized approximation of the process/function provided as input. FNN performs rule extraction and membership function parameter tuning using learning different learning methods, like error back propagation, fuzzy clustering, etc. The KB includes a rule base and a database. The rule base stores the information of each fuzzy rule. The database stores the parameters of the membership functions. Usually, in the training stage of FNN, the parts of KB are obtained separately.

Figure 15:
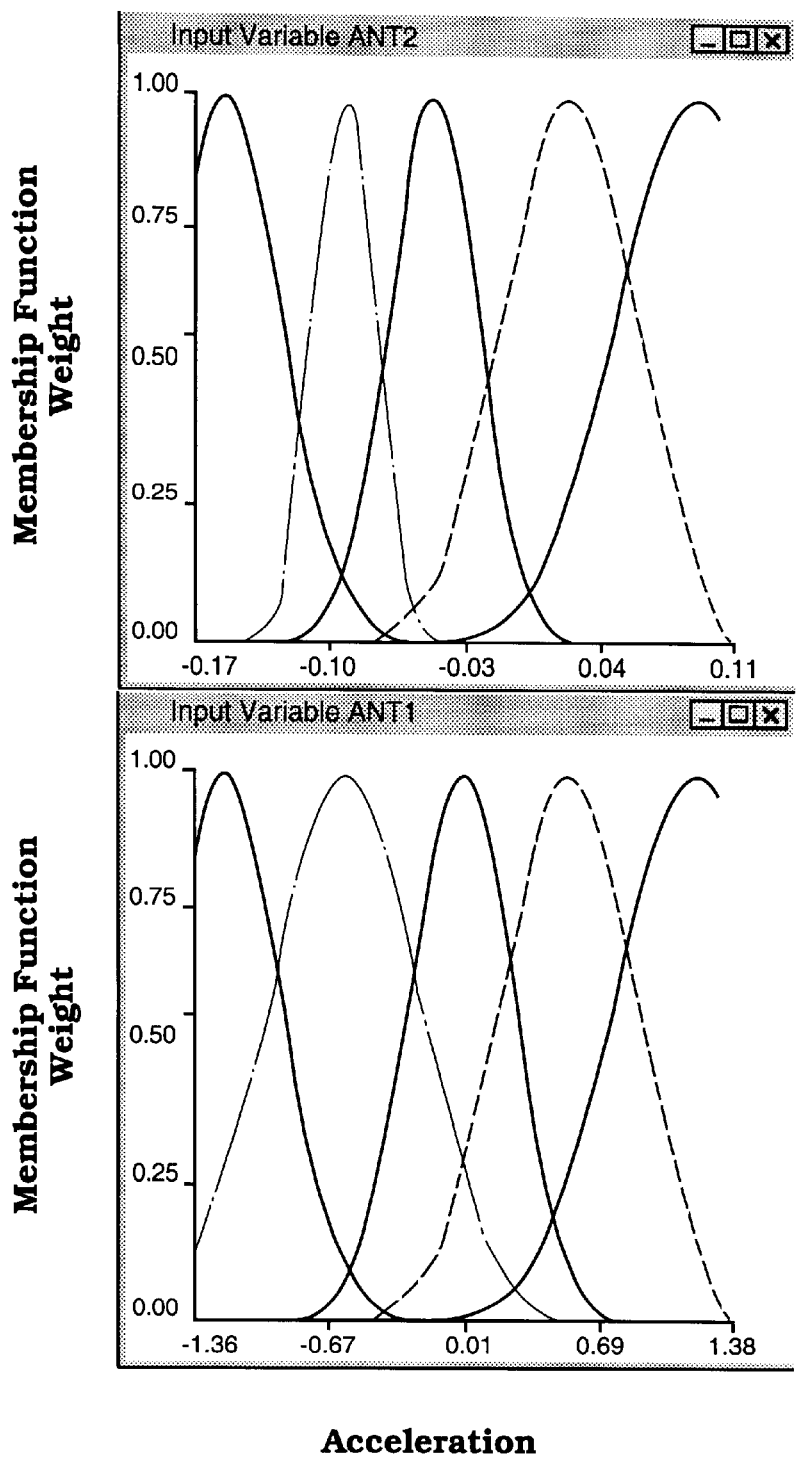
FIG. 15 shows results of variables for the fuzzy neural network.

An example of a KB of a suspension system fuzzy controller obtained using the FNN 142 is presented in FIG. 15. The knowledge base of a fuzzy controller includes two parts, a database where parameters of membership functions are stored, and a database of rules where fuzzy rules are stored. In the example shown in FIG. 15, the fuzzy controller has two inputs (ANT1) and (ANT2) which are pitch angle acceleration and roll angle acceleration, and 4 output variables (CONS1 , . . . CONS4), are the valve positions of FL, FR, RL, RR wheels respectively. Each input variable has 5 membership functions, which gives total number of 25 rules.

The type of fuzzy inference system in this case is a zero-order Sugeno-Takagi Fuzzy inference system. In this case the rule base has the form presented in the list below.

IF ANT1 is MBF1_1 and ANT2 is MBF2_1 then CONS1 is A1_1 and . . . and CONS4 is A4_1

IF ANT1 is MBF1_1 and ANT2 is MBF2_2 then CONS1 is A1_2 and . . . and CONS4 is A4_2

. . .

IF ANT1 is MBF1_5 and ANT2 is MBF25 then CONS1 is A1_25 and . . . and CONS4 is A4_25

In the example above, when there are only 25 possible combinations of input membership functions, so it is possible to use all the possible rules. However, when the number of input variables is large, the phenomenon known as "rule blow" takes place. For example, if number of input variables is 6, and each of them has 5 membership functions, then the total number of rules could be: $N=5^6=15625$ rules. In this case practical realization of such a rule base will be almost impossible due to hardware limitations of existing fuzzy controllers. There are different strategies to avoid this problem, such as assigning fitness value to each rule, and exclusion of rules with small fitness from the rule base. The rule base will be incomplete, but realizable.

The FC 143 is an on-line device that generates the control signals using the input information from the sensors comprising the following steps: (1) fuzzyfication; (2) fuzzy inference; and (3) defuzzyfication.

Fuzzyfication is a transferring of numerical data from sensors into a linguistic plane by assigning membership degree to each membership function. The information of input membership function parameters stored in the knowledge base of fuzzy controller is used.

Fuzzy inference is a procedure that generates linguistic output from the set of linguistic inputs obtained after fuzzyfication. In order to perform the fuzzy inference, the information of rules and of output membership functions from knowledge base is used.

Defuzzyfication is a process of converting of linguistic information into the digital plane. Usually, the process of defuzzyfication include selecting of center of gravity of a resulted linguistic membership function.

Figure 16A:
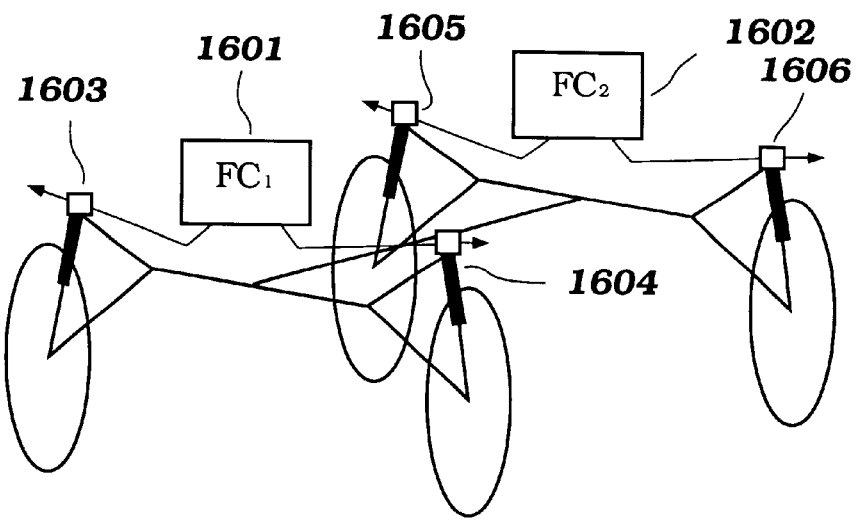
FIG. 16A shows control of a four-wheeled vehicle using two controllers.
Figure 16B:
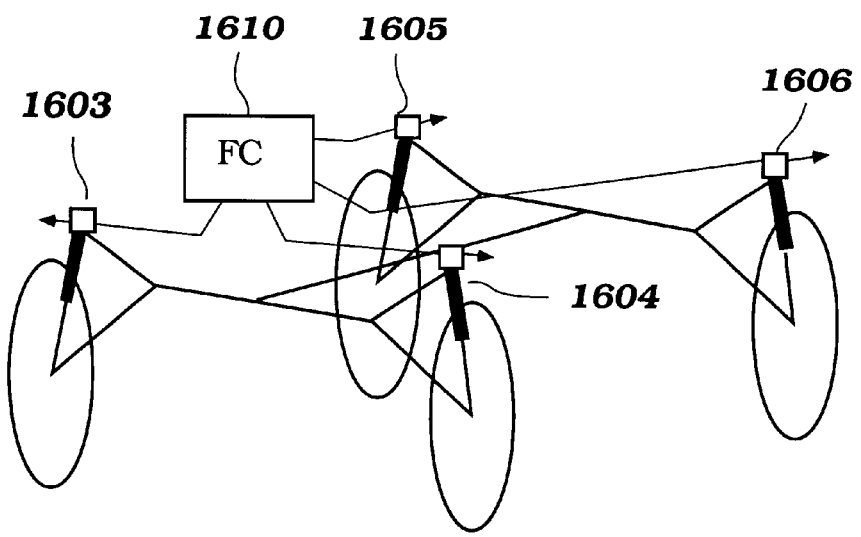
FIG. 16B shows control of a four-wheeled vehicle using a single controller to control all four wheels.

Fuzzy control of a suspension system is aimed at coordinating damping factors of each damper to control parameters of motion of car body. Parameters of motion can include, for example, pitching motion, rolling motion, heave movement, and/or derivatives of these parameters. Fuzzy control in this case can be realized in the different ways, and different number of fuzzy controllers used. For example, in one embodiment shown in FIG. 16A, fuzzy control is implemented using two separate controllers, one controller for the front wheels, and one controller for the rear wheels, as shown in FIG. 16A, where a first fuzzy controller 1601 controls front-wheel damper actuators 1603 and 1604 and a second fuzzy controller 1602 controls rear-wheel damper actuators 1605 and 1606. In one embodiment, shown in FIG. 16B, a single controller 1610 controls the actuators 1603–1606.

Figure 17:
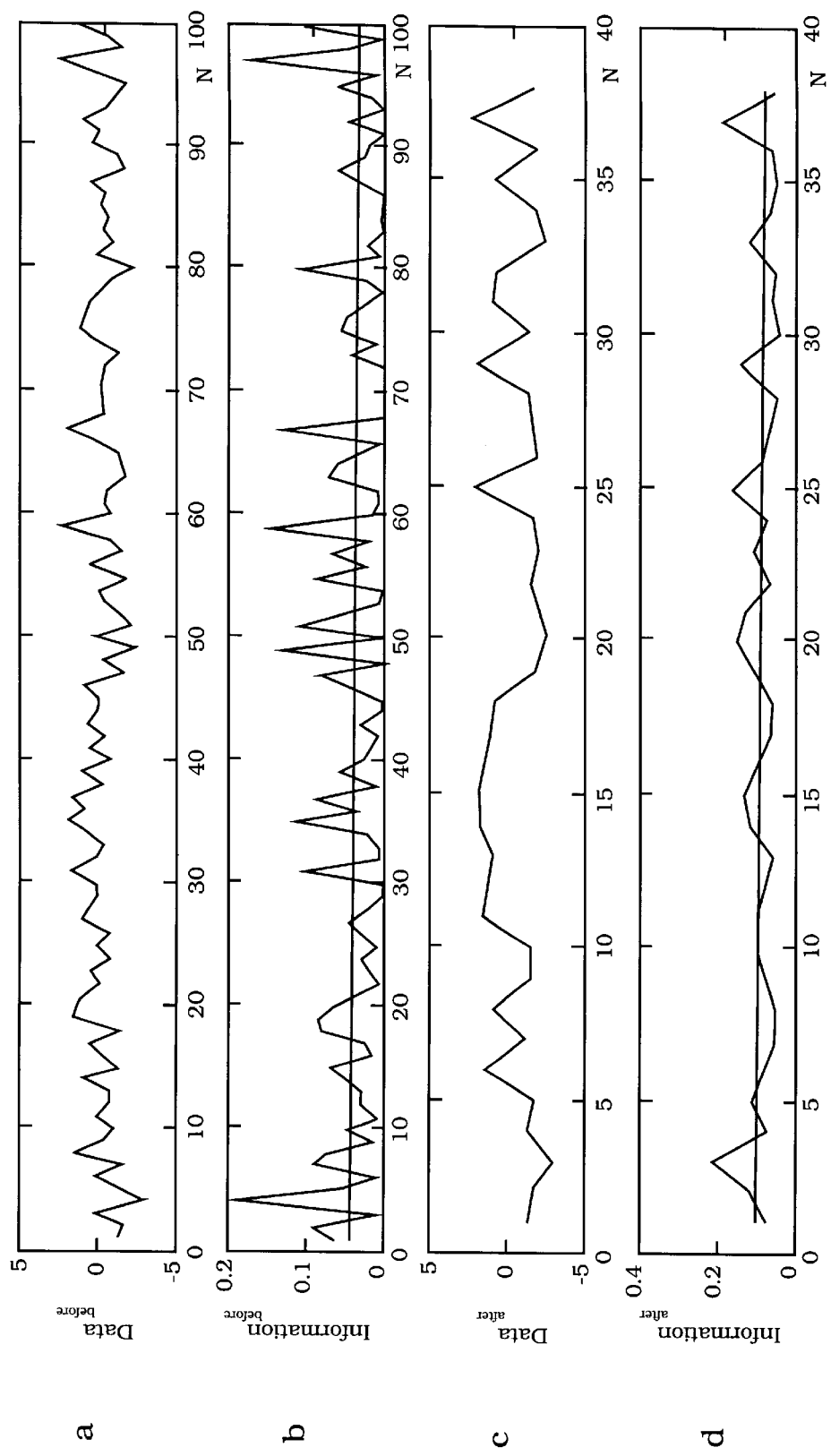
FIG. 17 shows an information filter application results for compression of a normal distribution stochastic signal, including: (a) the source signal; (b) the row-wise information distribution before compression; (c) the signal after compression; and (d) the information distribution after compression.
Figure 18:
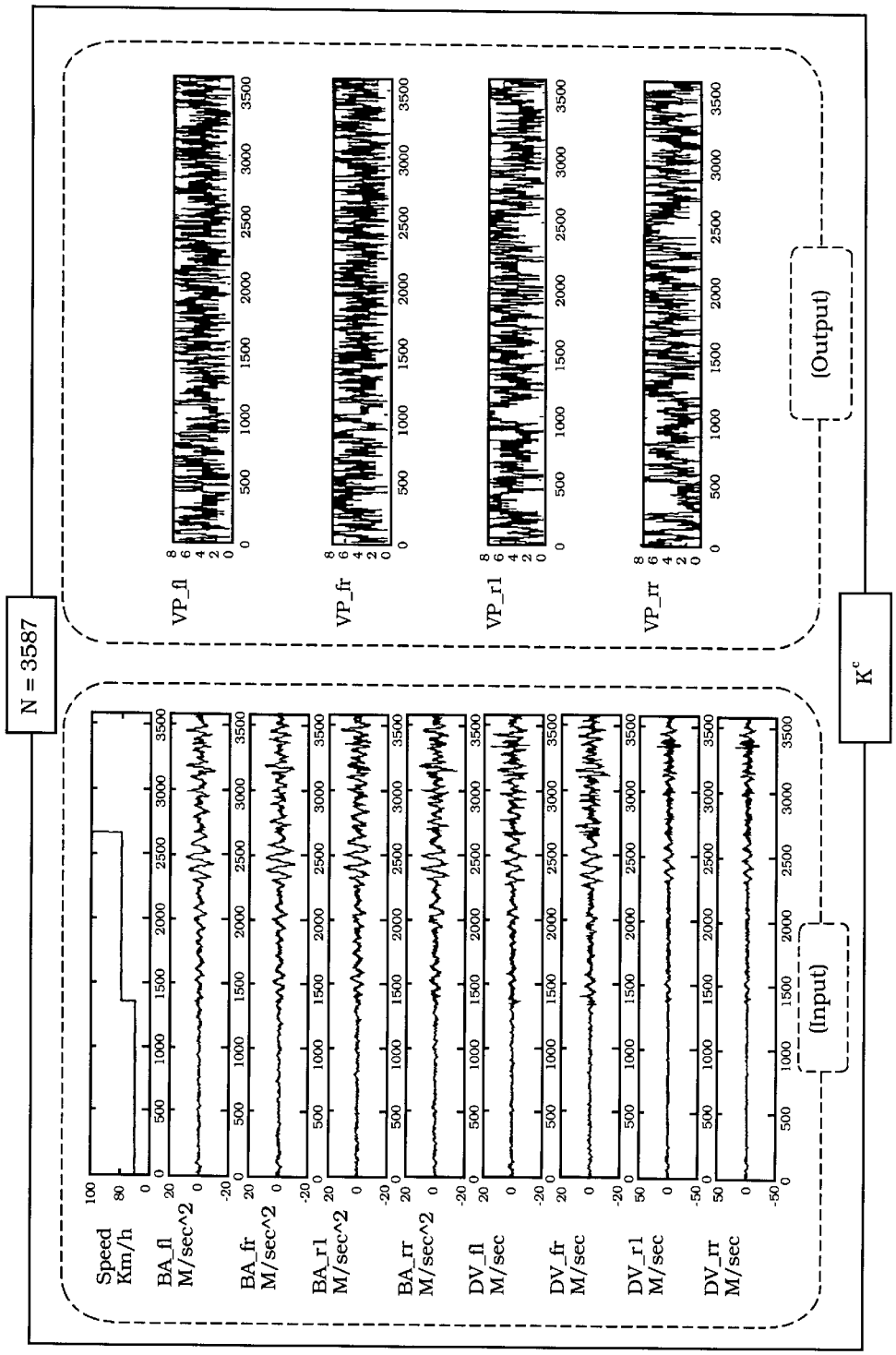
FIG. 18 shows the teaching signal $K^c$ provided by the information filter 241 shown in FIG. 2.
Figure 19:
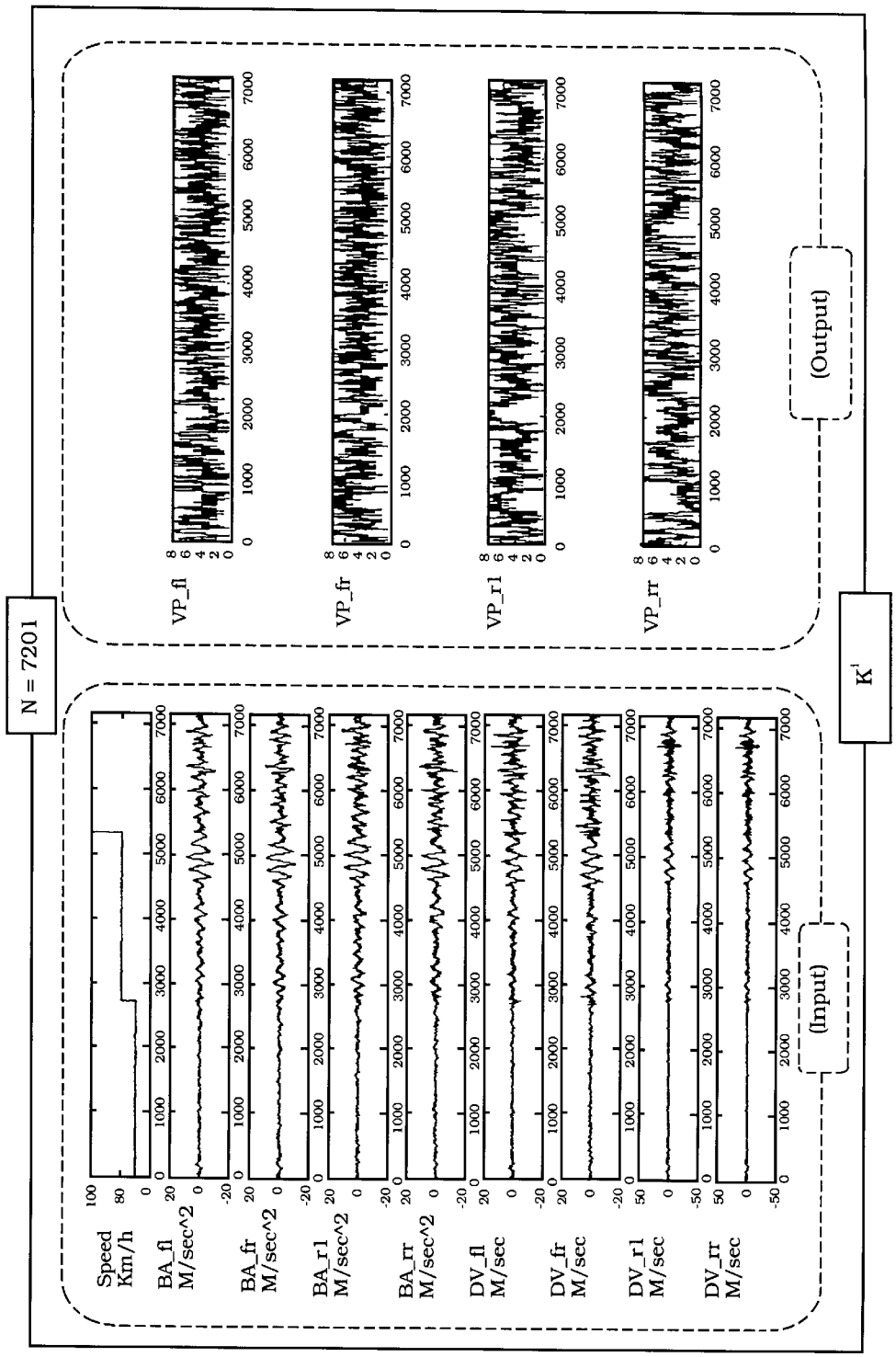
FIG. 19 shows the output of the simulation system of control quality of intelligent control suspension system.

As described above in connection with Equation 7.3, it is possible to exclude the "unlikely" information from the set $\Lambda$, which leaves the set of sequences $\Lambda_1$ having approximately the same amount of information as in set $\Lambda$, but with a smaller number of sequences. The results of such a filtering algorithm application are illustrated in FIGS. 17 and 18. In the FIG. 17, the filtering is applied to the matrix of normal distribution values. The source signal (shown in curve (a) of FIG. 17) is a data matrix, containing 100 rows and one column of Gaussian-normal distributed values with mean zero and with $\sigma^2=1$. Labels on the X axis denote the row number. The value of $\epsilon$ is chosen as the mean value of the information distribution (as shown in curve (b) of FIG. 17). After applying the information filter, the resulting filtered signal has less than 40 percent of the rows of the source signal (as shown in curve (c) of FIG. 17). The other rows have little significant information and can be eliminated. The information distribution of the resulting signal is shown in curve (d) of FIG. 17. The number of "in-out" teaching pairs in the compressed signal $K^c(N=3587)$ shown in FIG. 18 is almost two times less than the number of "in-out" teaching pairs in the entire teaching signal $K^i$ (N=7201), shown in FIG. 19. The form of the teaching signals remains the same, and both teaching signals have approximately the same amount of information. FIGS. 18 and 19 include curves showing speed of the vehicle.

FIGS. 18 and 19 also include curves showing acceleration of the front-left portion of the vehicle body 710 (labeled BA_fl in FIGS. 18 and 19), acceleration of the front-right portion of the vehicle body 710 (labeled BA_fr in FIGS. 18 and 19), acceleration of the rear-left portion of the vehicle body 710 (labeled BA_rl in FIGS. 18 and 19), and acceleration of the rear-right portion of the vehicle body 710 (labeled BA_rr in FIGS. 18 and 19) in meters per second squared. FIGS. 18 and 19 also include curves showing vertical velocity of the front-left damper 802 (labeled DV_fl in FIGS. 18 and 19), vertical velocity of the front-right damper 801 (labeled DV_fr in FIGS. 18 and 19), vertical velocity of the rear-left damper 804 (labeled DV_rl in FIGS. 18 and 19), and vertical velocity of the rear-right damper 803 (labeled DV_rr in FIGS. 18 and 19) in meters per second. Finally, FIGS. 18 and 19 include curves showing valve position of the front-left damper 802 (VP_fl), valve position of the front-right damper 801 (VP_fr), valve position of the rear-left damper 804 (VP_rl), and valve position of the rear-right damper 803 (VP_rr). The x-axes of the plots shown in FIGS. 18–19 indicate the sample points. The curves in FIG. 18 correspond to 3587 sample points. The curves in FIG. 19 correspond to 7201 sample points.

Figure 20:
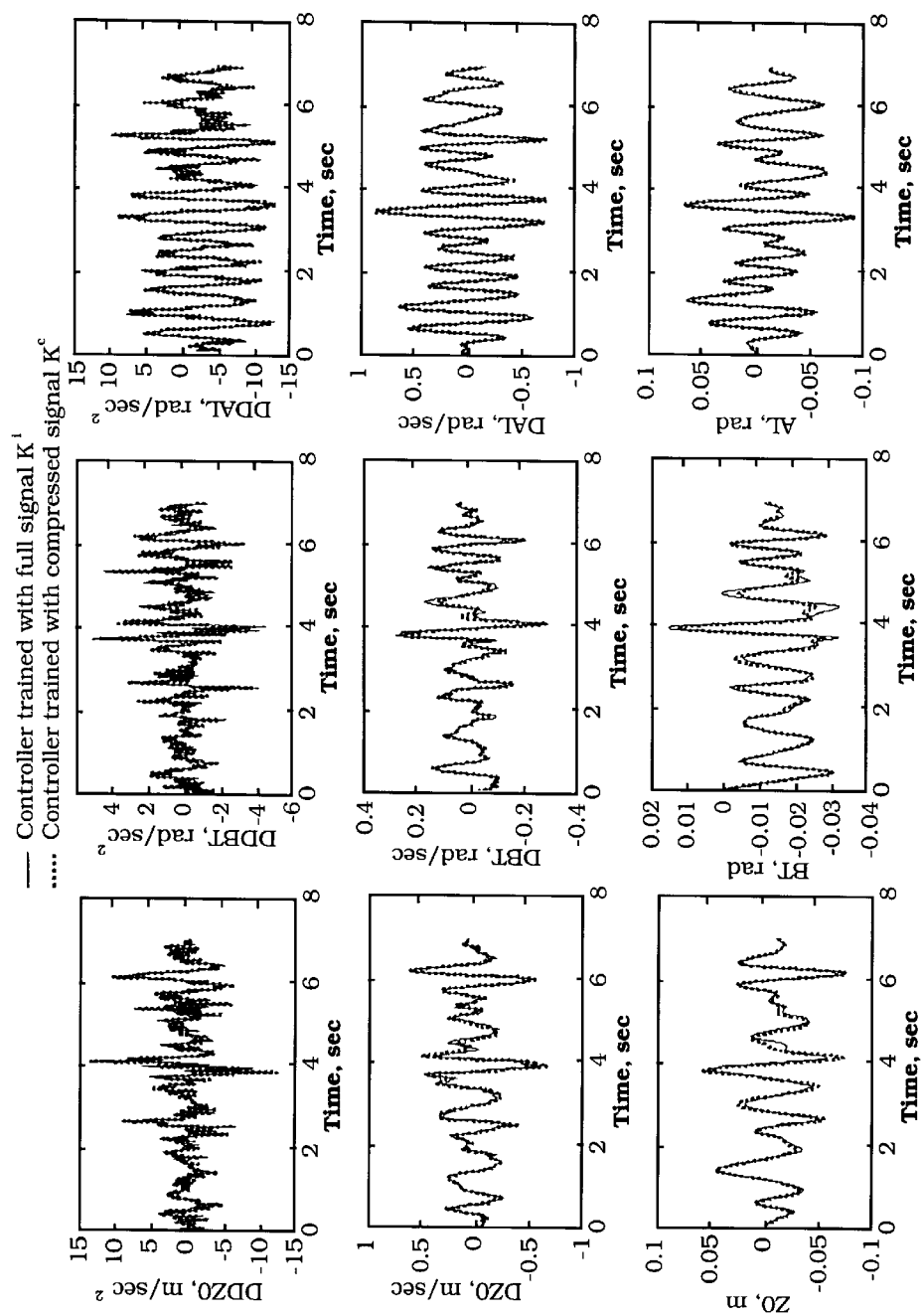
FIG. 20 shows the simulation results of fuzzy control of a suspension system

FIG. 20 shows simulation results of fuzzy control of a suspension system, when a fuzzy logic classifier system, such as the fuzzy logic classifier system 140, is trained using the entire teaching signal $K^i$ (shown in FIG. 19). FIG. 20 also shows simulation results of fuzzy control of the same system when the fuzzy logic classifier system 140 is trained using the filtered teaching signal $K^c$ (shown in FIG. 18). In the first case (solid line), the controller was trained using the full teaching signal $K^i$. In the second case (dashed line), the controller was trained with the teaching signal, which was filtered using the information filter 241. In FIG. 20, heave (Z0), pitch (BT) and roll (AL) movements, velocities and accelerations are shown. FIG. 20 shows the similarity of the system outputs in both cases, indicating the positive result of teaching signal filtering using the information filter 241.

Figure 21:
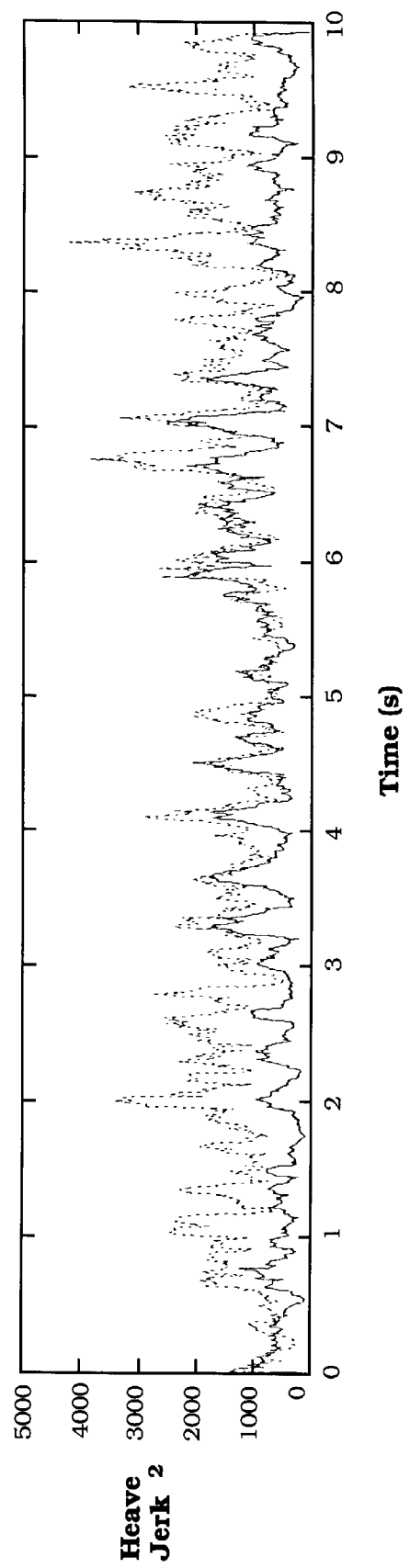
FIG. 21 shows the square of heave jerk for controlled and uncontrolled systems.
Figure 22:
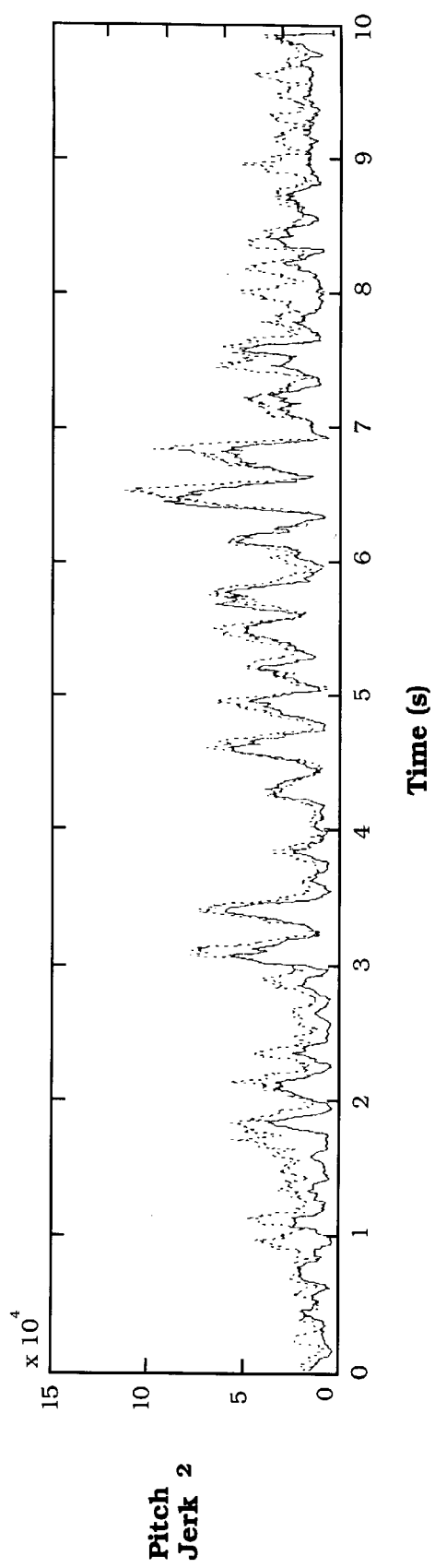
FIG. 22 shows the square of pitch jerk for controlled and uncontrolled systems.
Figure 23:
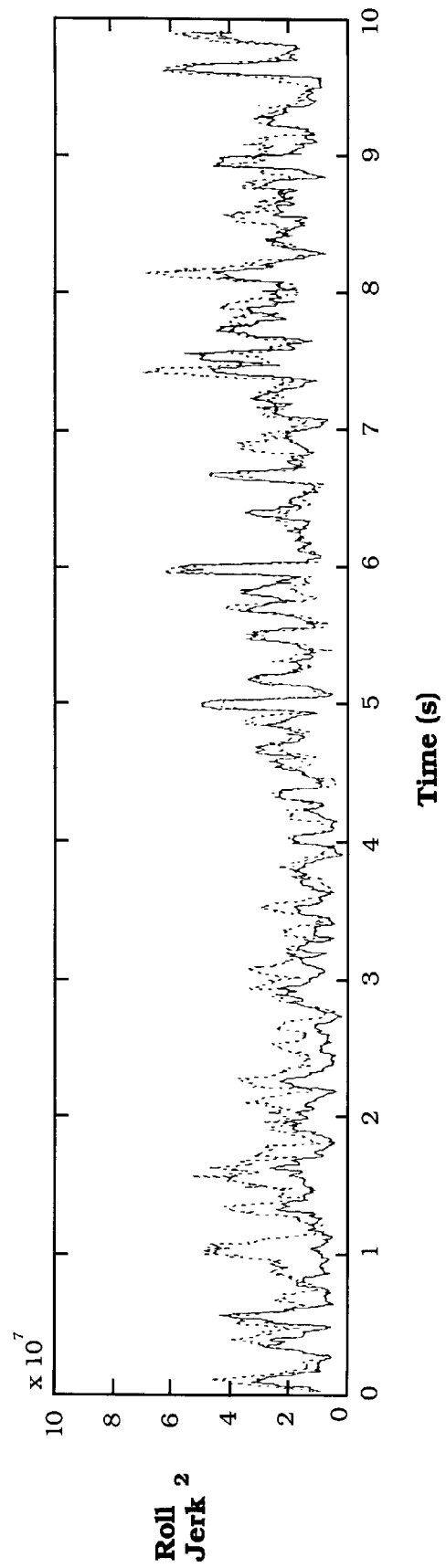
FIG. 23 shows the square of roll jerk for controlled and uncontrolled systems.

FIGS. 21–23 show experimental results of fuzzy control. For the curves shown in FIGS. 21–23, the fitness function in the genetic algorithm is designed to minimize:

$$(\text{heave jerk})^2+(\text{pitch jerk})^2+(\text{roll jerk})^2+(\text{entropy production})^2$$

FIG. 21 shows the squared of the controlled (solid line) and uncontrolled (dashed line) heave jerk. FIG. 22 shows the square of the controlled (solid line) and uncontrolled (dashed line) pitch jerk. FIG. 23 shows the square of the controlled (solid line) and uncontrolled (dashed line) heave jerk.

Appendix I: Mathematical and Physical Background of Stochastic Simulation

1. Stochastic Integrals and Stochastic Differential Equations 1.1. Stochastic Integrals Consider different types of stochastic integral according to increasing complexity:

$$A.\ \int_0^t \Phi(\tau)d\tau;\ B.\ \int_0^t \Phi(y(\tau),\tau)dy(\tau);\ C.\ \int_0^t \Phi(x(\tau),\tau)dy(\tau)$$

where $y(\tau)$ is the process of Brownian motion $[M[y(\tau_{j+1})-y(\tau_j)]=0, M[y(\tau_{j+1})-y(\tau_j)]^2=[\tau_{j+1}-\tau_j]$, (if $(\tau_j,\tau_{j+1}) \cap (\tau_k,\tau_{k+1})=0$ then the increments are independent and $M[y(\tau_{j+1})-y(\tau_j)][y(\tau_{k+1})-y(\tau_k)]=0$) and $x(\tau)$ is a smoothly Markovian process. Define the stochastic integrals of types A, B, and C as limits in mean-square (l.i.m.) of integral sums.

Case A: Assume that $\Phi(\tau)$ is a smooth function and $$\int_0^\infty \Phi^2(\tau)d\tau < \infty.$$

In this case: l.i.m.

$$\int_0^t [\Phi_n(\tau)-(\Phi(\tau)^2]d\tau \to 0$$

for $n \to \infty$, where $\Phi_n(\tau)$ is the sequence of step functions. Define the integral for a step functions as $$S_n = \int_0^t \Phi_n(\tau)dy(\tau) = \sum_{j=1}^N \Phi_n(\tau_j)[y(\tau_{j+1})-y(\tau_j)],$$

where $(\tau_j,\tau_{j+1})$ is the step of a function $\Phi_n(\tau)$ (see FIG. I.6).

The limit in mean-square for the sequence of random functions $S_n(t)$ exists if $M[S_n-S_m]^2 \to 0$ for $n,m \to \infty$. In this case $M[S_n(t)-S_m(t)]^2 = \int [\Phi_n(\tau)-\Phi_m(\tau)]^2 d\tau$ and this integral is similar to the Riemannian integral.

Case B: Assume that $\Phi(y,t)$ is the differentiable function of both arguments and $$\int_0^t M[\Phi^2(y(\tau),\tau)]d\tau < \infty.$$

The stochastic Ito integral (case B) is:

$$\underset{N\to\infty}{l.i.m.}\sum_{j=1}^N \Phi(y(\tau_j),\tau_j)[y(\tau_{j+1})-y(\tau_j)] = \int_0^t \Phi(y(\tau),\tau)dy(\tau)$$

The function $y(\tau)$ is a non-differentiable function, has non-bounded variation, and the transformation rules and calculation of this integral differ from the case of the differentiable function $y(\tau)$.

Example: calculate the integral $$\int_s^t (y(\tau)-y(s))dy(\tau).$$

In this case $$S_n = \sum_{j=0}^N [y(\tau_{j+1})-y(\tau_j)][y(\tau_j)-y(s)].$$

Denote $\Delta_{j+1}=y(\tau_{j+1})-y(\tau_j)$; $s=\tau_0$; $t=\tau_N$. Then $$S_n = \sum_{j=1}^{N-1}\left(\sum_{k=1}^j \Delta_k\right)\Delta_{j+1} =$$

$$\frac{1}{2}\left[\left(\sum_{k=1}^{N-1}\Delta_k\right)^2 - \sum_{j=1}^{N-1}\Delta_j^2\right] = \frac{1}{2}(y(t)-y(s))^2 - \frac{1}{2}\sum_{j=1}^{N-1}[y(\tau_{j+1})-y(\tau_j)]^2$$

$$\lim_{N\to\infty} S_N = \frac{1}{2}(y(t)-y(s))^2 - \frac{1}{2}(t-s).$$

For a differentiable function $y(\tau)$ $$\int_s^t (y(\tau)-y(s))dy(\tau) = \frac{1}{2}(y(t)-y(s))^2$$

It is possible to introduce a definition of stochastic integral that can be stable to transformation from the process with differentiable trajectories to the process with non-differentiable trajectories.

In the case B introduce the following definition (Stratonovich symmetrical stochastic integral):

$$\int_0^t \Phi(y(\tau),\tau)dy(\tau) = \underset{N\to\infty}{l.i.m.}\sum_{j=1}^N \Phi\left(\frac{y(\tau_{j+1})+y(\tau_j)}{2}\right)[y(\tau_{j+1})-y(\tau_j)]$$

or in the equivalent form:

$$\int_0^t \Phi(y(\tau),\tau)dy(\tau) = \underset{N\to\infty}{l.i.m.}\sum_{j=1}^N \Phi\left(y\left(\frac{\tau_{j+1}+\tau_j}{2}\right)\right)[y(\tau_{j+1})-y(\tau_j)]$$

$$\underset{N\to\infty}{l.i.m.}\left\{\sum_{j=1}^N \Phi\left(\frac{y(\tau_{j+1})+y(\tau_j)}{2},\tau_j\right)[y(\tau_{j+1})-y(\tau_j)] - \sum_{j=1}^N \Phi(y(\tau_j),\tau_j)[y(\tau_{j+1})-y(\tau_j)]\right\} =$$

$$l.i.m.\left\{\sum_{j=1}^N \left[\Phi\left(y(\tau_j)+\frac{y(\tau_{j+1})-y(\tau_j)}{2},\tau_j\right)-\Phi(y(\tau_j),\tau_j)\right]_{N\to\infty}\right.$$

$$\left.[y(\tau_{j+1})-y(\tau_j)]\right\} =$$

$$\underset{N\to\infty}{l.i.m.} \frac{1}{2}\left\{\sum_{j=1}^{N}\frac{\partial\Phi(y(\tau_j),\tau_j)}{\partial y}[y(\tau_{j+1})-y(\tau_j)]^2 + \right.$$

$$\left.\sum_{j=1}^{N}0(y(\tau_{j+1})-y(\tau_j))[y(\tau_{j+1})-y(\tau_j)]\right\} =$$

$$\begin{cases}\frac{1}{2}\int_0^\tau \frac{\partial\Phi(y(\tau),\tau)}{\partial y}d\tau,\\ \frac{1}{2}\int_0^\tau \frac{\partial\Phi(y(\tau),\tau)}{\partial y}\sigma^2(y(\tau),\tau)d\tau\end{cases}$$

The first expression is describes the case of Brownian motion with constant diffusion coefficient, $M[y(\tau_{j+1})-y(\tau_j)]^2=\tau_{j+1}-\tau_j$, and the second expression describes a more general case of non homogeneous Brownian motion:

$$M\{[y(\tau_{j+1})-y(\tau_j)]^2|y(\tau_j)=y\}=\sigma^2(y(\tau_j),\tau_j)[\tau_{j+1}-\tau_j]+0(\tau_{j+1-\tau_j}).$$

An ordinary differential equation $$\frac{dy}{dt}=A(y,t)$$

can be considered as a limit for $\Delta t\to 0$ in the equation in finite differences $\Delta y=A(y,t)\Delta t+o(\Delta t)$. In the case of stochastic differential equation the increment $\Delta y$ include the random addend $\Delta y=A(y,t)\Delta t+\Phi(y,t,\Delta t,\alpha_t)$, where $\alpha_t$ is independent random values; time is discrete. For limit non-degenerate stochastic disturbance $$\Delta y=A(y,t)\Delta t+f(y,t,\alpha_t)\sqrt{\Delta t} \qquad (1)$$

The relation (1) is similar to equation described until limited model of Brownian motion (Wiener process). Process of Brownian motion can be described as limit of process with discrete set of states. Consider a stray particle on a lattice with a temporal step $\Delta t$ and a spatial step $\delta$, $\delta=\sqrt{\Delta t}$. During the time $t=n\Delta t$ the particle displacement is $$x(t)=\sum_{k=1}^{n}\Delta x_k,$$

where $\Delta x_k=\delta$ or $-\delta$ with the probability ½. Using the central limit theorem it is very simple to obtain that for $\Delta t\to 0$ the probability density of the stray process $x(t)$ trends to Gaussian density of probability.

As a further example, for the sequence $\xi=\{\xi_1,\xi_2,\ldots,\xi_n\}$ of mutual independent random values, similar probability partition law, mathematical expectation $M[\xi_i]=a$ and dispersion $D\xi_i=b$ the probability density for the sum of random values $$\eta_n=\sum_{k=1}^{n}\xi_k$$

trends to Gaussian probability density function with the parameters $M[\eta_n]=na$, $D\eta_n=nb$:

$$P\left\{\frac{\eta_n-na}{\sqrt{nb}}\right\}=\frac{1}{\sqrt{2\pi}}\int_{-\infty}^{z}e^{-u^2/2}du.$$

If the density function of random addends is not similar, then for application of the central probability theorem is desirable to use the Linderberg condition:

$$P\left\{\max_{1\le k\le n}\left|\xi_k-a_k\right|>\tau\sum_{i=1}^{n}D\xi_i\right\}\to 0$$

for $n\to\infty$, where $\tau>0$ is arbitrary constant number.

Also, the trajectories of until-limited stray convergence with the probability 1 (broken lines $x_A(t)$ converge in the limit to a smooth trajectory $x(t)$) for $\Delta t\to 0$). The limit random process $x(t)$ is called a Wiener process. The trajectory of the Wiener process is piecewise:

$$\Delta x \approx \sqrt{\Delta t}\,;\, \frac{\Delta x}{\Delta t}\to\pm\infty$$

for $\Delta t\to 0$. With the probability 1, the trajectory $x(t)$ is not differentiable in all points t and, at the same time, the trajectory $x(t)$ is smoothly and satisfy of uniformly continuous condition: for small values $|t_2-t_1|$, $|x(t_2)-x(t_1)|\le K|t_2-t_1|^{1/2}$, where K=const. Extending the axis x in $\sqrt{B}$ times, gives the Brownian motion with the diffusion coefficient B. The Brownian motion with the drift coefficient A corresponds to the case of Brownian motion with non-equal probability of up and down transfers of the stray process on the lattice.

As an example, consider that the probability of up transfer is p, down is q=1-p and p≠q. Then $M[\Delta x_k]=(p-q)\sqrt{B\Delta t}=A\Delta t$. In this case $$p=\frac{1}{2}+A\sqrt{\frac{\Delta t}{B}}\,,\, q=\frac{1}{2}-A\sqrt{\frac{\Delta t}{B}}.$$

For $\Delta t\to 0$ the probabilities of up and down displacements trends to ½. According to this property, (notwithstanding the infinite velocity) the mean displacement is finite during the finite time. Define all smoothly Markovian processes as the sum of large number of small increments and $$\begin{cases}M[\Delta x|x,t]=A(x,t)\Delta t+o(\Delta t),\\ M[(\Delta x)^2|x,t]=B(x,t)\Delta t+o(\Delta t),\\ M[(\Delta x)^k]=o(\Delta t)\end{cases}$$

for k>2.
For this case $$\lim_{N\to\infty}\sum_{j=1}^{N}[x_{j+1}-x_j]^2=\int_0^T B(x(\tau),\tau)d\tau.$$

As an example of until-limited models of Brownian motion, consider the random process $x_A(t)$ with discrete time, $t=n\Delta$, and with smoothly-set state:

$$x_\Delta(t) = \sum_{j=1}^{n} \eta(j\Delta)\Delta,$$

where $\eta(j\Delta)$ are the values of a stationary Gaussian random process with the auto-correlation function $R_\eta(\tau)=M[\eta(t)\eta(t+\tau)]=\sigma^2 R(\tau)$. The function $R(\tau)$ decreases if $\tau$ increases. Define $\tau_{cor}$ as the time when for the case $|t_2-t_1|>\tau_{cor}$ Gaussian random values $\eta(t_1)$ and $\eta(t_2)$ are weakly correlated and weakly dependent, accordingly. For the sum $x_A(t)$ of weakly dependent Gaussian values one can use the central limit theorem. In this case it is desirable to develop the process $x_A(t)$ with the mathematical expectation of quadratic increment for one step $\Delta$ proportional to $\Delta$:

$$M[\{x(j\Delta) - x((j-1)\Delta)\}^2] = \Delta^2 D\eta = \Delta^2 \sigma^2 = \Delta const; \sigma^2 = \frac{const}{\Delta}.$$

In this case, the stochastic process $x_\Delta(t)$ for $\Delta \to 0$ turns into the process of Brownian motion. Thus for decreasing $\Delta = \tau_{cor}$ the auto-correlation function of the stochastic process $\eta(t)$ must be to change as follows: the graphic form of the function $R_\eta(\tau)$ must simultaneously be compressed on the axis $\tau$ and stretched on the ordinate axis. The area under this curve is constant:

$$\int_{-\infty}^{+\infty} R_\eta(\tau)d\tau = const = C.$$

In the limit $R_\eta(\tau) \to C\delta(\tau); \delta(\tau)$ is a Dirac delta-function. The generalized limited random process $\eta(t)$ is the Gaussian $\delta$-correlated stochastic process (white noise of level C) with constant spectral density:

$$S_\eta(\omega) = \frac{1}{2\pi}\int e^{i\omega\tau} R_\eta(\tau)d\tau = \frac{C}{2\pi}.$$

One can define different until-limit models $x_\Delta(t)$ of Brownian motion with changing of auto-correlation function types $R_\eta(\tau)$.

Example 1

Let $$S_\eta(\omega) = \begin{cases} \frac{C}{2\pi} & \text{for } |\omega| < \omega_0 \\ 0, & |\omega| > \omega_0 \end{cases},$$

where auto-correlation function is $$R_\eta(\tau) = \int e^{i\omega\tau} S_\eta(\omega)d\omega = \frac{C}{\pi}\sin\frac{\omega_0\tau}{\tau}$$

and for $\omega_0 \to \infty$, $R_\eta(\tau) \to C\delta(\tau)$. In this case the process $$x(t) = \int_0^t \eta(\theta)d\theta$$

becomes Brownian motion.

Example 2

Let $$S_\eta(\omega) = \frac{\alpha^2}{\alpha^2 + \omega^2}$$

and $R_\eta(\tau) = \alpha e^{-\alpha|\tau|} \to \delta(\tau)$ for $\alpha \to \infty$.

The smoothly Markovian processes are connected with the process of Brownian motion and can be obtained as the solution of stochastic differential equations with the Brownian motion as external forces (diffusion processes).

By defining $M[f^2(y,t,\alpha_r)]=B(y,t); M[f(y,t,\alpha_r)]=0$ in equation (1) then the density probability function $p(y,t)$ of the stochastic solution for equation (1) is defined as the solution of Fokker-Planck-Kolmogorov equation:

$$\frac{\partial p(y,t)}{\partial t} = -\frac{\partial}{\partial y}\{A(y,t)p(y,t)\} + \frac{1}{2}\frac{\partial^2}{\partial y^2}\{B(y,t)p(y,t)\} \quad (2)$$

In general form, stochastic differential equations can be described as:

$$dx_i = F(x_1, \ldots, x_n, t) + \sum_{k=1}^{n} \sigma_{ik}(x,t)dy_k(t) \quad (3)$$

where $y_k(t)$ are independent processes of Brownian motion, or $$\frac{dx_i}{dt} = F_i(x,t) + \sum_{k=1}^{n} \sigma_{ik}(x,t)\xi_k(t), \quad (4)$$

where $\xi_k(t)$ are independent Gaussian white noises; $x=\{x_1, x_2, \ldots, x_n\}$.

The solutions of equations (3) and (4) can be to defined as equivalent stochastic integral equalities $$x_i = x_i(0) + \int_{t_0}^{t} F_i(x(\tau),\tau)d\tau + \sum_{k=1}^{n}\int_{t_0}^{t}\sigma_{ik}(x(\tau),\tau)dy_k(\tau) \quad (5)$$

If the stochastic integrals in equation (5) are defined as Ito stochastic integrals, then equations (3) and (4) are the stochastic Ito differential equations. If defined as the symmetrical Stratonovich integrals, then equations (3),(4) are stochastic Stratonovich differential equations. In last case it is possible to use stochastic processes $\xi_k(t)$ as wide-band Gaussian processes.

The Ito stochastic integral is defined as:

$$J_I = \int_0^t \Phi(y(\tau),\tau)dy_k(\tau) = \underset{N\to\infty}{l.i.m.}\sum_{j=1}^{N}\Phi(y(\tau_j),\tau_j)[y_k(\tau_{j+1}) - y_k(\tau_j)] \quad (6)$$

The symmetrical Stratonovich stochastic integral is defined as:

$$J_S = \int_0^t \Phi(y(\tau),\tau)dy(\tau) = \quad (7)$$

-continued $$l.i.m._{N\to\infty} \sum_{j=1}^{N} \Phi\left(\frac{y(\tau_j) + y(\tau_{j+1})}{2}; \tau_j\right)[y_k(\tau_{j+1}) - y_k(\tau_j)]$$

The difference between these two stochastic integrals is equal to:

$$J_S - J_I = \frac{1}{2}\sum_{l=1}^{n} \frac{\partial \Phi}{\partial y_l} B_{kl}(y(\tau), \tau) d\tau \qquad (8)$$

If the functions $\Phi(y,t)$ independent from y then both definitions of stochastic integral are equivalent:

$$\frac{\partial \Phi}{\partial y} \equiv 0$$

and $J_S \equiv J_1$.

Equations (3) and (4) define Markovian process. From definition (5), it is clear that the probability distribution for $x(t)$, $t > t_0$ and defined initial states $x(t_0) \in X_0$ are dependent only from the states $x(t_0)$ and are independent from past before the moment $t_0$, while $$x_i = x_i(0) + \int_{t_0}^{t} F_i(x(\tau), \tau) d\tau + \sum_{k=1}^{n} \int_{t_0}^{t} \sigma_{ik}(x(\tau), \tau) dy_k(\tau)$$

and $y_k(\tau)$ have independent from past the values before the moment $t_0$.

Markovian process can be fully characterized by local characteristics:

$$M[x_i(t+\Delta t)-x_i(t)|x,t]=A_i(x,t)\Delta t+o(\Delta t),$$

$$M[(x_i(t+\Delta t)-x_i(t))(x_j(t+\Delta t)-x_j(t))|x,t]=B_{ij}(x,t)\Delta t+o(\Delta t).$$

For Ito stochastic differential equations $$A_i(x, t) = F_i(x, t); B_{ij}(x, t) = \sum_{k=1}^{n} \sigma_{ik}(x, t)\sigma_{jk}(x, t)$$

Using the relation between Ito and Stratonovich integrals from equation (8) it is possible to obtain for symmetrical stochastic differential equations:

$$A_i(x, t) = F_i(x, t) + \frac{1}{2}\sum_{k=1}^{n} \frac{\partial \sigma_{ik}(x, t)}{\partial x_j}\sigma_{jk}(x, t);$$

$$B_{ik}(x, t) = \sum_{k=1}^{n} \sigma_{ik}(x, t)\sigma_{jk}(x, t).$$

The density probability function can be defined as the solution of equation (2).

What is claimed is:

1. An optimization control method for a shock absorber comprising the steps of:
    obtaining a difference between a time differential of entropy inside a shock absorber and a time differential of entropy given to said shock absorber from a control unit that controls said shock absorber; and
    optimizing at least one control parameter of said control unit by using a genetic algorithm, said genetic algorithm using said difference as a fitness function, said fitness function constrained by at least one biologically-inspired constraint.

2. The optimization control method of claim 1, wherein said time differential of said step of optimizing reduces an entropy provided to said shock absorber from said control unit.

3. The optimization control method of claim 1, wherein said control unit is comprises a fuzzy neural network, and wherein a value of a coupling coefficient for a fuzzy rule is optimized by using said genetic algorithm.

4. The optimization control method of claim 1, wherein said control unit comprises an offline module and a online control module, said method further including the steps of optimizing a control parameter based on said genetic algorithm by using said performance function, determining said control parameter of said online control module based on said control parameter and controlling said shock absorber using said online control module.

5. The optimization control method of claim 4, wherein said offline module provides optimization using a simulation model, said simulation model based on a kinetic model of a vehicle suspension system.

6. The optimization control method of claim 4, wherein said shock absorber is arranged to alter a damping force by altering a cross-sectional area of an oil passage, and said control unit controls a throttle valve to thereby adjust said cross-sectional area of said oil passage.

7. A method for control of a plant comprising the steps of: calculating a first entropy production rate corresponding to an entropy production rate of a control signal provided to a model of said plant; calculating a second entropy production rate corresponding to an entropy production rate of said model of said plant; determining a fitness function for a genetic optimizer using said first entropy production rate and said second entropy production rate; providing said fitness function to said genetic optimizer; providing a teaching output from said genetic optimizer to a information filter; providing a compressed teaching signal from said information filter to a fuzzy neural network, said fuzzy neural network configured to produce a knowledge base; providing said knowledge base to a fuzzy controller, said fuzzy controller using an error signal and said knowledge base to produce a coefficient gain schedule; and providing said coefficient gain schedule to a linear controller.

8. The method of claim 7, wherein said genetic optimizer minimizes entropy production under one or more constraints.

9. The method of claim 8, wherein at least one of said constraints is related to a user-perceived evaluation of control performance.

10. The method of claim 7, wherein said model of said plant comprises a model of a suspension system.

11. The method of claim 7, wherein said second control system is configured to control a physical plant.

12. The method of claim 7, wherein said second control system is configured to control a shock absorber.

13. The method of claim 7, wherein said second control system is configured to control a damping rate of a shock absorber.

14. The method of claim 7, wherein said linear controller receives sensor input data from one or more sensors that monitor a vehicle suspension system.

15. The method of claim 14, wherein at least one of said sensors is an acceleration sensor that measures a vertical acceleration.

16. The method of claim 14, wherein at least one of said sensors is a length sensor that measures a change in length of at least a portion of said suspension system.

17. The method of claim 14, wherein at least one of said sensors is an angle sensor that measures an angle of at least a portion of said suspension system with respect to said vehicle.

18. The method of claim 14, wherein at least one of said sensors is an angle sensor that measures an angle of a first portion of said suspension system with respect to a second portion of said suspension system.

19. The method of claim 7, wherein said second control system is configured to control a throttle valve in a shock absorber.

20. A control apparatus comprising: off-line optimization means for determining a control parameter from an entropy production rate to produce a knowledge base from a compressed teaching signal; and online control means for using said knowledge base to develop a control parameter to control a plant.

* * * * *